US012320173B1

(12) United States Patent
Malloy et al.

(10) Patent No.: US 12,320,173 B1
(45) **Date of Patent: *Jun. 3, 2025**

(54) LATCH APPARATUS

(71) Applicant: The Eastern Company, Strongsville, OH (US)

(72) Inventors: Molly Malloy, Strongsville, OH (US); Lee S. Weinerman, Medina, OH (US); Scott Arthurs, Brunswick, OH (US)

(73) Assignee: THE EASTERN COMPANY, Strongsville, OH (US)

( * ) Notice: Subject to any disclaimer, the term of this patent is extended or adjusted under 35 U.S.C. 154(b) by 145 days.

This patent is subject to a terminal disclaimer.

(21) Appl. No.: 18/223,243

(22) Filed: Jul. 18, 2023

Related U.S. Application Data

(63) Continuation-in-part of application No. 17/114,836, filed on Dec. 8, 2020, now Pat. No. 12,054,964.

(Continued)

(51) Int. Cl.

| | |
|---|---|
| ***E05C 3/04*** | (2006.01) |
| ***E05B 27/00*** | (2006.01) |
| ***E05C 3/00*** | (2006.01) |

(52) U.S. Cl.
CPC .............. *E05C 3/042* (2013.01); *E05B 27/00* (2013.01); *E05C 3/004* (2013.01)

(58) Field of Classification Search
CPC ............... E05B 13/004; E05B 15/0053; E05B 17/0025; E05B 17/0033; E05B 67/383;

(Continued)

(56) References Cited

U.S. PATENT DOCUMENTS 5,913,908 A * 6/1999 Czipri ..................... E05C 3/042 70/210
6,418,761 B1 * 7/2002 Wytcherley ........... E05B 13/004 292/210

(Continued)

*Primary Examiner* — Kristina R Fulton
*Assistant Examiner* — Christopher F Callahan
(74) *Attorney, Agent, or Firm* — Ralph E. Jocke; WALKER & JOCKE

(57) ABSTRACT

A latch (10, 218, 336) is usable to selectively hold a closure member such as a door (188) in a closed position. The latch includes a body (12, 338) which has a manually engageable handle (18, 248, 340) on a front side thereof. A shank (30, 250, 342) is in rotationally movable connection with the handle. The shank extends through the body and into an indexing cam bore (58) on the back side of the body. The shank is both axially and rotationally movable about a cam bore axis (62). An indexing cam (88, 200, 222) is connected to the shank. The shank is in operative connection with a striker (102, 220, 376). The striker is rotationally movable responsive to rotation of the handle between a latched position and unlatched position when the shank is in a second axial position. When the shank is in a first axial position, the shank is held in a fixed rotational position by the indexing cam, and the striker is held in the latched position. A cam bolt (164) is movably engageable with the striker to hold the striker in the latched position. The cam bolt is in operative connection with a lock cylinder (142). The lock cylinder is rotatable in engagement with a correct key to selectively position the cam bolt.

34 Claims, 47 Drawing Sheets

Related U.S. Application Data

(60) Provisional application No. 63/392,265, filed on Jul. 26, 2022, provisional application No. 62/946,144, filed on Dec. 10, 2019.

(58) Field of Classification Search
CPC ...... E05B 63/123; E05B 63/125; E05C 3/042; E05C 9/043; E05C 9/047; E05C 5/00; E05C 5/02; E05C 5/04; E05C 2005/005
See application file for complete search history.

(56) References Cited

U.S. PATENT DOCUMENTS

| | | | | |
|---|---|---|---|---|
| 7,398,664 | B1 * | 7/2008 | Weinerman | E05C 3/042 292/DIG. 31 |
| 2008/0216527 | A1 * | 9/2008 | Burns | E05B 5/00 70/145 |
| 2011/0304161 | A1 * | 12/2011 | Behjat | E05B 1/0092 292/197 |
| 2014/0083147 | A1 * | 3/2014 | Weinerman | E05B 17/0025 70/357 |

* cited by examiner 92
98
96
94
100
108
90
88

200
202
204

200

202
204

202
204

202
204
200

Fig 72
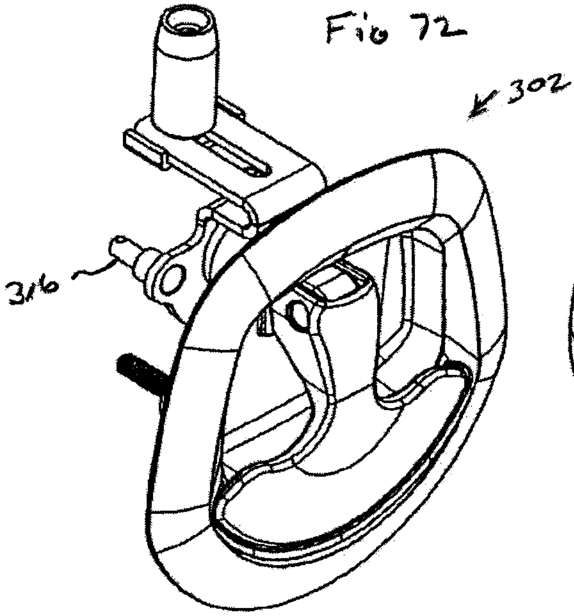
Fig 73
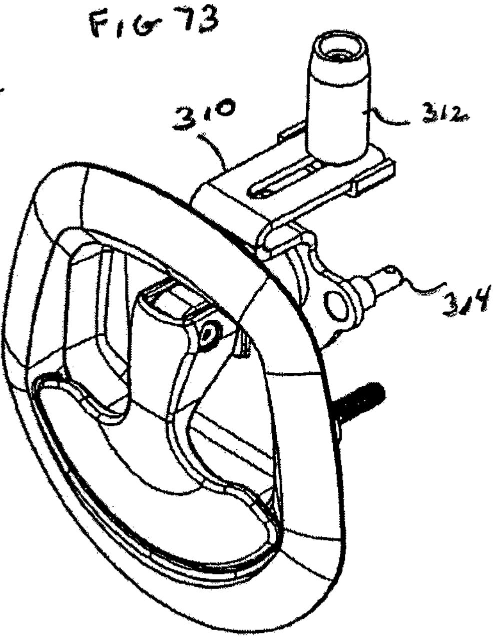
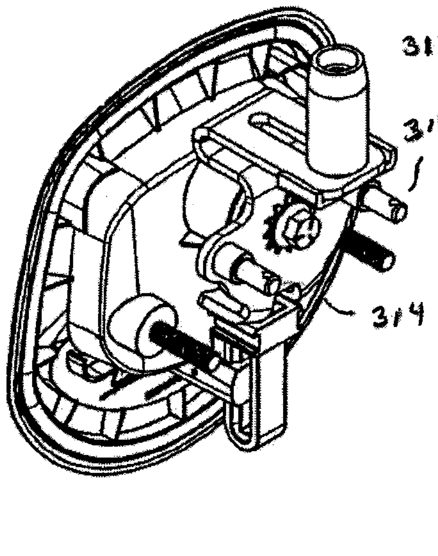
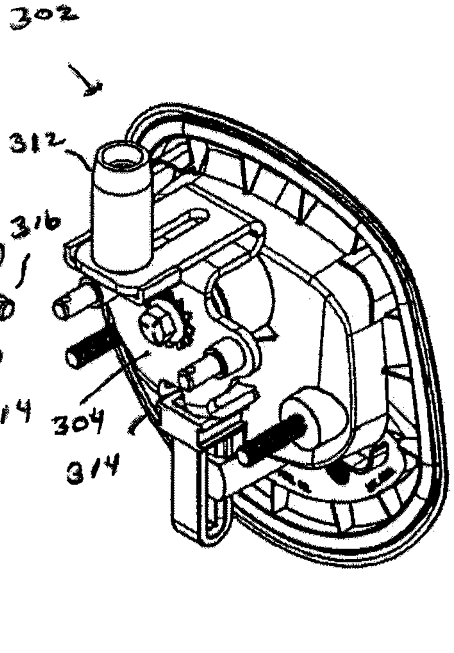
Fig 74
Fig 75

FIG 76
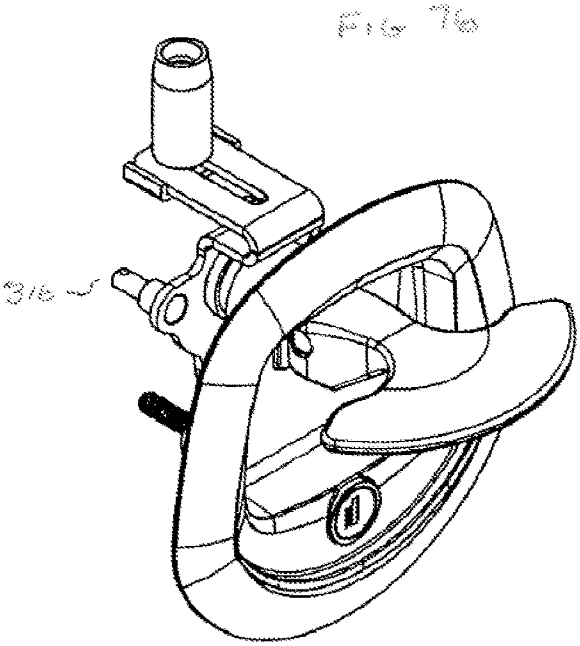
FIG 77
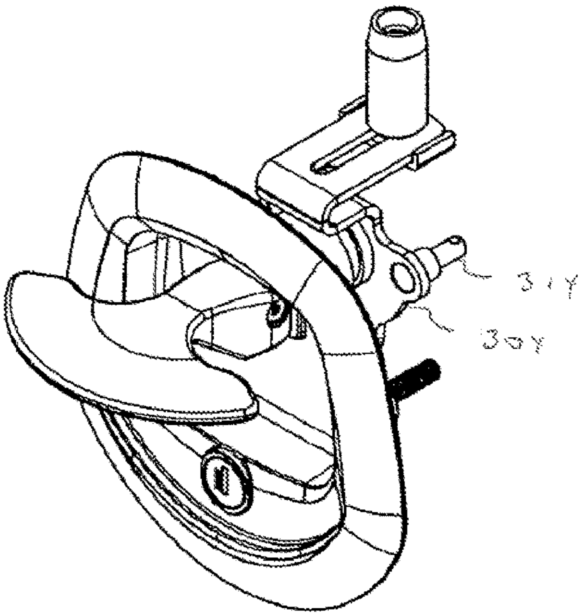
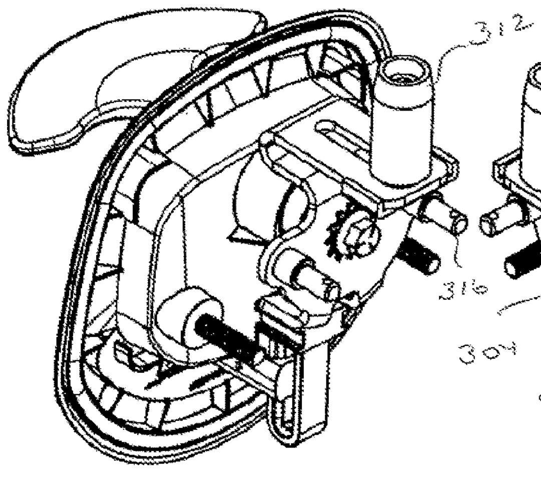
FIG 78
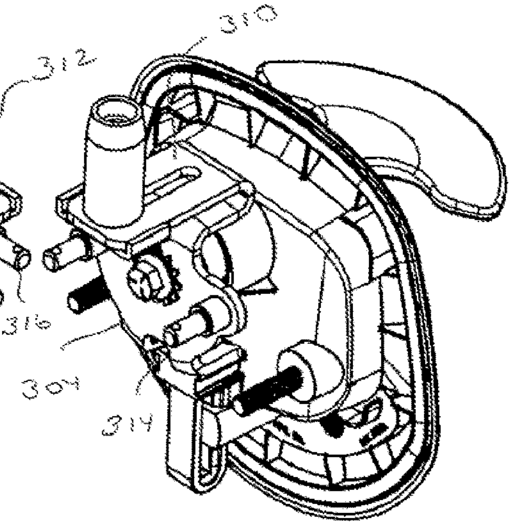
FIG 79

LATCH APPARATUS

TECHNICAL FIELD

Exemplary arrangements relate to latch apparatus that may be used to selectively hold a closure member in either a closed position or in a release position in which the closure member may be opened. Further exemplary arrangements relate to a latch apparatus that can be selectively locked to hold the closure member in the closed position, and unlocked using an authorized key or other authorized item or input.

BACKGROUND

Various forms of latch apparatus are utilized for holding movable closure members such as doors, drawers, hatches, covers or similar structures (all of which will be referred to as doors herein for purposes of brevity) in a closed position in which the door prevents or limits access to an opening to a particular compartment or area. Such latch apparatus may be selectively manipulated so as to place the associated door in a release position, in which the door is movable to enable access through the opening to the compartment or area.

Some latch apparatus are associated with a locking structure. Such a locking structure may include an integral or external lock structure that in a locked condition holds the door in the closed position. In many arrangements the lock structure may be changed from a locked condition to an unlocked condition by an individual who is authorized to change the condition of the lock structure through use of a key, token, combination, biometric input or other correct item or input which is usable to change the condition of the lock structure. Changing the condition of the lock structure from the locked condition to the unlocked condition enables the door to be in a release position and moved from a closed position to an open position.

Latch apparatus may benefit from improvements.

SUMMARY

Exemplary arrangements described herein include latch apparatus (referred to herein as a latch or latches for purposes of brevity) that can be used in conjunction with a door to control the ability of the door to be opened or closed. Exemplary arrangements relate to a latch that includes a body which has a front side and a back side. The latch includes a handle that is exposed on the front side of the latch and that is configured for manual engagement and movement.

The exemplary handle is in rotatably movable connection with a shank. The shank includes a head portion that is rotatably engaged with the handle on the front side of the body. The shank further includes a shaft portion. The shaft portion extends through a shank opening in the body. The shaft portion of the shank extends on the back side of the body in an indexing cam (IC) bore. The IC bore extends about an IC bore axis. The shaft portion of the shank is coaxial with the IC bore axis and the shank is movable both rotationally about and axially along the IC bore axis. At least one spring is operative to cause the shank to be at least one of axially and rotationally biased.

The exemplary IC bore is inwardly bounded by an annular inner IC bore wall. The annular inner IC bore wall includes a radially outward extending, axially elongated IC bore slot. An indexing cam is in fixed operative connection with the shaft portion of the shank. The indexing cam includes a radially outward extending IC projection. The indexing cam extends in the IC bore. When the handle is in a retracted position in which the handle extends generally perpendicular to the IC bore axis and the shank is in a first rotational shank position, the shank is caused to be in a first axial shank position. In such first rotational shank position and first axial shank position, the IC projection is engaged in the IC bore slot. Such engagement is operative to prevent rotational movement of the shank and the handle.

When the handle is moved from the retracted position to an extended position in which the handle extends outward from the body generally along the IC bore axis, the shank moves axially along the IC bore axis to a second axial shank position, while remaining in the first rotational shank position. In the second axial shank position the IC projection is not engaged in the IC bore slot, and the shank is rotatable through manual rotation of the handle in the extended position away from the first rotational shank position.

The exemplary shank shaft portion is in fixed operative connection with a striker. The striker is configured to be in operative connection with a door bolt. The exemplary door bolt is configured to hold a door with which the latch is associated in a closed position when the striker is in a latched rotational position, which in the exemplary arrangement corresponds to the first rotational position and first axial position of the shank. When the shank is in the second axial position, the striker may be rotated away from the latched rotational position through movement of the shank away from the first rotational shank position. With the shank rotated away from the latched position, the door bolt is moved so as to no longer hold the door associated with the latch in the closed position. This enables the door to be in a release position such that the door can be opened.

In some exemplary arrangements the latch includes a lock cylinder. The lock cylinder extends in a lock cylinder (LC) bore that includes an LC bore opening that is accessible on the front side of the body. The exemplary lock cylinder is configured to receive a correct key therein. When the correct key is positioned in engaged relation within the lock cylinder, the lock cylinder is rotatable in the LC bore. When the correct key is not positioned in engagement with the lock cylinder, the lock cylinder may be held in a fixed locked rotational position within the LC bore. In the exemplary arrangement the handle of the latch when in the retracted position, outwardly overlies the lock cylinder and the key opening therein.

In some exemplary arrangements a cam bolt is movable in operative connection with the body on the back side thereof. The exemplary cam bolt extends in at least one bolt guide opening of a bolt guide that constrains the cam bolt to move along a straight line. The exemplary cam bolt includes a distal portion that extends outside the bolt guide opening.

In an exemplary arrangement the striker includes a striker projection. The striker projection includes a bolt engagement aperture. The bolt engagement aperture is sized to receive the distal portion of the cam bolt therein when the striker is in the latched rotational position. The engagement of the distal portion of the cam bolt in the aperture prevents the striker from rotationally moving away from the latched rotational position. In the exemplary arrangement the bolt engagement aperture is sized to enable the striker to axially move with the shank while the distal portion of the cam bolt remains within the bolt engagement aperture.

In the exemplary arrangement the lock cylinder is in operative connection with the cam bolt. Rotational movement of the lock cylinder while in engagement with the correct key causes the cam bolt to move between a locked cam bolt position in which the distal portion of the cam bolt is extendable into the bolt engagement aperture, and an unlocked cam bolt position in which the distal portion is disposed away from the bolt engagement aperture. As a result in the exemplary arrangement the lock may be utilized to position the cam bolt to hold the striker in the latched rotational position such that the door bolt operatively connected with the striker holds the movable door in the closed position. Rotation of the lock cylinder through use of the correct key enables the cam bolt to be moved to no longer be engaged in the bolt engagement aperture of the striker, which enables the handle to axially and rotationally move the striker such that the striker may be rotated away from the latched rotational position. This enables movement of the door bolt so that the door is no longer held in the closed position.

In other exemplary arrangements the shank includes a tongue in operative fixed connection with the head portion of the shank. The tongue includes a tongue aperture that extends therethrough. In an exemplary arrangement the handle includes at least one handle aperture. In the retracted position of the handle the tongue aperture and the at least one handle aperture are aligned. In the exemplary arrangement the alignment of the tongue aperture and the at least one handle aperture enables a loop of a lock such as a padlock to be extended through the at least one handle aperture and the tongue aperture. In the exemplary arrangement the loop of the padlock is operative to hold the handle in the retracted position. This prevents the handle from moving the striker away from the latched rotational position. Further in exemplary arrangements that include a lock cylinder, the padlock further prevents the handle from being moved from the retracted position to an extended position so as to enable access to the lock cylinder.

Numerous additional features and relationships are used in connection with the exemplary latch arrangements that are described herein.

BRIEF DESCRIPTION OF DRAWINGS

FIG. 6 is a back top right exploded perspective view of the latch.

FIG. 58 is a rear top right exploded view of the alternative latch shown in FIG. 57.

FIGS. 72 and 73 are front top left and front top right perspective views respectively of the further alternative latch with the handle in the retracted position.

FIGS. 74 and 75 are back top right and back top left perspective views respectively of the further alternative latch with the handle in a retracted position.

FIGS. 76 and 77 are front top left and front top right perspective views respectively of the further alternative latch with the handle in an extended position.

FIGS. 78 and 79 are back top right and back top left perspective views respectively of the further alternative latch with the handle in an extended position.

FIGS. 80, 81, 82 and 83 are left side, front, top and bottom views respectively of the further alternative latch with the handle in the extended position and rotated clockwise from the position shown in FIGS. 76 and 77.

DETAILED DESCRIPTION

Figure 1:
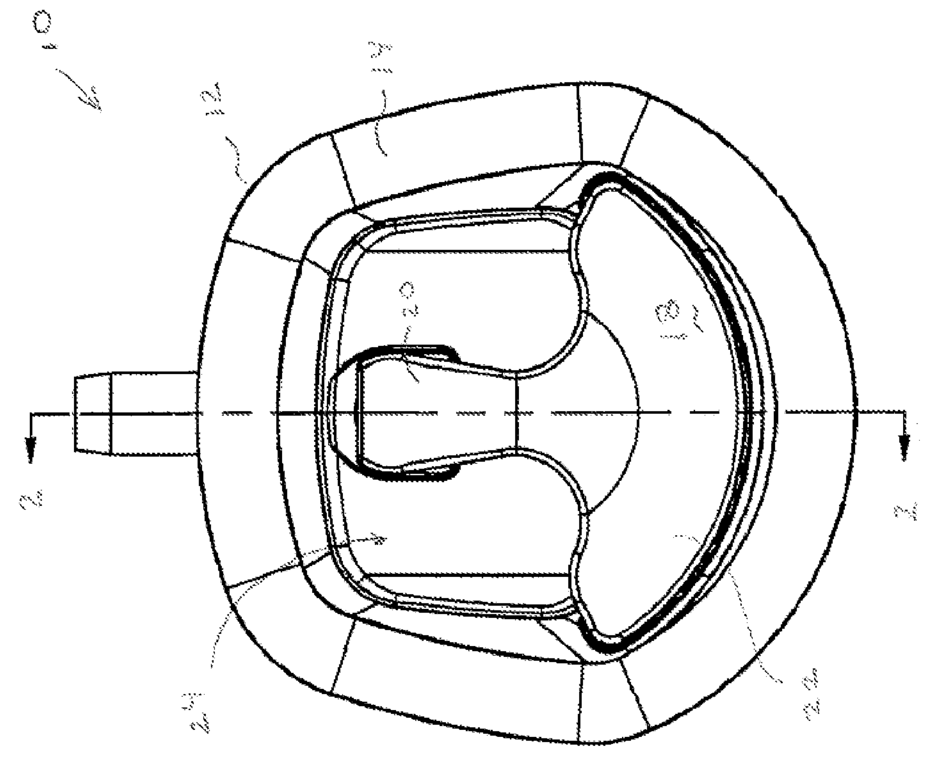
FIG. 1 is a front plan view of a latch of an exemplary arrangement with the handle of the latch shown in a retracted position.

Referring now to the drawings and particularly to FIG. 1 there is shown therein an exemplary arrangement of the latch generally indicated 10. The latch includes a body 12. The exemplary body 12 includes a front side 14. The front side includes the outer surfaces of the latch which are generally visible when the latch is mounted to a door or other supporting surface, and the door is in a closed position. The latch further includes a back side 16. The back side 16 includes the inside surfaces of the latch that are generally not externally visible when the door or other member to which the door is mounted is in a closed position.

The exemplary latch further includes a manually engageable handle 18. The exemplary handle is generally T shaped. The handle 18 includes a central stem portion 20 and a wider fin portion 22. The exemplary body 12 includes a recess 24 on the front side 14. In the exemplary arrangement the recess 24 includes a deep portion 26 and the shallow portion 28. The handle 18 extends in the recess and in a retracted position of the handle shown in FIGS. 1 and 2, the handle partially overlies the deep portion 26 and the shallow portion 28. Of course it should be understood that this arrangement is exemplary and other arrangements other configurations may be used.

Figure 4:
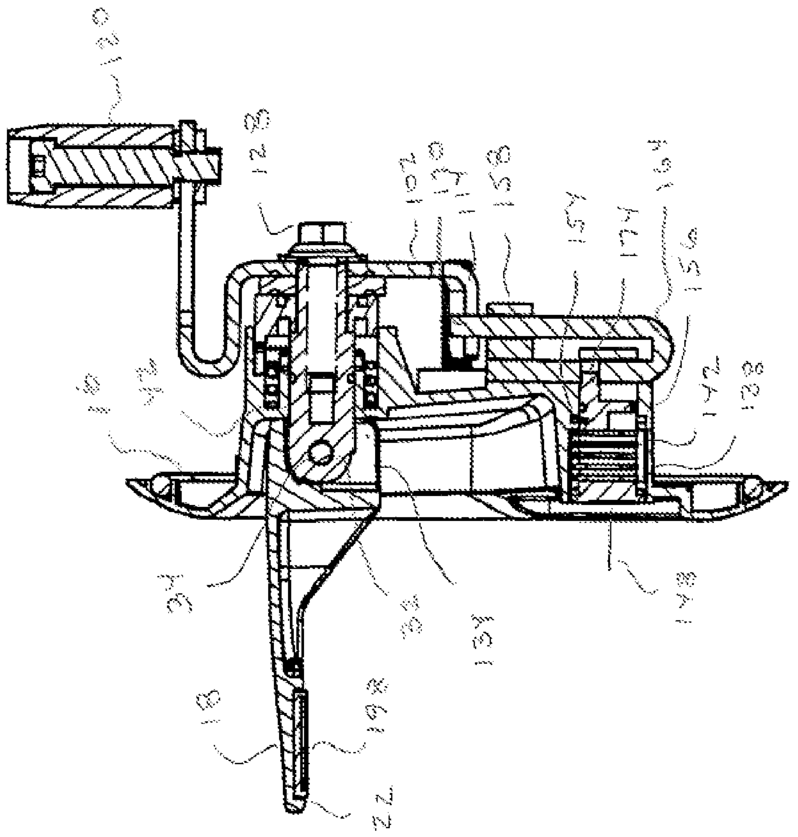
FIG. 4 is a cross-sectional view taken along line 4-4 in FIG. 3.
Figure 3:
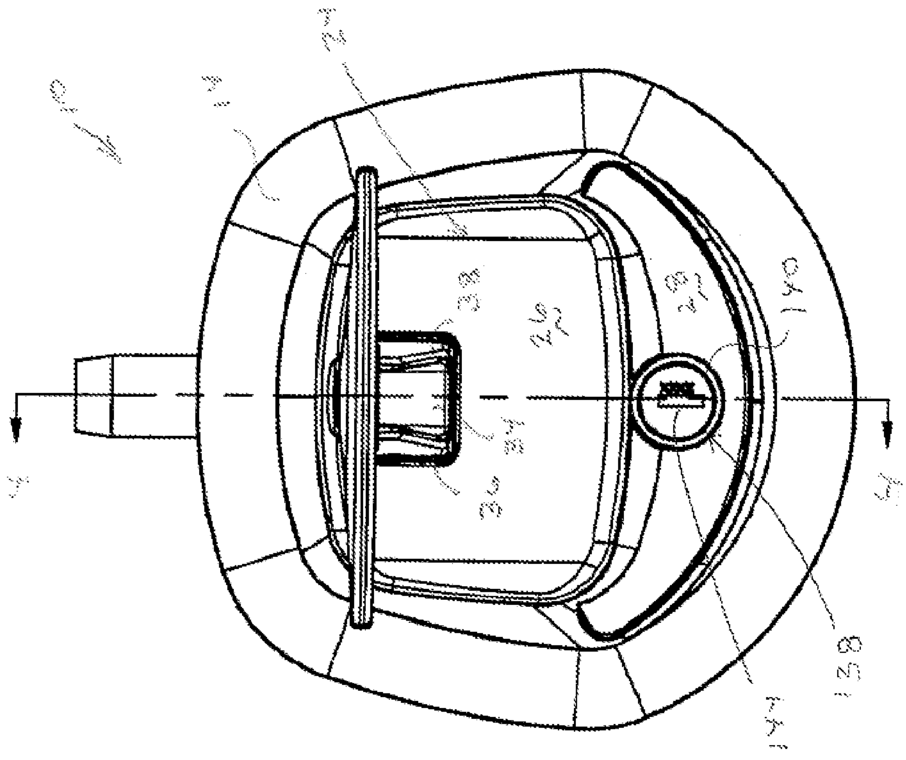
FIG. 3 is a front plan view of the latch shown with the handle an extended handle position.
Figure 5:
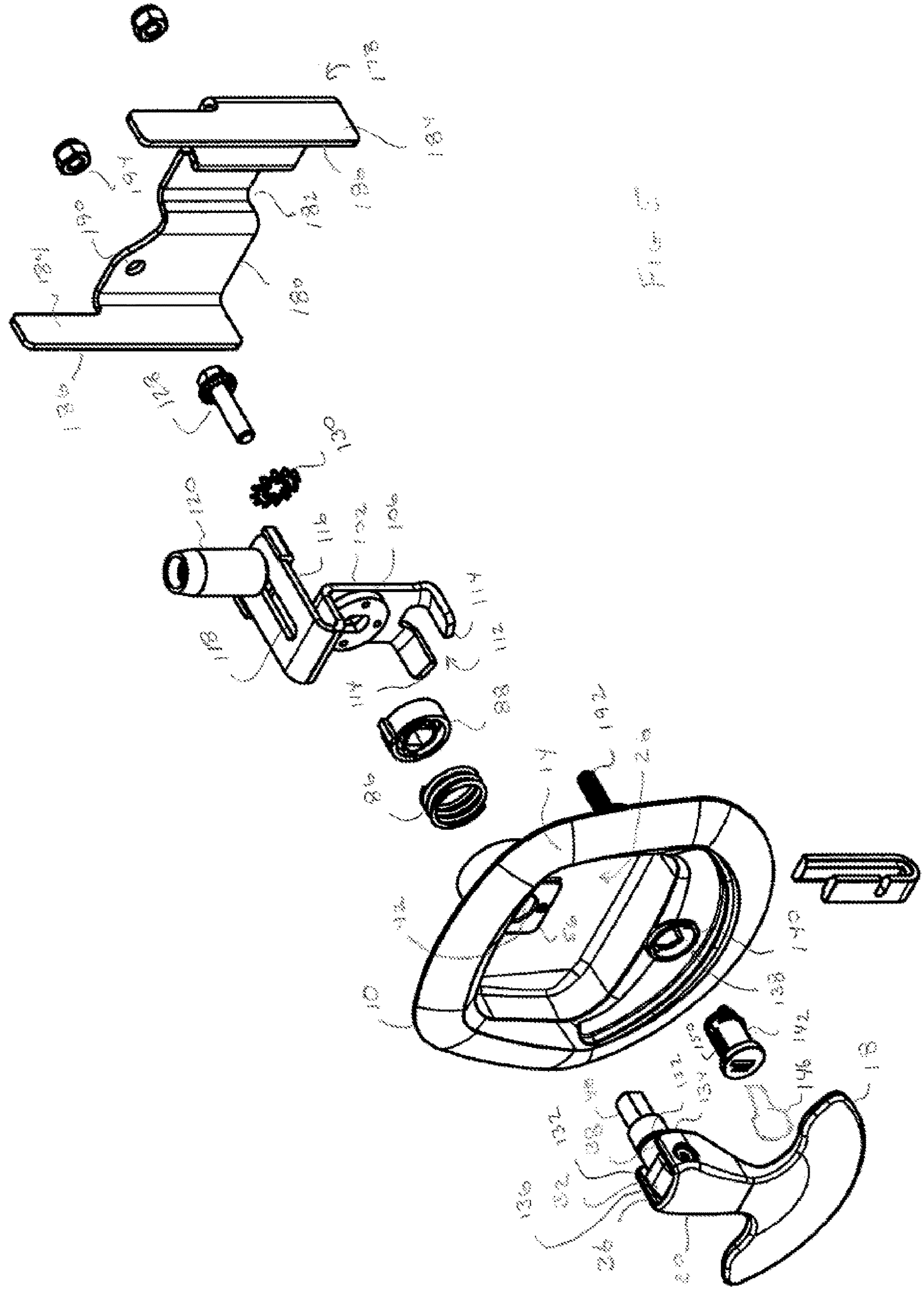
FIG. 5 is a front top right exploded perspective view of the latch.
Figure 4:
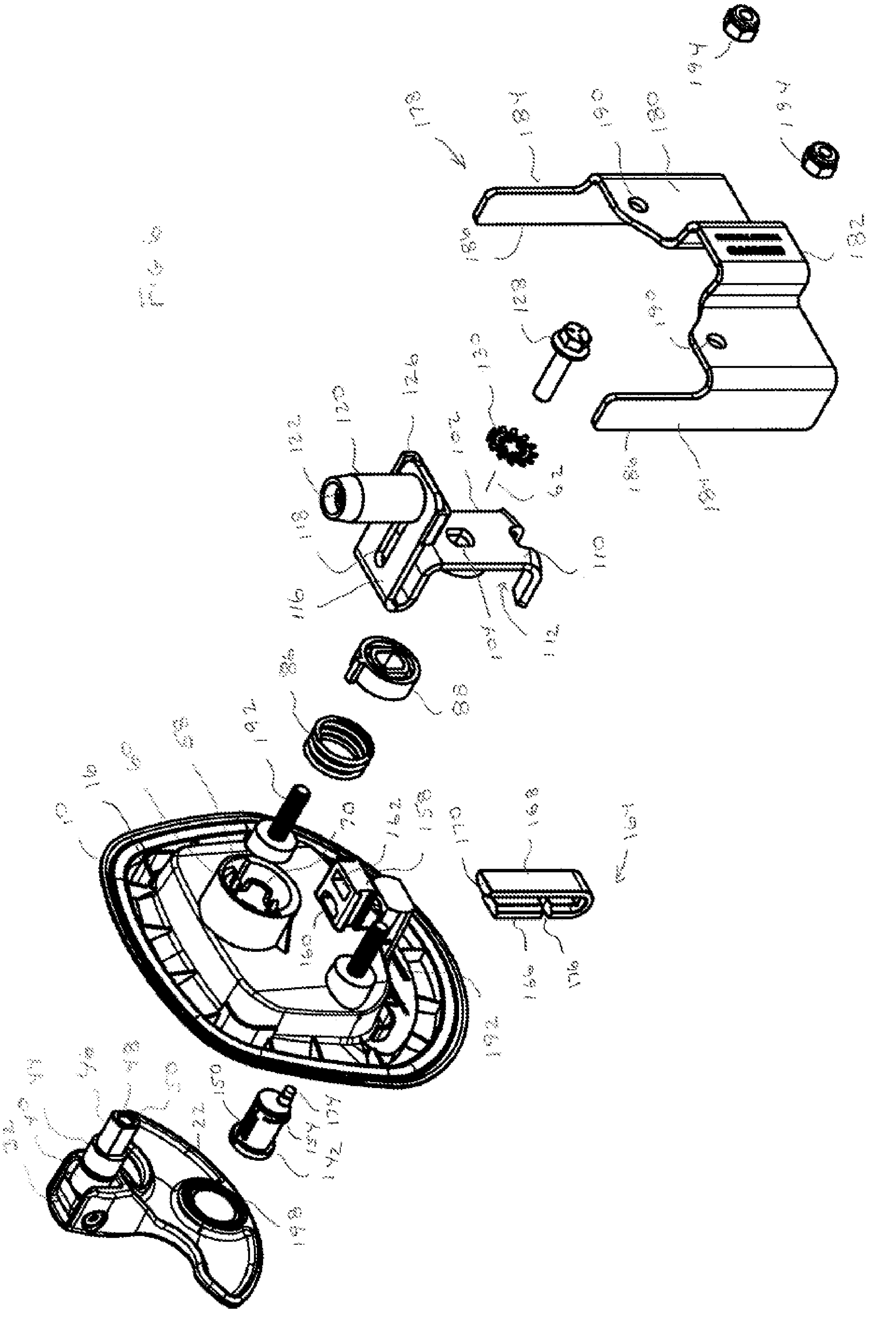

The handle 18 is in rotatably movable connection with a shank 30. The shank 30 includes a head portion 32. The stem portion 20 of the handle is rotatably engaged to the head portion of the shank through a pivot pin 34. In the exemplary arrangement the handle 18 is rotatably movable about the head portion of the shank between the retracted position shown in FIG. 1 and the extended position as shown in FIG. 4. As shown in FIGS. 3, 5 and 6, the exemplary stem portion 20 includes a pair of spaced side walls 36 and 38. The head portion 32 of the shank 30 extends in intermediate relation between the side walls 36, 38. The pivot pin 34 extends through an opening in the head portion and the openings in each of the side walls. In the exemplary arrangement the configuration of the stem portion 20 and the handle 18 is configured to prevent access to the pivot pin and the shank when the handle is in the retracted position.

The exemplary shank 30 further includes a shaft portion 40. The shaft portion 40 extends through a shank opening 42 that extends through the body between the front side 14 and the back side 16. In the exemplary arrangement the head portion 32 of the shank is larger than the shaft portion 40 which serves to maintain the head portion on the front side of the shank opening 42. The shaft portion 40 of the shank includes a cylindrical portion 44 which extends rearward from the head portion 32. The shaft portion 40 includes and terminates inwardly in a smaller flattened portion 46. The shank includes a threaded opening 48 at its inward end 50.

The exemplary shaft portion 40 includes an annular recess 52 therein. A resilient ring 54 extends in the annular recess 52. The resilient ring 54 of the exemplary arrangement provides a rotatable watertight seal on the shank to prevent the infiltration of moisture and other contaminants from the front side to the back side of the latch in a manner later discussed. Also as shown in FIG. 5 for example, the front side in the area of the deep portion 26 includes a handle cam follower surface 56. The exemplary handle cam follower surface 56 extends outward on the front side in generally surrounding relation of the shank opening 42 for purposes that are later discussed.

Figure 22:
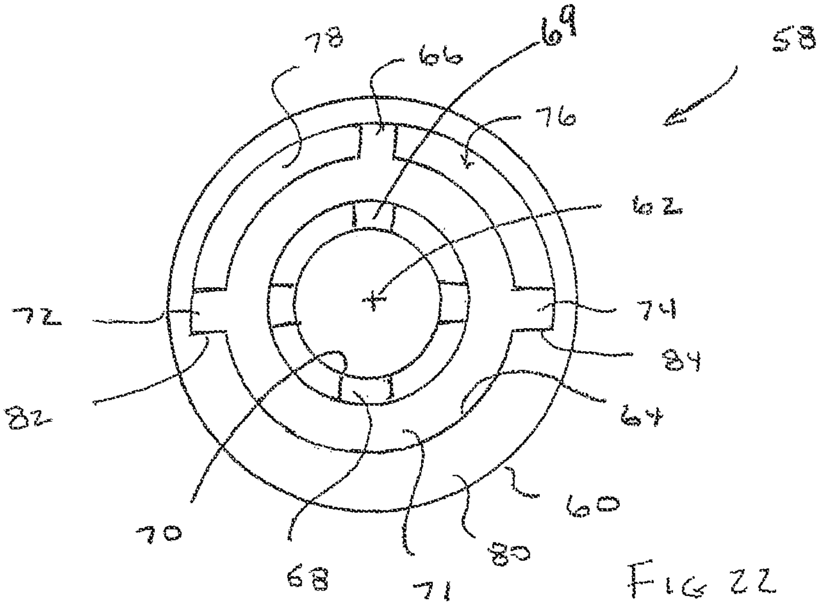
FIG. 22 is a back plan view of the exemplary indexing cam bore.
Figures 23, 24, 25, 26, 27, 28, 29, 30:
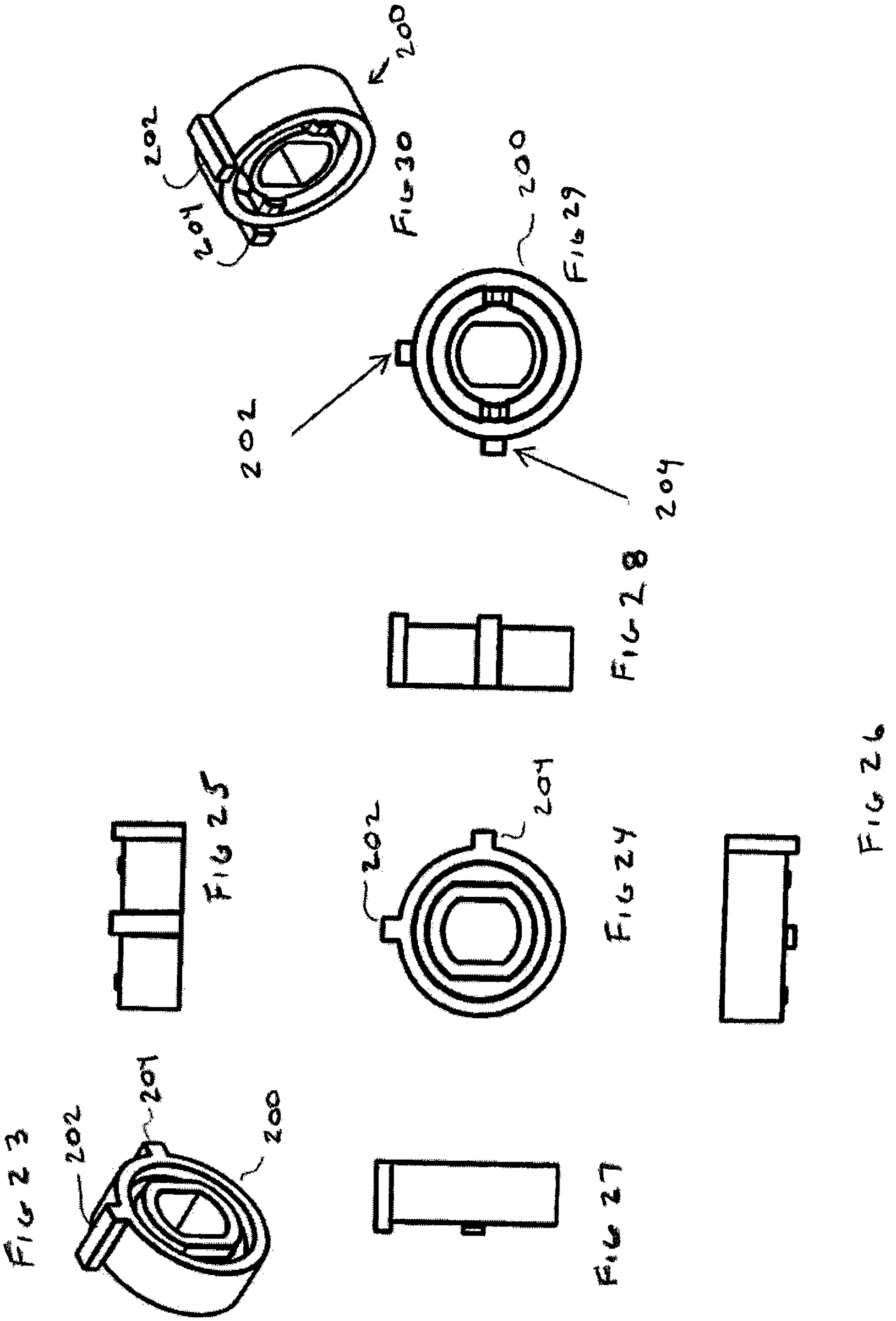
FIG. 23 is a back top right perspective view of an alternative indexing cam.
FIG. 24 is a back view of the alternative indexing cam.
FIG. 25 is a top view of the alternative indexing cam.
FIG. 26 is a bottom view of the alternative indexing cam.
FIG. 27 is a right side view of the alternative indexing cam.
FIG. 28 is a left side view of the alternative indexing cam.
FIG. 29 is a front view of the alternative indexing cam.
FIG. 30 is a top front right perspective view of the alternative indexing cam.
Figure 38:
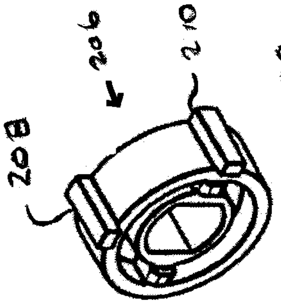
FIG. 38 is a top front right perspective view of the further alternative indexing can.
Figure 37:
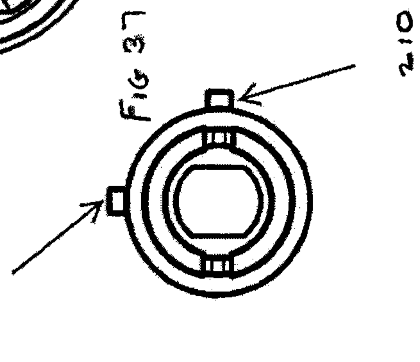
FIG. 37 is a front view of the further alternative indexing cam.
Figure 36:
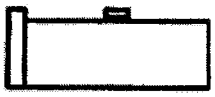
FIG. 36 is a left side view of the further alternative indexing cam.
Figure 33:
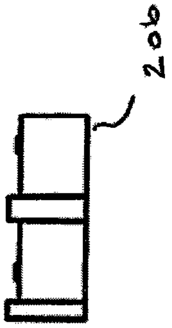
FIG. 33 is a top view of the further alternative indexing cam.
Figure 32:
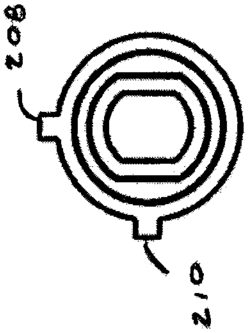
FIG. 32 is a back view of the further alternative indexing cam.
Figure 34:
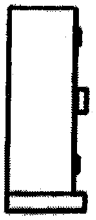
FIG. 34 is a bottom view of the further alternative indexing cam.
Figure 31:
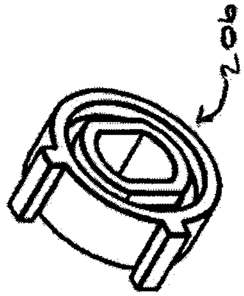
FIG. 31 is a back top right perspective view of a further alternative indexing cam.
Figure 35:
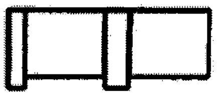
FIG. 35 is a right side view of the further alternative indexing cam.
Figure 39:
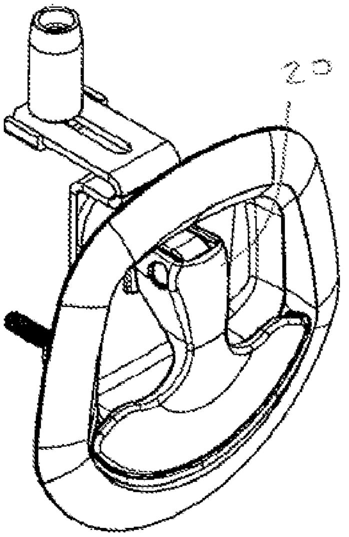
FIGS. 39 and 40 are left and right top front perspective views respectively of the exemplary latch with the handle in a retracted position.
Figure 40:
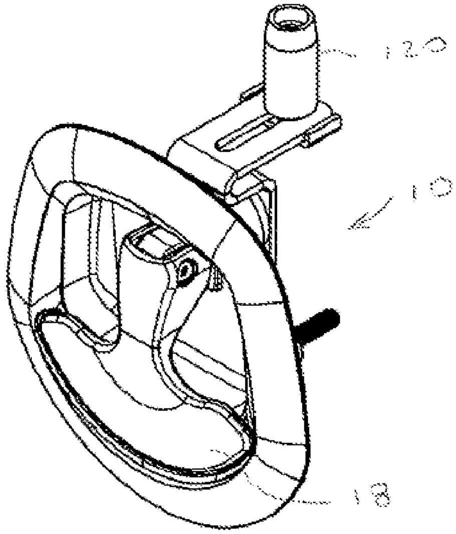
Figure 41:
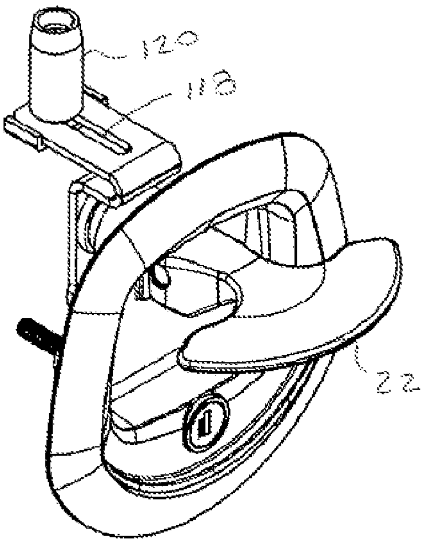
FIGS. 41 and 42 are left and right top front perspective views respectively of the exemplary latch with the handle in an extended position.
Figure 42:
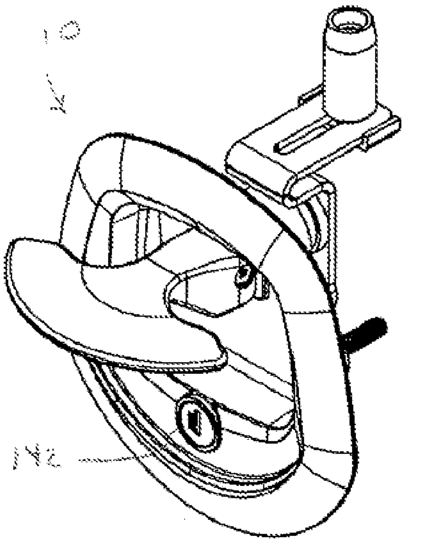
Figure 43:
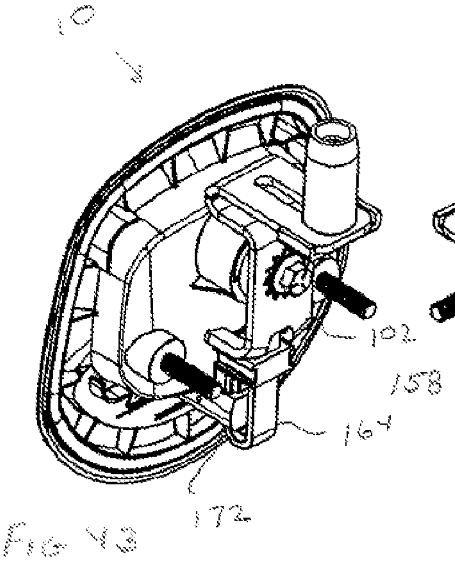
FIGS. 43 and 44 are left and right top rear perspective views respectively of the exemplary latch with the handle in a retracted position and the latch in a locked condition.
Figure 44:
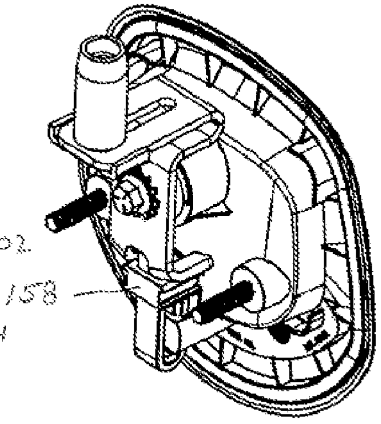
Figure 45:
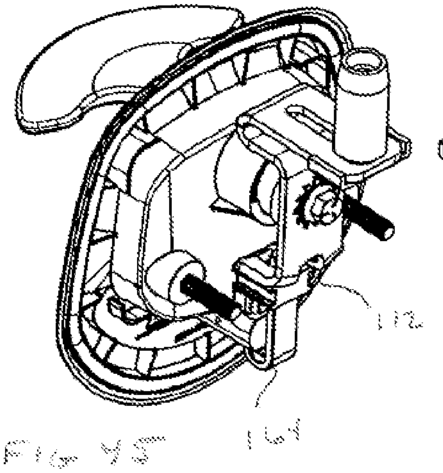
FIGS. 45 and 46 are left and right top rear perspective views respectively of the exemplary latch with the handle in an extended position and the latch in a locked condition.
Figure 46:
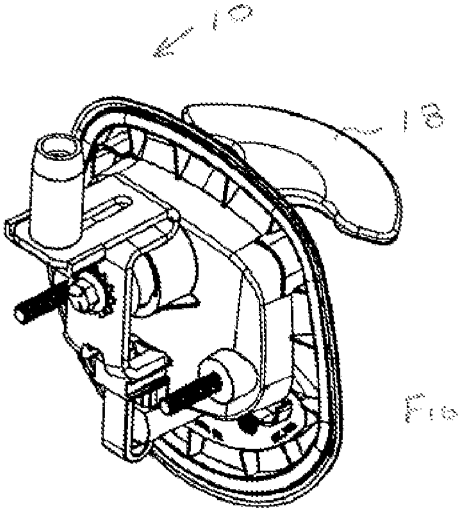
Figure 47:
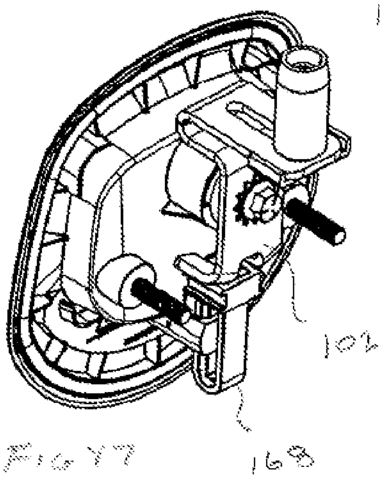
FIGS. 47 and 48 are left and right top rear perspective views respectively of the exemplary latch with the handle in a retracted position and the latch in an unlocked condition.
Figure 48:
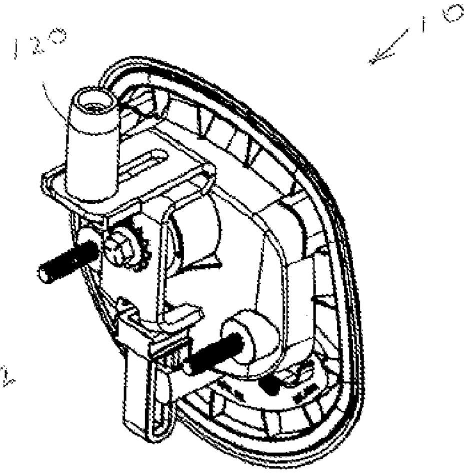
Figure 49:
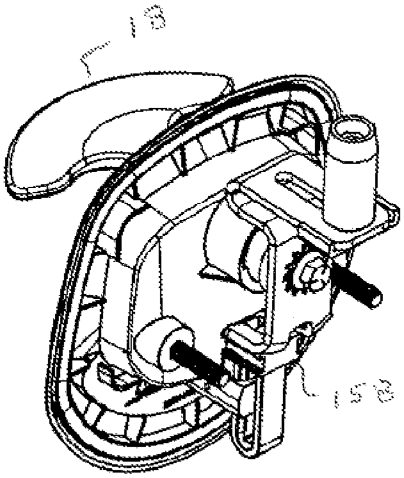
FIGS. 49 and 50 are left and right top rear perspective views respectively of the exemplary latch with the handle in an extended position in the latch in an unlocked condition.
Figure 50:
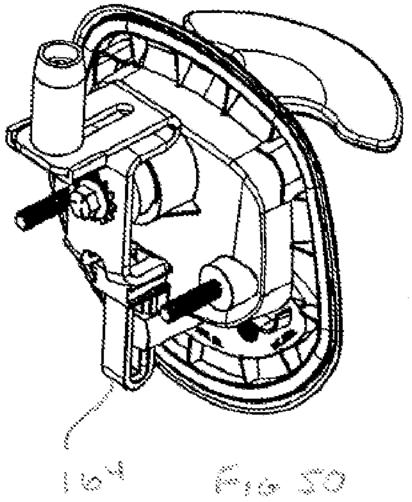

An indexing cam (IC) bore 58 extends in operative fixed relation with the body 12 on the back side 16 thereof. The IC bore 58 is bounded by an annular outer wall 60. As best shown in FIG. 22, IC bore 58 extends in centered relation about an IC bore axis 62. The IC bore axis is in aligned relation with the shank opening 42. The IC bore 58 is bounded by an annular inner IC bore wall 64. Annular inner IC bore 64 wall includes an IC bore slot 66 therein. The exemplary IC bore slot 66 extends radially outward and is axially elongated in parallel relation along the IC bore axis 62.

An inside bore annular wall 68 extends concentrically and is radially disposed inwardly from the annular inner IC bore wall. The inside bore annular wall includes an inner annular surface 70 through which the cylindrical portion 44 of the shank extends in close-fitting relation. The resilient ring 54 extends in radially intermediate relation between the outer annular surface of the cylindrical portion and the inner annular surface 70 so as to assure a movable sealed engagement of the cylindrical portion of the shank. In the exemplary arrangement the inside bore annular wall 68 does not extend rearwardly on the body as far as the annular inner IC bore wall 64. An annular recess 71 extends in surrounding relation of the inside bore annular wall 68 and the annular inner IC bore wall 64. The annular recess is closed at a forward end. In an exemplary arrangement the inside bore annular wall terminates rearwardly in a castellated inner surface within the IC bore which includes four radially extending recesses 69 that are disposed from one another at generally 90° angles.

In the exemplary arrangement the IC bore includes a further outward extending IC bore slot 72. The further IC bore slot 72 extends radially outward from the annular inner IC bore wall 64 and is axially elongated similar to IC bore slot 66. Further IC bore slot 72 is disposed in a first rotational direction from IC bore slot 66 which in the exemplary arrangement shown FIG. 22 is counterclockwise. In the exemplary arrangement the further IC bore slot 72 is disposed at a first angle about the IC bore axis of generally about 90°. An additional IC bore slot 74 extends radially outward in annular inner IC bore wall 64. Additional IC bore slot 74 is axially elongated in a manner similar to IC bore slot 66. Additional IC bore slot 74 is positioned in a second rotational direction opposed of the first rotational direction relative to the further IC bore slot, which is shown as clockwise in FIG. 22. The additional IC bore slot 74 is disposed at a second angle relative to the IC bore slot which in the exemplary arrangement shown is generally about 90°. Thus in the exemplary arrangement each of further IC bore slot 72 and additional IC bore slot 74 are each disposed from IC bore slot 66 at generally 90°, and in opposite directions. For purposes of this disclosure generally about 90° or generally perpendicular shall be construed to mean 90° plus or minus 20°.

In the exemplary arrangement an arcuate recess 76 extends between IC bore slot 66 and each of further IC bore slot 72 and additional IC bore slot 74. The arcuate recess 76 extends forwardly in the IC bore on the back side and parallel to the IC bore axis 62. The arcuate recess 76 is bounded forwardly by a radially extending surface 78 that is disposed axially inwardly from an inner radially extending wall 80 which rearwardly bounds the annular outer wall 60. The arcuate recess 76 terminates in a counterclockwise direction as shown in FIG. 22 at the wall bounding the further IC bore slot which serves as a stop 82 in a manner that is later discussed. The arcuate recess 76 terminates in a clockwise direction as shown in FIG. 22 at the wall bounding the additional IC bore slot 74 which serves as a further stop 84 as later discussed. Of course it should be understood that this arrangement is exemplary and in other arrangements other configurations may be used.

Figures 14, 15, 16, 17, 18, 19, 20, 21:
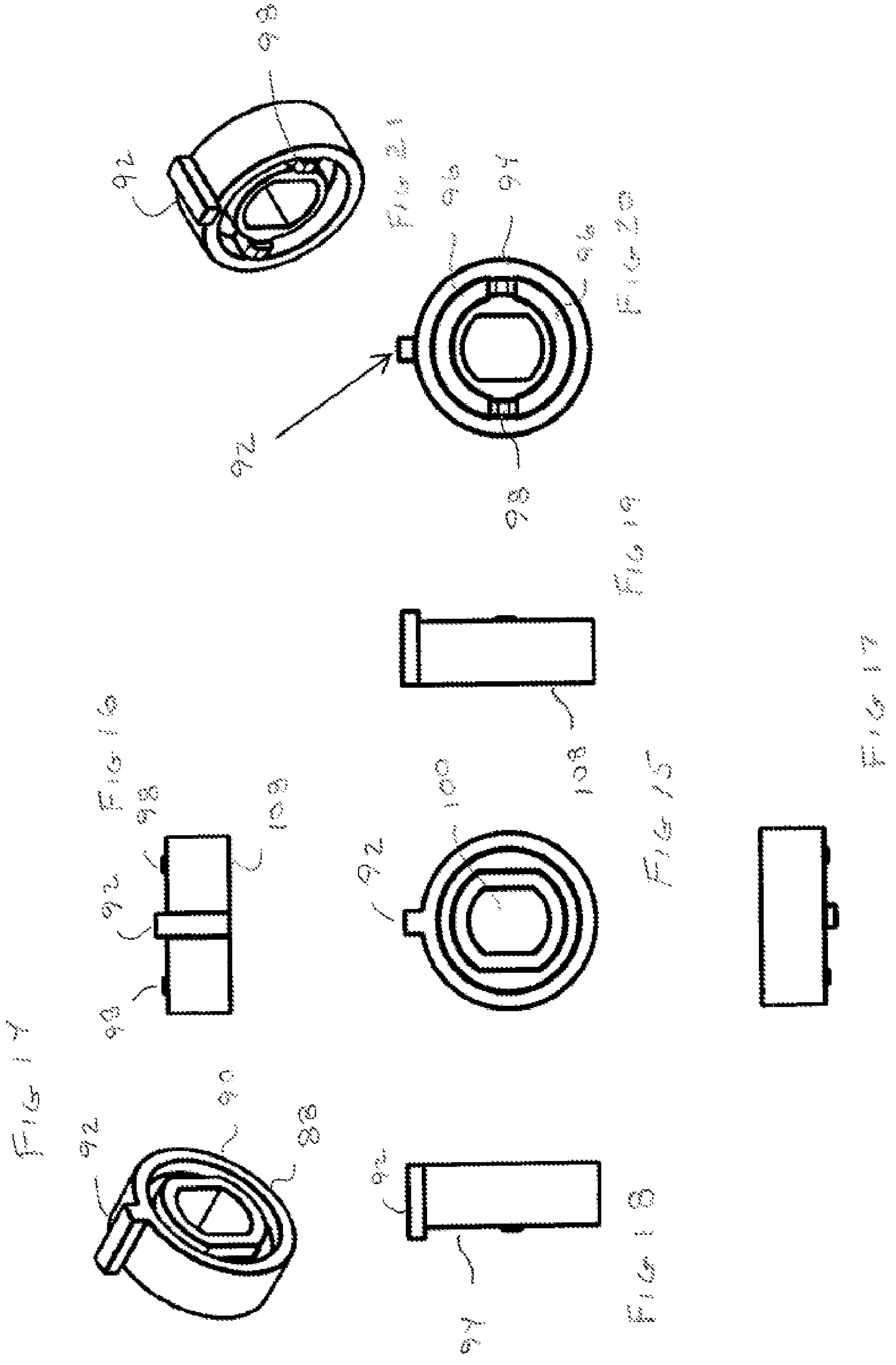
FIG. 14 is a back top right perspective view of an exemplary indexing cam.
FIG. 15 is a back view of the indexing cam.
FIG. 16 is a top view of the indexing cam.
FIG. 17 is a bottom view of the indexing cam.
FIG. 18 is a right side view of the indexing cam.
FIG. 19 is a left side view of the indexing cam.
FIG. 20 is a front view of the indexing cam.
FIG. 21 is a front top right perspective view of the indexing cam.

At least one spring is operative to cause the shank to be biased. A compression spring 86 extends in the annular recess 71. An indexing cam 88 is positioned rearwardly of the spring 86. An exemplary indexing cam 88 is shown in greater detail in FIGS. 14 through 21. The indexing cam 88 has a generally cylindrical body 90. An IC projection 92 extends radially outward from a cylindrical body surface. As shown in FIGS. 17 through 19 for example, the IC projection 92 extends in a forward direction radially outward from a front surface 94 of the cylindrical body. A pair of opposed half circular recesses 96 extend rearward in the front surface 94 of the body. A pair of opposed walls 98 separate that half circular recesses 96. As shown in FIGS. 17 and 21 for example, the walls 98 extend forwardly of the front surface 94.

The indexing cam 88 further includes an oblong aperture 100. The configuration of aperture 100 corresponds to the flattened portion 46 of shank 30. As a result aperture 100 is enabled to receive the flattened portion therein and engage shank 30 in fixed operative rotatable connection.

In the exemplary arrangement the walls 98 of the indexing cam 88 serve as projections and are each arranged at generally about 90° from the IC projection 92. This configuration corresponds to the configuration of the IC bore slot and the recesses 69 in the castellated upper surface of inside bore annular wall 68. In the exemplary arrangement IC projection 92 is configured to extend in engaged relation in each of IC bore slot 66, as well as further IC bore slot 72 and additional IC bore slot 74.

The recesses 69 in the castellated upper surface of the inside bore annular wall 68 enable the walls 98 to extend in a respective corresponding recess 69 when the IC projection 92 is engaged in one of slots 66, 72 or 74. Thus as later discussed in more detail, the exemplary IC projection 92 is enabled to be rotated into alignment with one of slots 66, 72 or 74, and then moved axially forwardly into the bore such that the IC projection is engaged in a respective one of the slots. When the IC projection is engaged in a respective slot, walls 98 are in interengaging relation with respective recesses 69 and rotational movement of the indexing cam 88 and the shank to which it is attached, within the IC bore 58 is prevented. Further in the exemplary arrangement the forward extending portion of IC projection 92 that extends forward beyond the front surface 94 is operative to radially outwardly overlie the outer circumference of the spring 86. Further the forward projections of walls 98 that extend beyond the front surface 94 are operative to extend radially interiorly of the coils of the spring 86. Thus the forward portion of the IC projection and forward extending walls 98 are operative to engage and position spring 86 in its proper orientation relative to the indexing cam 88. Of course it should be understood that this orientation is exemplary and in other arrangements other approaches may be used.

The exemplary latch further includes a striker 102. The exemplary striker includes an aperture 104 therethrough. The aperture is configured to have the flattened portion 46 of the shank 30 extend therein in close-fitting relation. As a result the striker is in fixed operative rotatable connection with the shank 30. The exemplary striker 102 further includes a disc shaped spacer portion 106 attached thereto. The spacer portion 106 is operative to engage a rear surface 108 of cam 88 in abutting relation. The exemplary striker further includes a striker projection 110. The striker projection 110 extends radially outward from the IC bore axis 62 about which the shank 30 and the striker is rotatable. The striker projection includes a bolt engagement aperture 112. The exemplary bolt engagement aperture 112 comprises an opening that extends both axially and radially that is bounded by a pair of axially forward extending arms 114.

Figure 7:
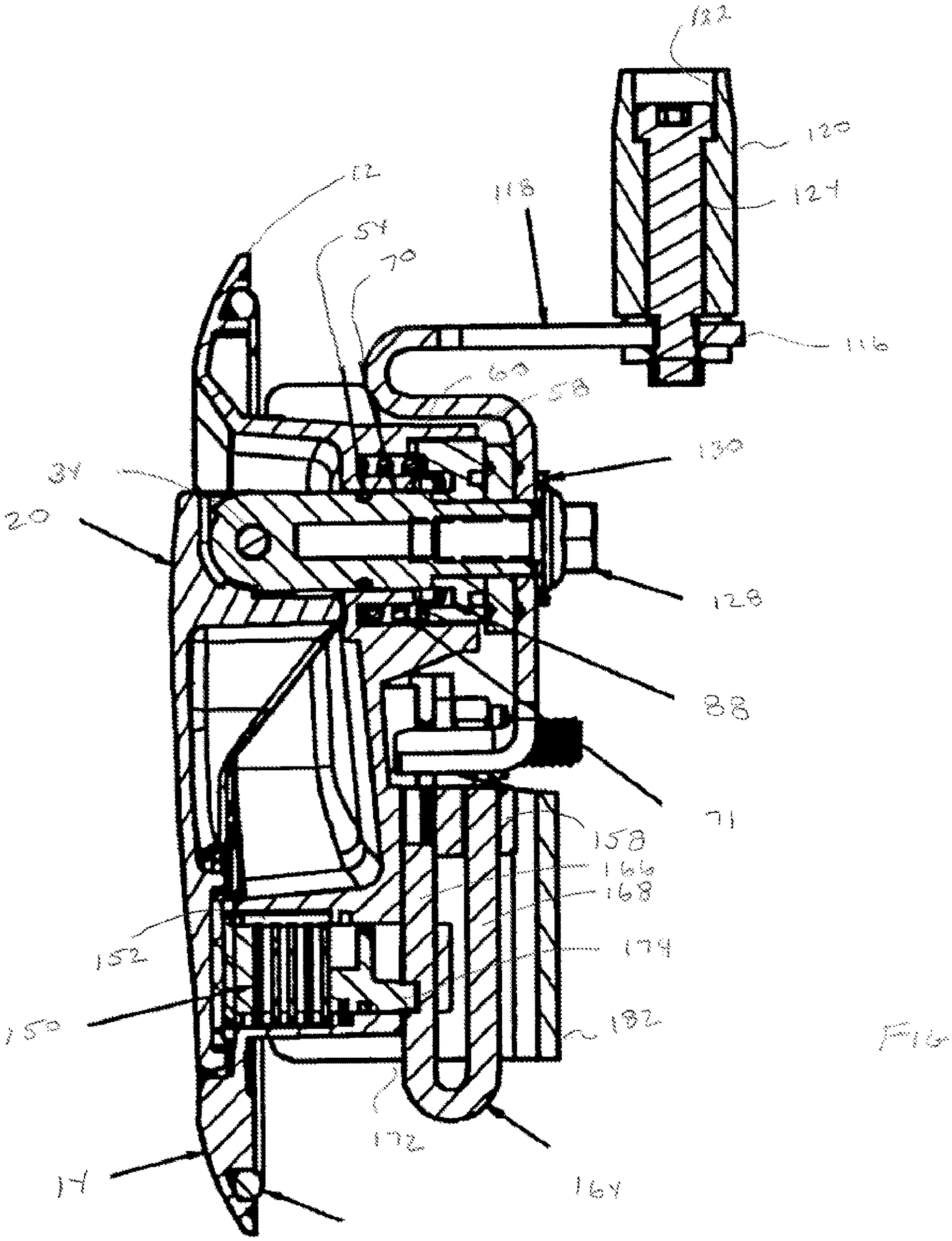
FIG. 7 is a cross-sectional view of the latch.

The exemplary striker further includes a bolt adjustment support arm 116. The exemplary bolt adjustment support arm includes an axially elongated slot 118. In the exemplary arrangement a movable door bolt 120 extends radially outwardly from the support arm 116. The exemplary door bolt 120 includes an opening 122 therein which is configured to accept a fastener 124 therein. As shown in FIG. 7 fastener 124 extends through the slot 118 in the support arm 116 and engages a threaded opening in a slideable backing plate 126. As later further discussed the exemplary arrangement enables the door bolt 120 to be selectively positioned along the slot in the bolt adjustment support arm so as to properly engage a latch plate or similar structure that is engaged by the door bolt 120 when an associated door is to be held in a closed position by the door bolt. Of course this arrangement is exemplary and in other arrangements other approaches may be used.

In the exemplary arrangement a bolt 128 threadably engages the threaded opening 48 at the inward end 50 of the shank. In the exemplary arrangement a locking washer 130 is positioned between the head of the bolt 128 and the rear surface of the striker 102 so as to assure that the striker remains in fixed operative rotatable connection with the shank. Of course it should be understood that this arrangement is exemplary and in other arrangements other approaches may be used.

The exemplary handle 18 is configured so that the side walls 36 and 38 each include a curved contoured handle cam surface 132. Each handle cam surface is configured to slidably engage handle cam follower surface 56 that is adjacent to the shank opening 42. Each handle cam surface 132 is bounded on a first lateral side by a land surface 134 and on a second lateral side by a land surface 136. In the exemplary arrangement each of the land surfaces 134 and 136 comprise generally flat linear face surfaces which are configured to abuttingly engage with handle cam follower surface 56.

Figure 2:
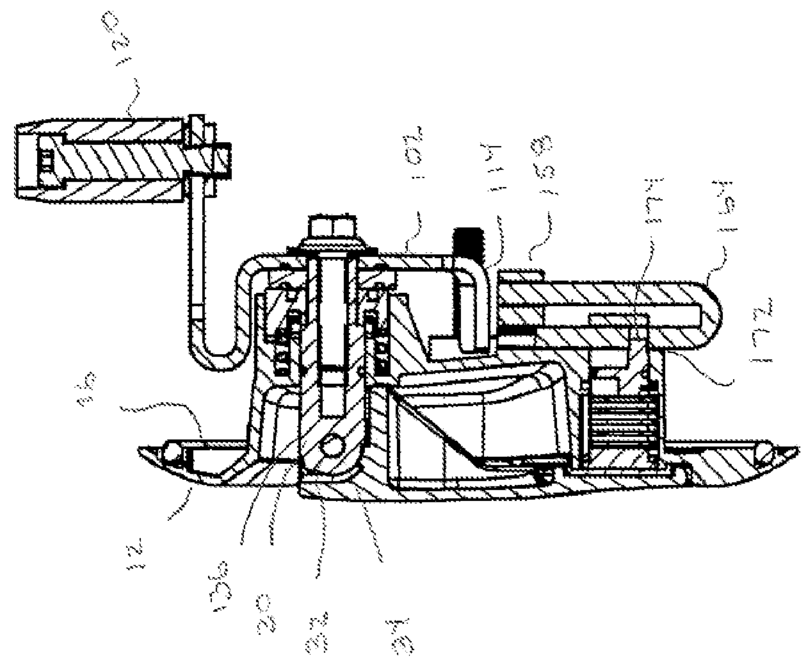
FIG. 2 is a cross-sectional view taken along line 2-2 in FIG. 1.

In the exemplary arrangement when the handle 18 is in the retracted position such as is shown in FIGS. 1, 2 and 7, land surface 134 is in abutting engagement with the handle cam follower surface 56. As the handle 18 is manually moved outward and upward from the retracted position shown in FIGS. 1 and 2 to the extended position shown in FIGS. 3 and 4, the handle cam surfaces 32 slide in engagement with the handle cam follower surface 56 until the handle is rotated to the extended position in which land surface 136 is in abutting engagement with the cam follower surface. As the handle is moved between the retracted and extended positions the cam surfaces and land surfaces are biased into engagement with the cam follower surface by spring 86.

As can be appreciated because the exemplary handle cam follower surface 56 and land surfaces 134 and 136 are generally flat, the handle remains stably positioned in each of the retracted and extended positions. Further because the pivot pin 34 in engagement with the side walls 36 and 38 is positioned further away from land surfaces 134 than from land surfaces 136, the shank 30 as well as the attached striker 102 are disposed in a first axial position when the handle 14 is in a retracted position. The first axial position of the shank and connected striker is axially forward relative to a second axial position in which the shank 30 and striker 102 are positioned when the handle is in the extended position. This enables the exemplary arrangement to provide the securing function which holds the shank and attached striker in a rotational position that is set by the user.

In the exemplary arrangement when the handle 18 is in the retracted position shown in FIG. 1, the IC projection 92 of the indexing cam 88 is in a first rotational position in which the IC projection is in aligned relation with the IC bore slot 66. Further because in the retracted position of the handle the shank 30 and the attached indexing cam 88 are in the first axial position, the IC projection 92 is engaged within the IC bore slot 66. Thus in this arrangement the engagement of the IC projection in the slot prevents rotational movement of the shank 30 and the handle 18 about the IC bore axis.

When the handle 18 is moved from the retracted position shown in FIG. 1 in which the handle extends generally perpendicular to the IC bore axis along which the shank extends, to the extended position shown in FIG. 3 in which the handle extends generally along the IC bore axis, the change moves the shank from the first axial position to the second axial position which is axially rearward of the first axial position. The shank is caused to be biased toward the second axial position by the spring 86. In the second axial position the IC projection 92 is outside of the IC bore slot 66. In the second axial position the shank 30 can be rotated via movement of the handle away from the first rotational position of the shank. In the exemplary arrangement the shank is rotated with the forward portion of the IC projection 92 engaged in the arcuate recess 76. This enables the handle to be rotated in either the clockwise or counterclockwise direction until rotation of the indexing cam 88 is stopped by engagement of the IC projection 92 with either stop 82 or stop 84. As a result, the door bolt 120 is enabled to rotationally move with the striker 102 so that the door bolt may disengage from a latch plate or similar structure that holds a door with which the latch is associated, in a closed position. Thus this arrangement selectively enables the latch to be selectively changed between a position holding the door in a closed position, and a position enabling the door to be opened.

The exemplary latch 10 further includes on the front side thereof a lock cylinder (LC) bore 138. The LC bore 138 includes an LC bore opening 140 that in the exemplary arrangement is positioned in the shallow portion 28 of the recess 24. A lock cylinder 142 is positioned in the LC bore 138. The lock cylinder 142 includes a key opening 144. The key opening 144 is configured to accept a correct key 46 therein. The LC bore 138 extends about an LC bore axis 148.

The exemplary lock cylinder 142 includes a plurality of movable projections 150 thereon. The movable projections 150 are configured to engage in a recess 152 when the proper key 146 is not engaged in the lock cylinder 142. As a result when the proper correct key is not engaged in the exemplary lock cylinder, the lock cylinder is held in the LC bore 138 in a fixed locked rotational position. However when the correct key is engaged in the lock cylinder, the lock cylinder is rotatably movable in the LC bore 138 about the LC bore axis 148. Further in the exemplary arrangement the lock cylinder includes thereon an at least partially circumferential outwardly biased lock cylinder spring 154. The LC bore 138 includes an annular bore slot 156. The bore slot 156 is configured to receive the cylinder spring 154 in engaged relation when the lock cylinder 142 is positioned in the LC bore, and to enable the spring 154 to move rotationally with the lock cylinder within the bore slot 156.

In the exemplary arrangement the engagement of the spring 154 in the bore slot 156 is operative to hold the lock cylinder in engaged relation in an axially proper operative position within the lock cylinder bore. Further in an exemplary arrangement, a release aperture is provided transversely through the LC bore from the back side of the body to the annular bore slot 156. In an exemplary arrangement a release pin is enabled to be extended through the release aperture to engage the spring 154 and compress the spring so that the lock cylinder may be removed from the LC bore 138. This enables the lock cylinder to be changed so that the lock can be opened in response to engagement with a desired correct key. Of course it should be understood that this approach is exemplary and in other arrangements other approaches may be used.

In an exemplary arrangement a bolt guide 158 is positioned in operatively fixed connection with the back side of the body 12. In the exemplary arrangement the bolt guide 158 includes a pair of laterally spaced generally rectangular openings 160, 162. A cam bolt 164 is configured to move in engaged guided relation with the bolt guide 158. In the exemplary arrangement the cam bolt 164 is a generally U-shaped member that includes a first leg 168 and a second leg 166. The first and second legs are generally rectangular in transverse cross section. In the exemplary arrangement the first leg 168 is configured to move linearly along a straight line direction in engaged relation with bolt guide opening 162. A straight line direction is alternatively referred to herein as a straight linear direction. The second leg 166 is configured to move along the straight line direction in engaged relation with bolt guide opening 160. In the exemplary arrangement the first leg 168 of cam bolt 164 extends further upwardly from the bottom of the curved portion of the cam bolt and terminates upwardly in a distal portion 170.

In the exemplary arrangement the LC bore includes a leg guide opening 172 therethrough. The leg guide opening 172 extends through the interior of the LC bore 138. The leg guide opening 172 is aligned along the straight line direction with the bolt guide opening 160. In the exemplary arrangement the second leg 166 of the cam bolt 164 extends through the leg guide opening and in the bolt guide opening 160.

In the exemplary arrangement an eccentric projection 174 is in operative connection with the lock cylinder. The eccentric projection extends parallel to the LC bore axis 148 and is transversely disposed from the axis. The eccentric projection 174 is rotationally movable within the LC bore in coordinated relation with rotation of the lock cylinder. The second leg 166 of the cam bolt 164 includes therein a cam bolt recess 176. The cam bolt recess 176 extends laterally in the second leg 166 and is sized to receive the eccentric projection 174 in engaged relation therein.

In the exemplary arrangement the engagement of the eccentric projection and the second leg 166 of the cam bolt 164 is operative to move the cam bolt along the straight line direction responsive to movement of the lock cylinder and the eccentric projection in the LC bore. In the exemplary arrangement the cam bolt is movable responsive to the rotational movement of the lock cylinder to a locked cam bolt position which is shown in FIG. 4 for example. In the locked cam bolt position the distal portion 170 of the first leg 168 is disposed upwardly and is enabled to extend in engaged relation in the bolt engagement aperture 112 of the striker 102 when the striker is in a latched rotational position. As can be appreciated, with the distal portion of the cam bolt engaged in the bolt engagement aperture, the striker 102 is prevented from rotational movement away from the latched rotational position of the striker. The latched rotational position of the striker corresponds to the first rotational position of the shank in which the IC projection 92 is engageable in the IC bore slot 66 and also the position in which the door bolt 120 holds the door in the closed position.

Further in the exemplary arrangement rotation of the lock cylinder to the position shown in FIG. 2 for example, is operative to move cam bolt 164 to an unlocked cam bolt position in which the distal portion 170 of the cam bolt is disposed downward from the cam bolt locked position as shown in FIG. 2. In the cam bolt unlocked position the distal portion 170 is disposed away from the bolt engagement aperture 112. In this position the striker when in the second axial position and in which the IC projection 92 is not engaged in the IC bore slot 66, is enabled to be rotated away from the latched rotational position. Thus as can be appreciated, rotation of the lock cylinder 142 in engagement with the correct key 146 enables the cam bolt to be moved along the straight line direction between the locked and unlocked cam bolt positions. Of course it should be understood that this configuration is exemplary and in other arrangements other approaches may be used.

It should be understood that although in the exemplary arrangement an eccentric projection is operatively attached to the lock cylinder and the cam bolt includes a recess which engages the projection, in other arrangements alternative approaches may be used. For example in some arrangements the lock cylinder may be operatively connected with a recess that is configured to engage a projection that is in attached relation with a cam bolt or similar structure. Such interengaging projections and recesses may include for example engaging gear teeth or engaging cams and cam followers which relatively move so as to cause a bolt to be moved between the respective locked and unlocked positions. Numerous different approaches may be taken for purposes of providing suitable bolt movement for operatively engaging and disengaging a striker for purposes of holding the striker in a latched rotational position and releasing the striker so that a door may be unlatched.

In the exemplary arrangement the latch 10 may be held in releasable fixed engagement with the door or other mounting structure by a retainer 178. In the exemplary arrangement the retainer 178 is operatively engageable with the back side 16 of the body 10. The exemplary retainer 178 includes a central bridge portion 180. Bridge portion 180 includes a rearward extending hump 182. Hump 182 is configured to rearwardly overlie and shield bolt guide 158 in the operative position of the retainer. A pair of laterally disposed side panel portions 184 extend forward from the bridge portion 180 in the operative position of the retainer. The side panel portions each terminate forwardly in an elongated linear front face 186. Each front face in the exemplary arrangement is coplanar so as to facilitate the engagement of each of the side panel portions 184 with the flat rear face of a door 188 or other structure to which the latch is mounted. The exemplary bridge portion 180 further includes a pair of disposed fastener openings 190. The fastener openings 190 are in aligned relation with respective threaded members 192 that extend rearward from the back face of the body 12. Threaded nuts 194 are configured to releasably operatively engage the threaded members 192 that extend through the fastener openings 190 so as to enable the latch to be held in releasable engagement with the door 188 or other member to which the latch is mounted. Of course it should be understood that this arrangement is exemplary and in other arrangements other mounting approaches may be used.

Figure 8:
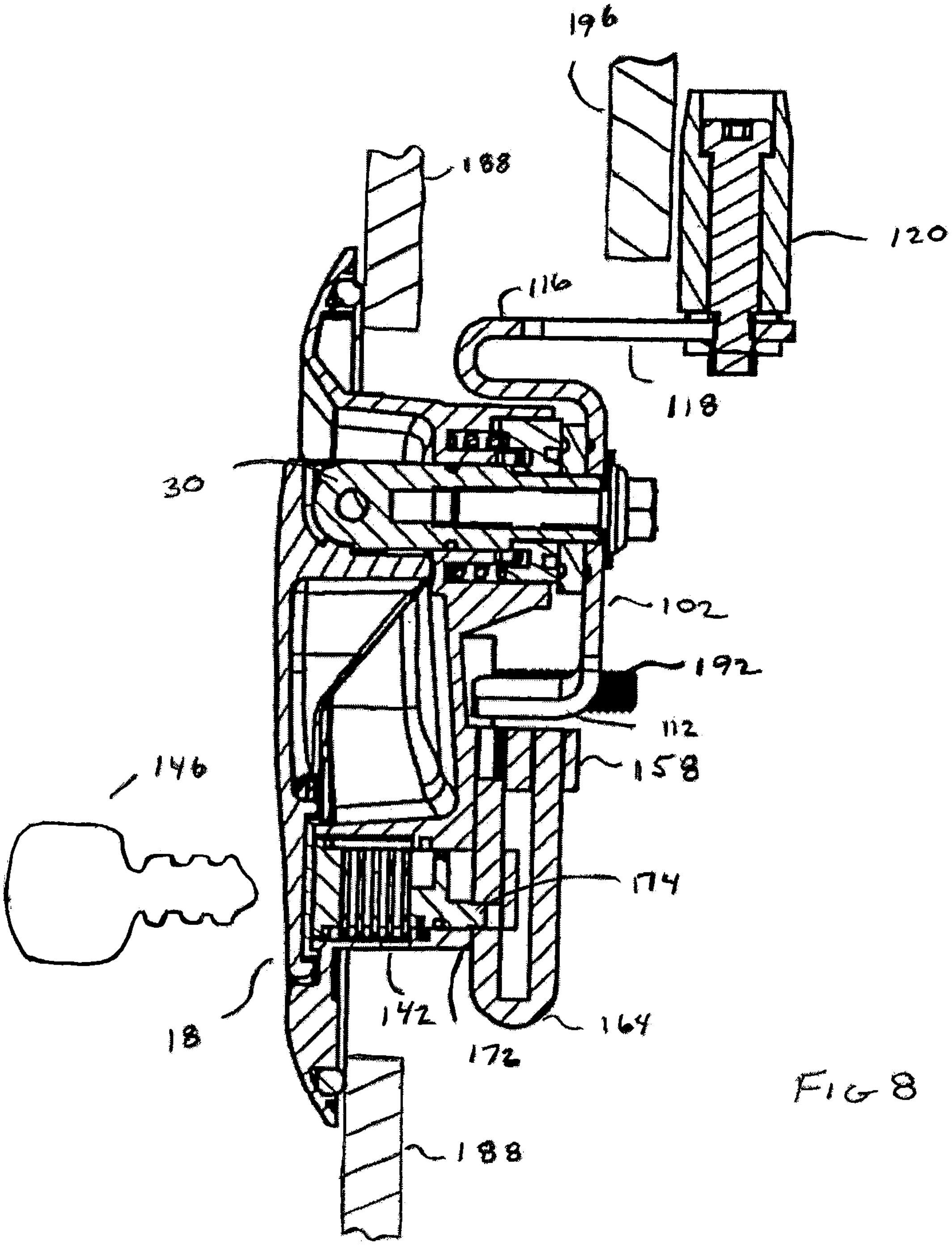
FIG. 8 is a cross-sectional view of the latch without the retainer, shown in mounted connection with a door and in engagement with a latch plate.

In the exemplary arrangement of latch 10, the latch is operative to hold the door 188 or other structure in a closed position through engagement of the door bolt 120 with a latch plate 196 or similar structure that is in operative connection with the wall or other framework to which the door is operatively engaged. As represented in FIG. 8, with the striker 102 in the latched rotational position, the striker is operative to hold the door in the closed position through the engagement of the door bolt with the latch plate. With the handle 18 in the retracted position as shown, the shank 30 is in the first axial position in which the IC projection 92 is engaged in the IC bore slot 66 so as to prevent rotational movement of the shank as well as the striker that is attached thereto. Further in situations where the lock cylinder is in the rotational position so that the distal portion 170 of the cam bolt is engaged in the bolt engagement aperture 112 such as is shown in FIG. 4, the cam bolt further prevents movement of the striker away from the latched rotational position.

Figure 9:
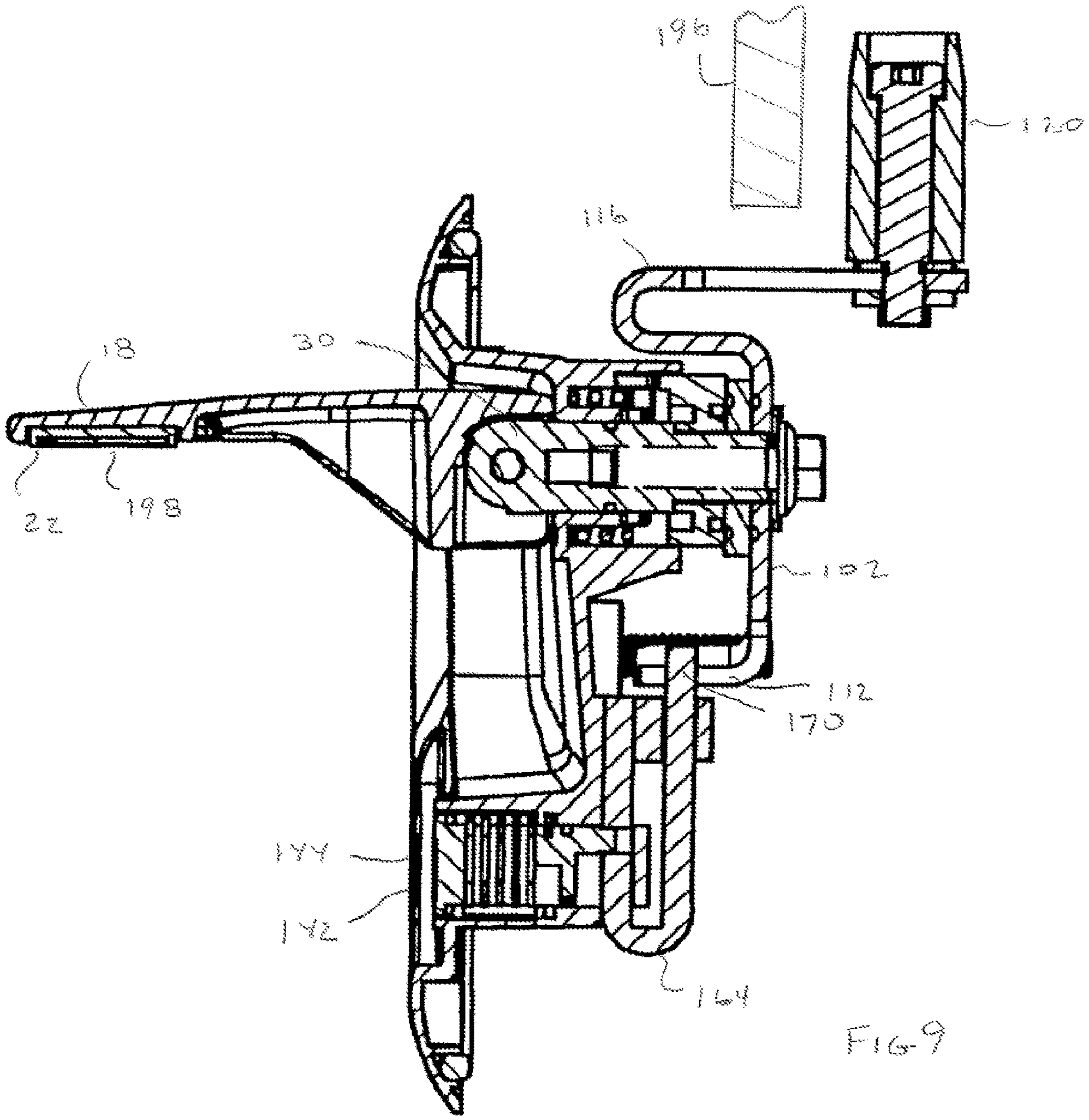
FIG. 9 is a cross-sectional view similar to FIG. 8 but with the handle in the extended handle position.

When the handle 18 is moved from the retracted position shown in FIG. 8 to the extended position as shown in FIG. 9, the shank 30 axially moves along the IC bore axis 62 from the first axial position to the second axial position. In the second axial position the IC projection 92 is disposed rearwardly outside of the IC bore slot 66. As the shank 30 and the attached striker 102 axially move while remaining in the first rotational position in which the IC bore slot and IC projection are aligned, the distal portion 170 is enabled to remain engaged in the axially elongated bolt engagement aperture 112. Thus as represented in FIG. 9, the striker 102 is enabled to move axially such that the door bolt 120 is disposed somewhat inwardly away from the latch plate 196 while the door bolt remains in the latched rotational position that prevents the door from being opened.

As can be appreciated from FIGS. 4 and 9, with the handle 18 in the extended position the fin portion 22 no longer abuttingly overlies the lock cylinder 142, as the fin portion does when in the retracted position. In the exemplary arrangement the fin portion 22 includes a circular recess that houses a resilient pad 198. The resilient pad 198 biasingly engages the outer face of the lock cylinder including the key opening in the retracted position of the handle. This feature helps to minimize the infiltration of moisture and other contaminants into the key opening of the lock cylinder.

With the handle 18 in the extended position, the key opening 144 of the lock cylinder becomes accessible so that the correct key 146 may be engaged in the lock cylinder. The lock cylinder 142 may then be rotated so as to move the cam bolt 164 from the locked position shown in FIG. 9 to the unlocked position shown in FIG. 8. Such movement of the cam bolt disengages and disposes the distal portion 172 away from the bolt engagement aperture 112. With the distal portion of the cam bolt disengaged from the bolt engagement aperture of the striker 102, the striker is rotatable responsive to manual movement of the handle 18 rotationally away from the latched rotational position of the striker. Such movement rotationally moves the door bolt 120 away from engagement with the latch plate 196, so that the door that has the latch associated therewith may be opened. Of course it should be understood that this arrangement is exemplary and in other arrangements other approaches may be used.

Figure 10:
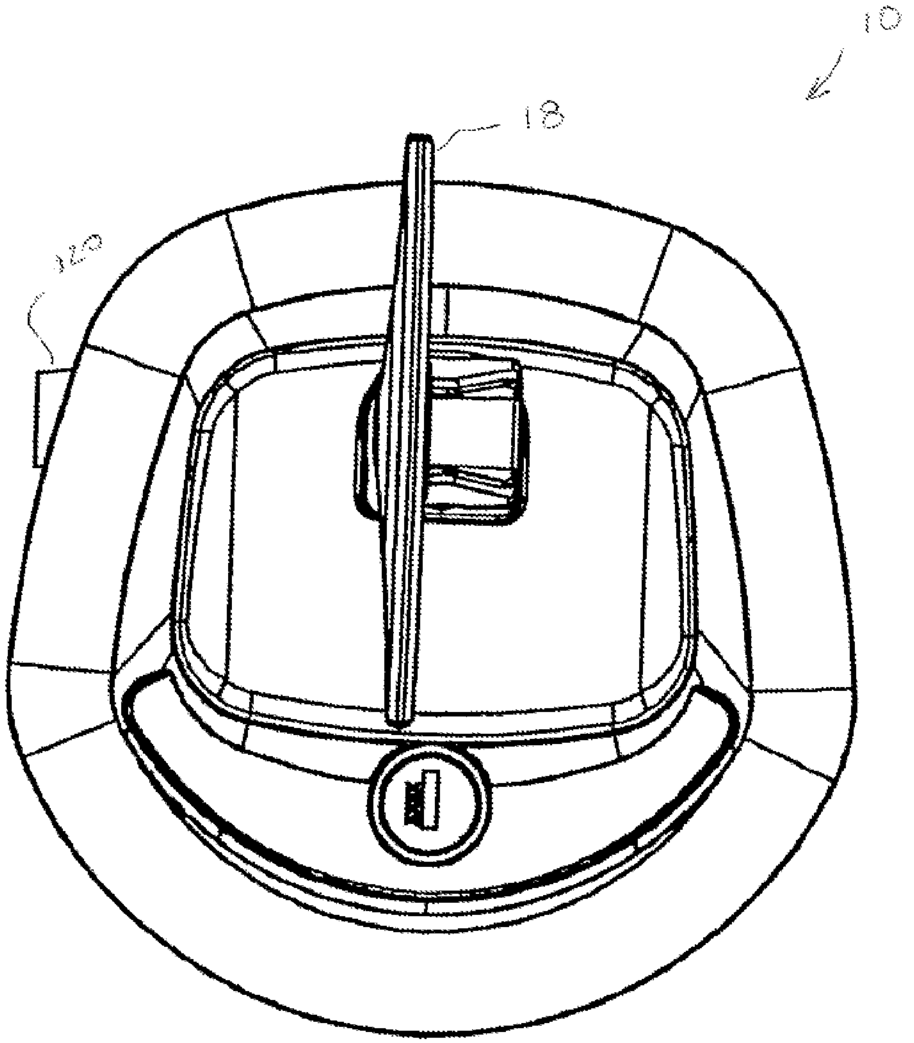
FIG. 10 is a front view of the latch with the handle in the extended handle position and rotated counter clockwise from the position of the handle shown in FIG. 3.

In an exemplary arrangement the latch 10 is configured to be held in a latched condition as well as in an unlatched condition. When the cam bolt 164 is in the unlocked position, the handle in the extended position such as is shown in FIG. 3, is rotatable in a counterclockwise direction as viewed from the front side of the latch generally about 90° until the IC projection 92 is engaged with the stop 82 which bounds the arcuate recess 76. In this position the handle 18 is positioned as shown in FIG. 10. When handle 18 is in this position the IC projection 66 is in alignment with the further IC bore slot 72. As a result handle 18 is enabled to be moved generally perpendicular to the IC bore axis to the further retracted position shown in FIG. 11. In moving the handle from the extended position to the further retracted position the cam surfaces of the handle cause the shank 30 to move from the second axial position to the first axial position in which the IC projection is engaged in further IC bore slot 72. As a result shank 30 is releasably held in the second rotational shank position as are the handle 18, the striker 102 and the door bolt 120, which is generally about 90° from the position in which the door bolt engages the latch plate. This prevents the door bolt from being unintentionally rotated back toward engagement with the latch plate.

Figure 12:
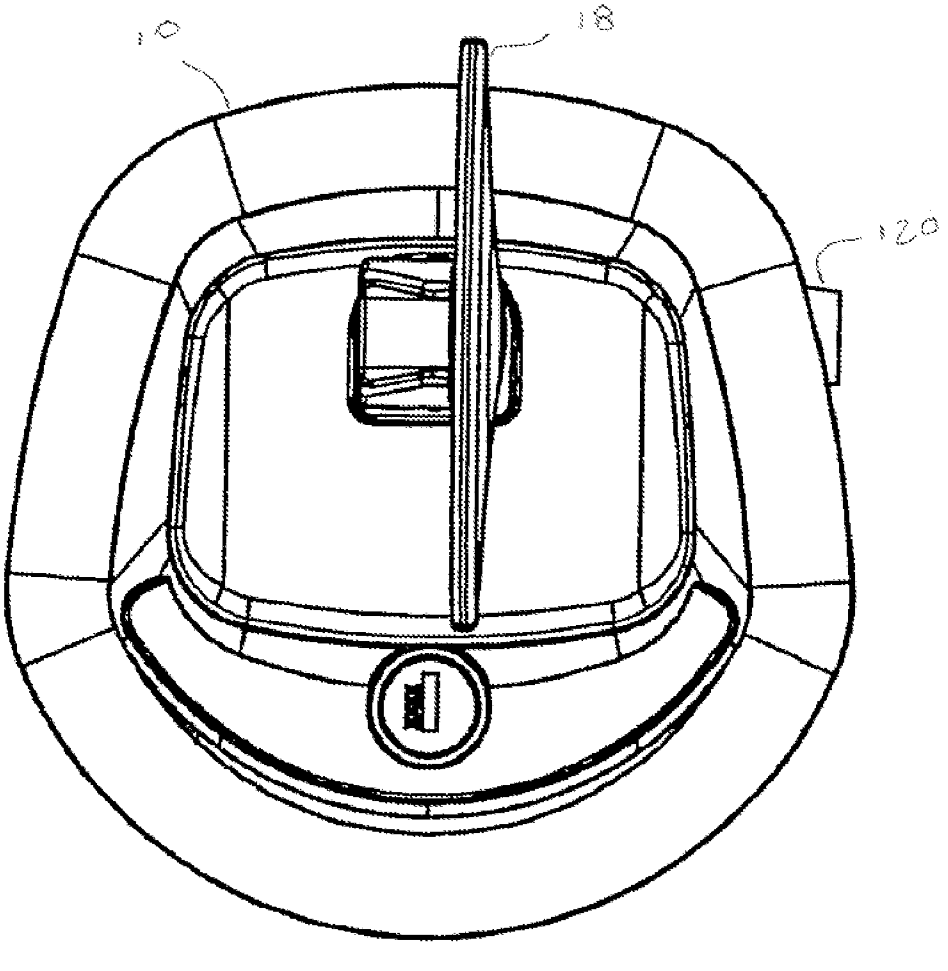
FIG. 12 is a front view of the latch with the handle in the extended handle position and rotated clockwise from the position of the handle shown in FIG. 3.

It should be further understood that the handle 18 in the extended position and when the cam bolt is in the unlocked position, is rotatable clockwise to the position shown in FIG. 12. In this third rotational position, further clockwise rotation of the handle as viewed from the front side of the latch, is prevented by engagement of IC projection 92 with stop 84 which bounds the arcuate recess on the opposed angular side from stop 82. In this third rotational position of the shank the IC projection 92 is in alignment with additional IC bore slot 74. Movement of handle 18 from the extended position shown in FIG. 12 to the additional retracted position shown in FIG. 13 in which the handle extends generally perpendicular to the IC bore axis, causes the shank and IC projection to move from the second axial position to the first axial position in which the IC projection is engaged in additional IC bore slot 74. Such engagement is operative to hold the shank 30 along with the handle, striker and door bolt 120 in the position shown disposed at generally about 90° from the position of engagement with the latch plate. In this position of the handle, inadvertent movement of the door bolt back toward engagement with the latch plate is prevented.

Figure 11:
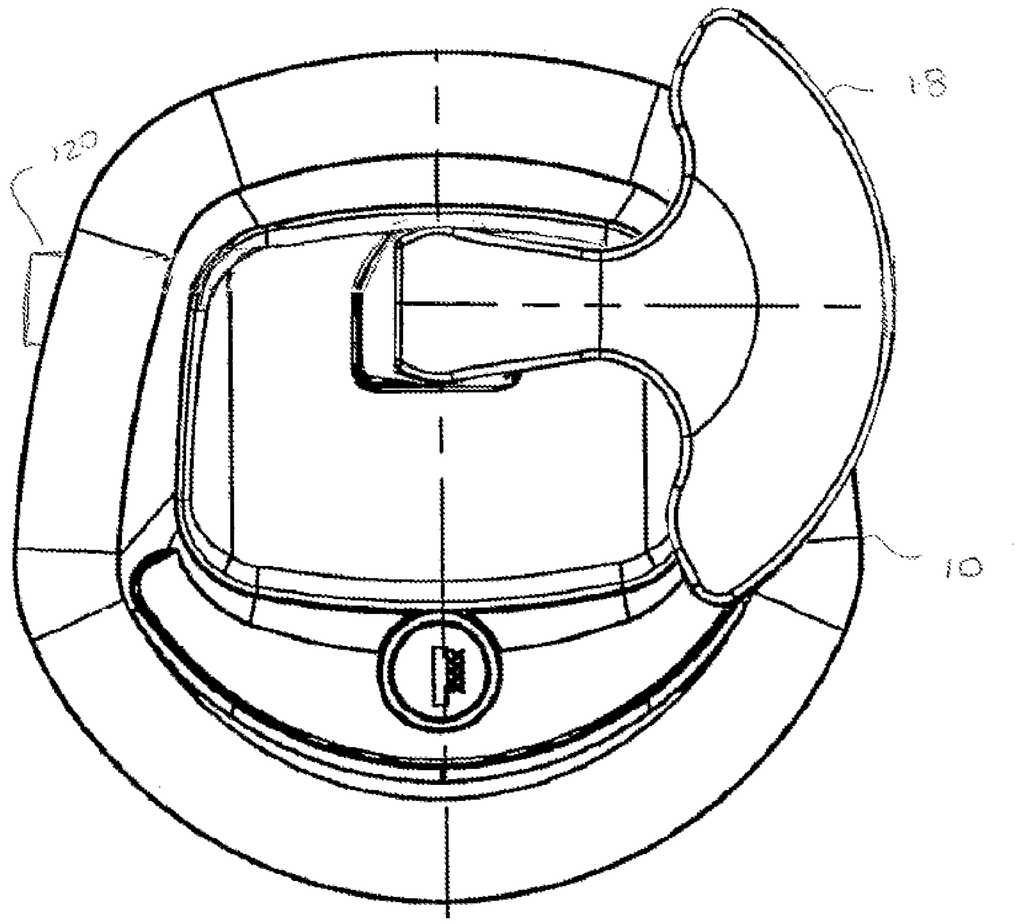
FIG. 11 is a front view of the latch with the handle in a further retracted position and in the rotational position shown in FIG. 10.
Figure 13:
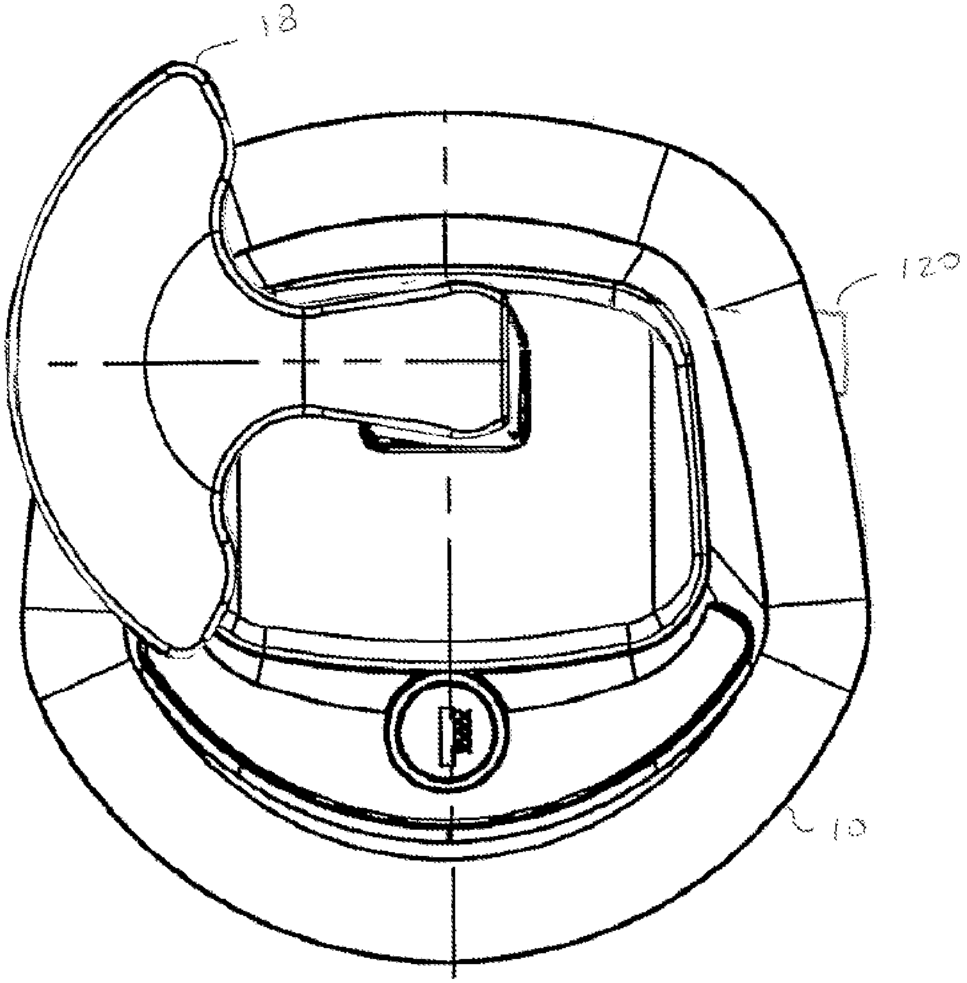
FIG. 13 is a front view of the latch with the handle in a further retracted position and in the rotational position shown in FIG. 12.

Of course it should be appreciated that from either of the positions of the handle shown in FIG. 11 or 13, the handle may again be moved to the extended position and moved generally about 90° to the position shown in FIG. 3 which corresponds to the first rotational position of the shank 30 and the latched rotational position of the striker. In this position the handle may be again returned to the retracted position to releasably hold the door bolt in engagement with the latch plate. Alternatively or in addition, from the position shown in FIG. 3 the key 146 may be engaged with the lock cylinder 142 and rotated to move the cam bolt 164 to the locked position. Then the key may be disengaged from the lock cylinder and the handle 18 again moved to the retracted position so that the fin portion 22 overlies the key opening 144 of the lock cylinder 142 so as to secure the latch in the latched position. Of course it should be understood that this arrangement with the lock in the unlocked condition, that enables the handle and the door bolt to be releasably held in positions in which the door bolt is disengaged from the latch plate at generally about 90° clockwise and counterclockwise from the point of latched engagement, is exemplary and in other arrangements other approaches may be used.

In some exemplary arrangements it may be desirable to only allow the door bolt and handle of the latch to be rotated in one rotational direction away from the position in which the door bolt is in engagement with the latch plate or other holding structure. This may be desirable due to the nature of the door or other closure member that is to be releasably held through operation of the latch. Such capabilities may be achieved in exemplary arrangements by using an indexing cam having a different configuration from indexing cam 88.

FIGS. 23-30 show an alternative indexing cam 200. Indexing cam 200 is configured to be used when the handle is only allowed to be turned clockwise when viewed from the front side of the latch to cause the door bolt to disengage from the latch plate. Indexing cam 200 is configured generally the same as indexing cam 88 except as specifically discussed.

Indexing cam 200 includes an IC projection 202. IC projection 202 extends radially outward from the indexing cam and the IC bore axis when the indexing cam is in its operative position. IC projection 202 is configured similar to IC projection 92 previously discussed. Indexing cam 200 further includes a further radially outward extending IC projection 204. Further IC projection 204 has a similar configuration to IC projection 202 and is positioned at generally about 90° from IC projection 202. In this exemplary arrangement further IC projection 204 is disposed in a counterclockwise direction from the IC projection when the indexing cam 200 is viewed from the front side of the latch. In the exemplary arrangement further IC projection 204 also extends forwardly beyond the front face of the indexing cam to facilitate holding the spring 86 in the proper position in a manner similar to that discussed in connection with indexing cam 88.

When indexing cam 200 is in engagement with the shank 30 the handle 18 may be positioned in the position shown in FIG. 1 which corresponds to the first rotational position of the shank. In this first rotational position of the shank, IC projection 202 is aligned with IC bore slot 66, and further IC projection 204 is aligned with further IC bore slot 72. As a result of such alignment, when the handle is in the retracted position such as is shown in FIGS. 1 and 2, the shank is in the first axial position and IC projection 202 is engaged in IC bore slot 66 while further IC projection 204 is engaged in further IC bore slot 72. Such engagement of the projections in the slots releasably hold the shank, the connected handle and the striker in the first rotational position.

With the handle 18 moved to the extended position as shown in FIGS. 3 and 4, the shank moves axially along the IC bore axis to the second axial position in which both IC projection 202 and further IC projection 204 are aligned with but outside of slots 66 and 72 respectively. With the cam bolt 164 in the unlocked position, the handle is rotatable when viewed from the front side of the latch, from the position shown in FIG. 1 to the position shown in FIG. 12. As can be appreciated if an attempt is made to rotate the handle counterclockwise from the position shown in FIG. 3 such counterclockwise rotation is prevented by engagement of the further IC projection 204 with stop 82.

When a latch having the alternative indexing cam 200 is in the position shown in FIG. 12, the handle may be moved to the additional retracted position shown in FIG. 13. In this position the handle extends generally perpendicular to the IC bore axis. In this rotational position of the shank, movement of the handle from the extended position shown in FIG. 12 to the additional retracted position shown in FIG. 13 causes the shank to move from the second axial position to the first axial position. In this orientation IC projection 202 is engaged in additional IC bore slot 74 and further IC projection 204 is engaged in IC bore slot 66. As a result the handle 14 as well as the striker 102 and the door bolt 120 are releasably held so that the door bolt is disengaged from the latch plate in the orientation shown in FIG. 13. Of course as can be appreciated further rotation in a clockwise direction beyond the position of the handle shown in FIG. 13 is prevented by engagement of IC projection 202 with stop 84. As a result the latch 10 with the alternative indexing cam 200 provides a latch that can only be opened via clockwise rotation of the handle and the door bolt.

To provide a configuration of the latch that can only be unlatched by moving the handle in a counterclockwise direction as viewed from the front, a further alternative indexing cam 206 may be used instead of indexing cams 88 or 200. Indexing cam 206 is shown in FIGS. 31 through 38. The exemplary indexing cam 206 is the same as indexing cam 88 except as expressly indicated. Indexing cam 206 includes an outward extending IC projection 208. IC projection 208 is similar to IC projection 92 previously discussed. Indexing cam 206 further includes a further IC projection 210. Further IC projection 210 is similar to further IC projection 204 previously discussed, except that it is disposed at generally about 90° in a clockwise direction from IC projection 208 when viewed from the front side of the latch.

With indexing cam 206 engaged with the shank 30 and the handle in the first rotational position as shown in FIGS. 1 and 2, IC projection 208 is in alignment with IC bore slot 66 and further IC projection 210 is in alignment with additional IC bore slot 74. With the handle 18 in the retracted position, the shank 30 is in the first axial position and each projection is engaged in the respective aligned bore slot.

Movement of the handle from the retracted position shown in FIG. 1 to the extended position shown in FIGS. 3 and 4 causes the shank to move along the IC bore axis rearward to the second axial position in which the handle is rotatable provided that the cam bolt is in the unlocked position. In the extended position of the handle and with the shank in the first rotatable position and in second axial position, rotation of the handle in a clockwise direction is prevented by engagement of further IC projection 210 with stop 84. The handle in the extended position is enabled to be rotated counterclockwise as viewed from the front side of the latch, from the position shown in FIG. 3 to the position shown in FIG. 10. Rotational movement of the handle and the shank in the counterclockwise direction beyond the position shown in FIG. 10 is prevented by the engagement of IC projection 208 with stop 82.

In the rotational position of the shank corresponding to the position of the handle shown in FIG. 10, IC projection 208 is in alignment with further IC bore slot 72 while further IC projection 210 is in alignment with IC bore slot 66. Movement of the handle 18 from the position shown in FIG. 10 to the further retracted position of the handle shown in FIG. 11 causes the shank to move from the second axial position to the first axial position. In the first axial position IC projection 208 is engaged in further IC bore slot 72 while further IC projection 210 is engaged in IC bore slot 66. As a result the handle, the striker and the door bolt are releasably held in a position in which the door bolt is disposed away from the latch plate as shown in FIG. 11.

Of course it should be understood that these configurations are exemplary and in other arrangements other rotation limiting configurations may be used. For example in some arrangements the angles through which the handle may be rotated as well as the angular displacements away from the latched position in which the handle and the striker may be held, may be varied depending on the particular needs of the latch and the door or other closure member with which the latch is associated. In addition it should be understood that the use of indexing cams having different configurations is but one approach to controlling the rotational movement of the handle and other latch components. In other exemplary arrangements other types of mechanisms may be utilized for purposes of limiting rotation of the latch components and releasably holding such components in selected positions.

In exemplary arrangements the latch 10 is operatively attached to a door or other closure member in a manner in which a peripheral area of the back side 16 is in abutting relation with an outer surface of the door. Other components on the back side such as the annular outer wall 60 which bounds the IC bore 58, the striker 102, the cam bolt 164 and the bolt guide 158 extend behind the outer surface of the door in an opening in the door in which the latch is mounted. In exemplary arrangements a resilient gasket is utilized for purposes of mounting the body of the latch in gapless engagement with the outer surface of the door. FIGS. 51-56 show two exemplary arrangements in which resilient gaskets are utilized for purposes of providing a generally gapless sealed mounting arrangement for the body of the latch in connection with the associated door.

Figure 51:
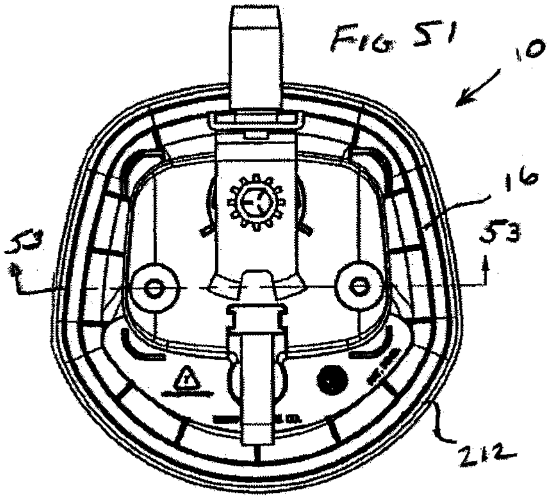
FIG. 51 is a back view of the exemplary latch with the retainer removed and with the body of the latch in supporting connection with a peripheral gasket.
Figure 52:
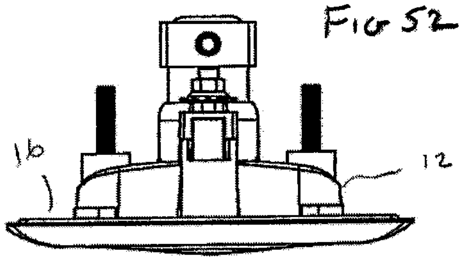
FIG. 52 is a top view of the latch as shown in FIG. 51.
Figure 53:
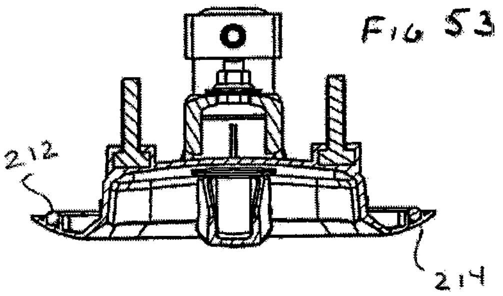
FIG. 53 is a top sectional view of the latch taken along line 53-53 in FIG. 51.

In the arrangement shown in FIGS. 51-53 a resilient gasket 212 extends in a peripheral slot 214 that extends adjacent to the outer perimeter of the back side 16 of the latch 10. In this exemplary arrangement gasket 212 is circular in transverse cross-section and conforms to the shape of slot 214. The gasket 212 extends slightly rearwardly outward from the slot 214 in the unmounted condition of the latch. When the latch is mounted such that the periphery of the back side 16 is in close adjacent relation with the outer face of the door, the gasket 212 engages the outer surface of the door so as to provide a gapless seal between the back side of the latch and the outer surface of the door. In some mounting arrangements the resilient gasket 212 may be deformed through compression so as to assure that the gasket provides generally fluid tight engagement between the body 12 and the outer face of the door.

Figure 54:
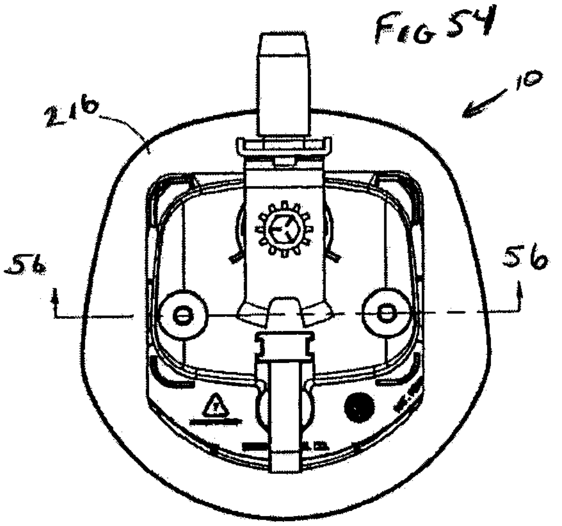
FIG. 54 is a back view of the exemplary latch with the retainer removed and with the body of the latch in supporting connection with an alternative gasket.
Figure 55:
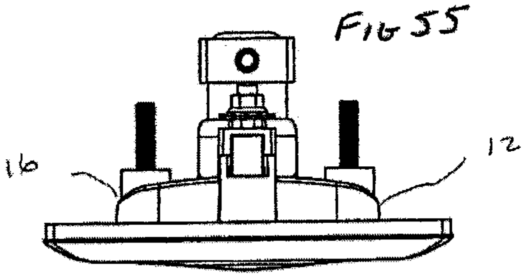
FIG. 55 is a top view of the latch shown in FIG. 54.
Figure 56:
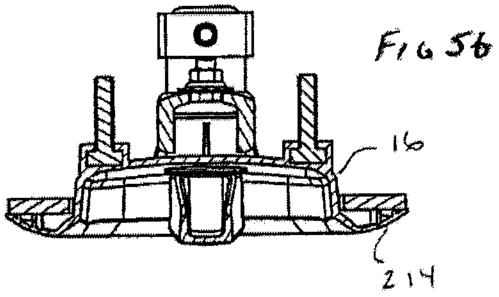
FIG. 56 is a cross-sectional view of the latch taken along line 56-56 in FIG. 54.
Figure 57:
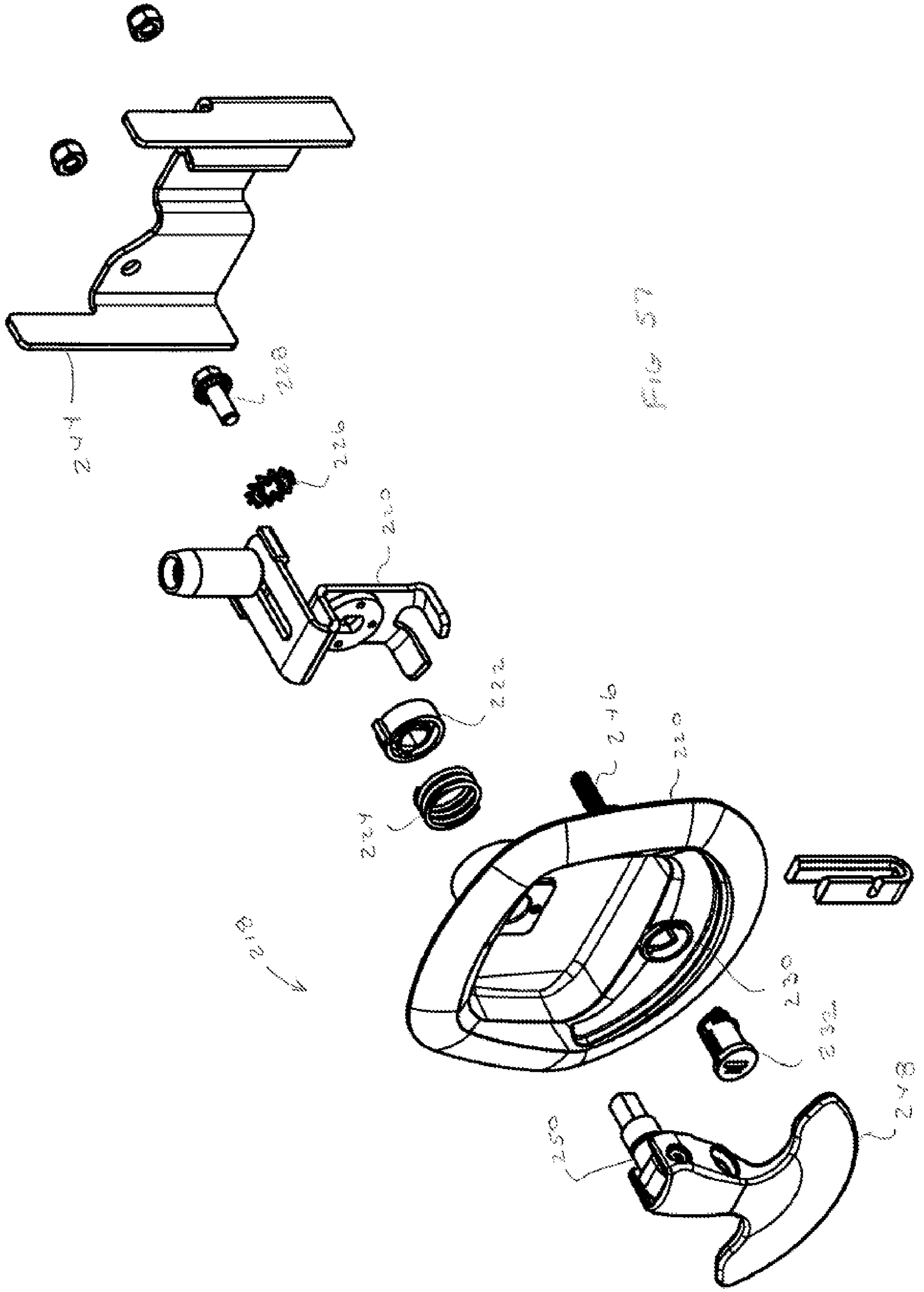
FIG. 57 is a front top right exploded view of an alternative latch that includes a handle configured to accept a padlock in engagement therewith.
Figure 5B:
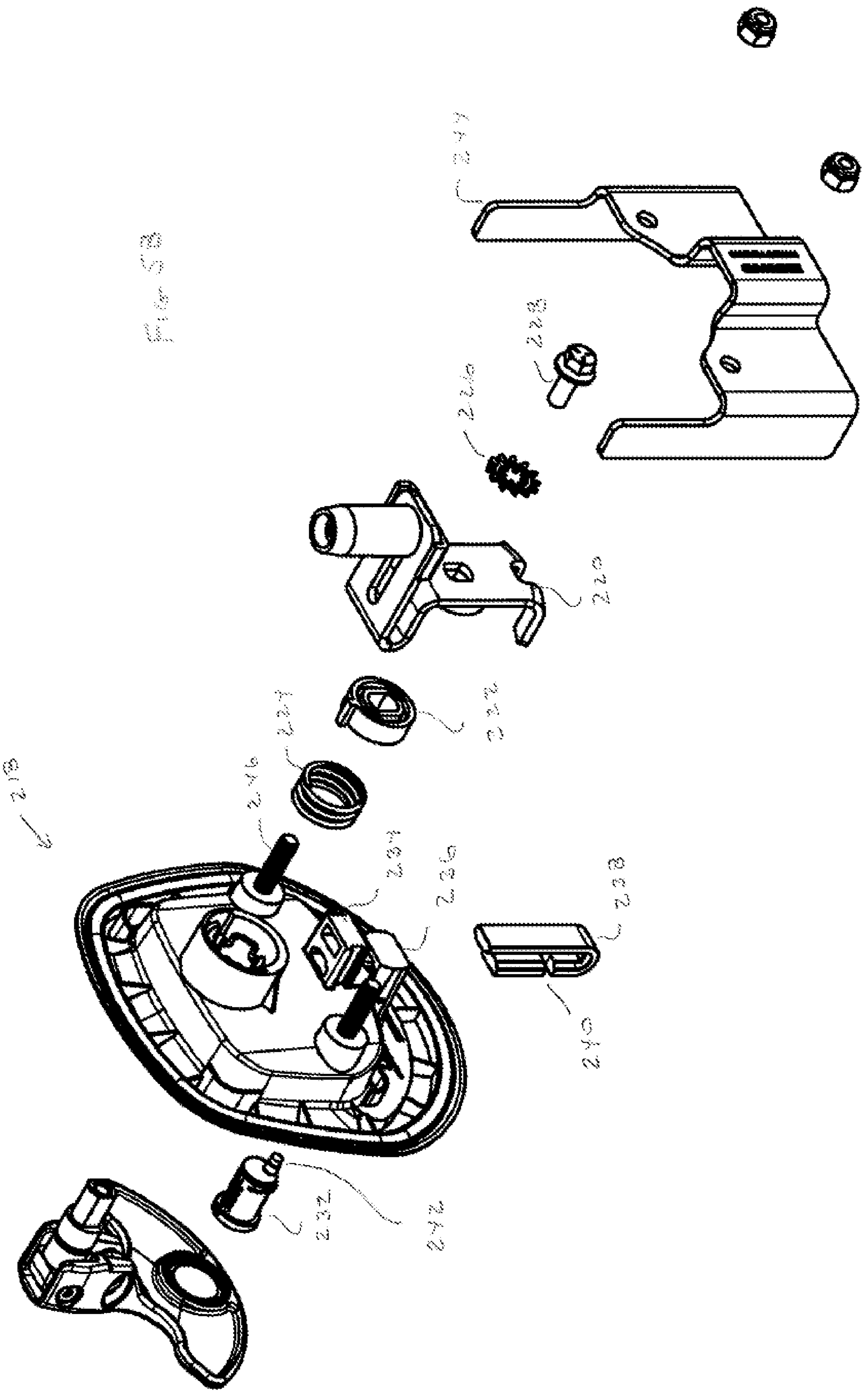
Figure 59:
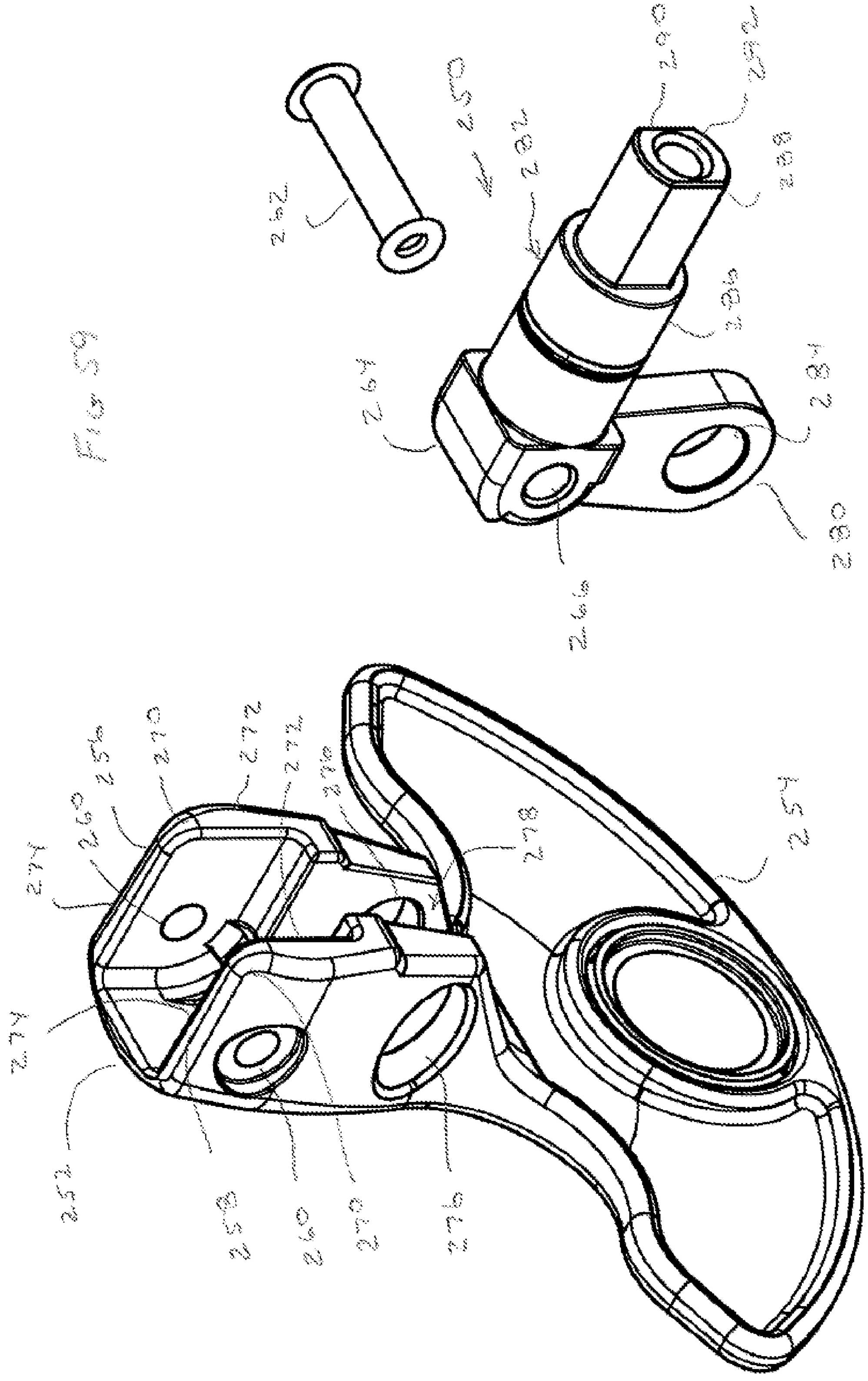
FIG. 59 is an exploded view of the exemplary handle, shank and pivot pin of the alternative latch shown in FIG. 57.
Figure 61:
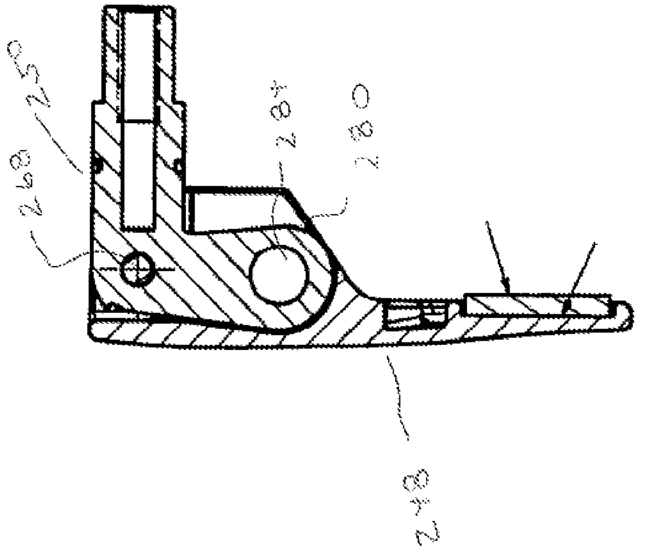
FIG. 61 is a cross-sectional view taken along line 61-61 in FIG. 60.
Figure 60:
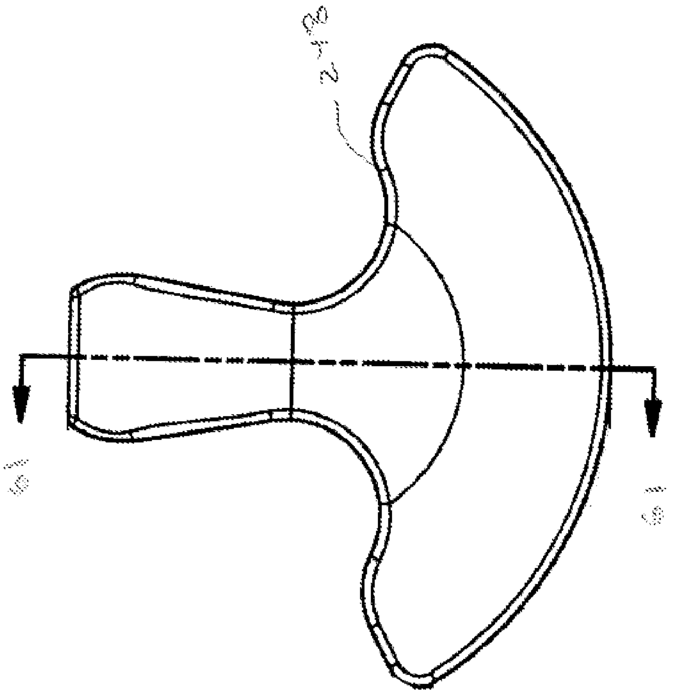
FIG. 60 is a front plan view of the handle of the alternative latch shown in FIG. 57.

FIGS. 54-56 show an alternative mounting arrangement including a resilient gasket 216. In this exemplary arrangement gasket 216 may be a resilient die cut or formed gasket. Exemplary gasket 216 is of greater transverse thickness compared to gasket 212 and also extends a greater distance laterally inward from the periphery of the back side 16. The exemplary gasket 216 extends closer to the periphery of the back side and extends in bridging relation of the slot 214. In some exemplary arrangements the larger size and the thickness of gasket 216 may provide for greater assurance of a fluid tight seal between the gasket and the surface of the door to which the latch is mounted. Of course it should be understood that these approaches are exemplary and in other embodiments other approaches may be used.

FIGS. 57-67 show an alternative latch generally indicated 218. Latch 218 includes features and components that are generally the same as latch 10 except as specifically indicated. Latch 218 includes a body 220 that in the exemplary arrangement is the same as body 12. Latch 218 also includes an indexing cam bore structure that in the exemplary arrangement is the same as the structures associated with the IC bore 58 of latch 10.

Latch 218 further includes a striker 220 that in the exemplary arrangement is the same as striker 102. An indexing cam 222 is included in latch 218 which is the same as indexing cam 88 or which may be the same as the alternative indexing cams 200 or 206. At least one spring such as a compression spring 224 similar to spring 86 is included in the latch. Spring 224 extends in engagement with the indexing cam 222 and biases the indexing cam and the shank rearwards on the back side of the latch in a manner similar to the approach utilized in latch 10. Latch 218 further includes a washer 226 and a bolt 228 that is similarly configured to washer 130 and bolt 128.

The exemplary latch 218 further includes an LC bore 230 that is similar to LC bore 138 of latch 10. A lock cylinder 232 that is similar to lock cylinder 142 is positioned in the LC bore 230 and has a key opening that is exposed on the front side of the latch. The back side of the latch 218 includes a bolt guide 234 that has a similar configuration to the bolt guide 158. The LC bore further includes a leg guide opening 236 similar to opening 172 of latch 10. A cam bolt 238 is mounted in operatively supported connection with the bolt guide 234 and the leg guide opening 236 in a manner similar to cam bolt 164. Cam bolt 238 further includes a cam bolt recess 240 that operatively engages an eccentric projection 242 that is in operative connection with the lock cylinder 232, and that is movable therewith in a manner similar to that described in connection with latch 10. Latch 218 further includes a retainer 244 that has a similar configuration to retainer 178 of latch 10. The retainer 244 is releasably engaged with the body of the latch through threaded members 246 in a manner similar to that utilized in connection with latch 10.

Latch 218 has a manually engageable handle 248 that differs in its configuration from previously described handle 18. Latch 218 further includes a shank 250 that also differs from shank 30 discussed in connection with latch 10. As shown in FIGS. 59-66 handle 248 includes a stem portion 252 and a fin portion 254. The exemplary fin portion is configured in a manner similar to fin portion 22 of the handle 18. The exemplary stem portion 252 includes a pair of laterally disposed side walls 256, 258. Each of side walls 256 and 258 include a respective pivot opening 260. Pivot openings 260 are configured to receive a pivot pin 262 therein. Shank 250 includes a head portion 264 that includes a head opening 266 that is configured to accept the pivot pin 262 therein. The head portion 264 extends between the side walls 256, 258 with the pivot pin 262 therein. In the assembled condition of the latch, the handle 248 is enabled to be rotationally movable relative to the shank 250 about a pivot pin axis 268.

Figure 63:
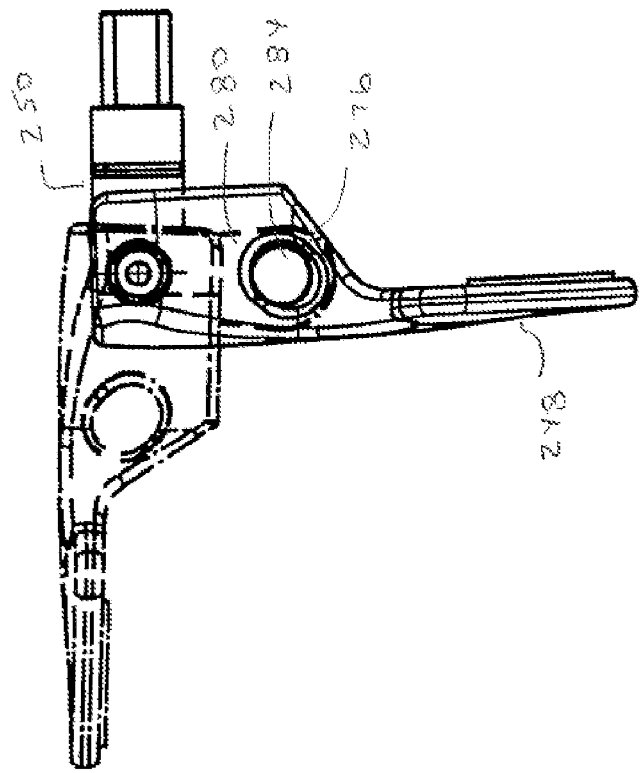
FIG. 63 is a side view of the handle and shank of the exemplary alternative latch with the handle in a retracted position with the handle in an extended position shown in phantom.
Figure 62:
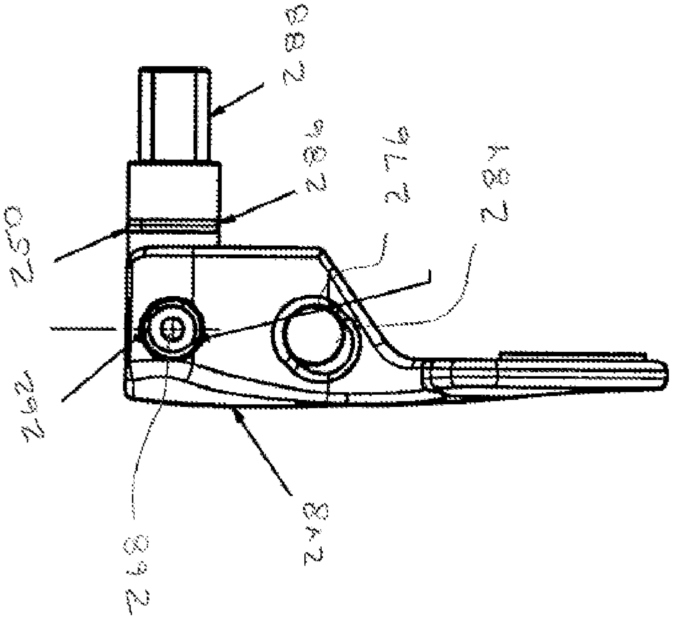
FIG. 62 is a side view of the handle and shank of the exemplary alternative latch with the handle in a retracted position.
Figure 64:
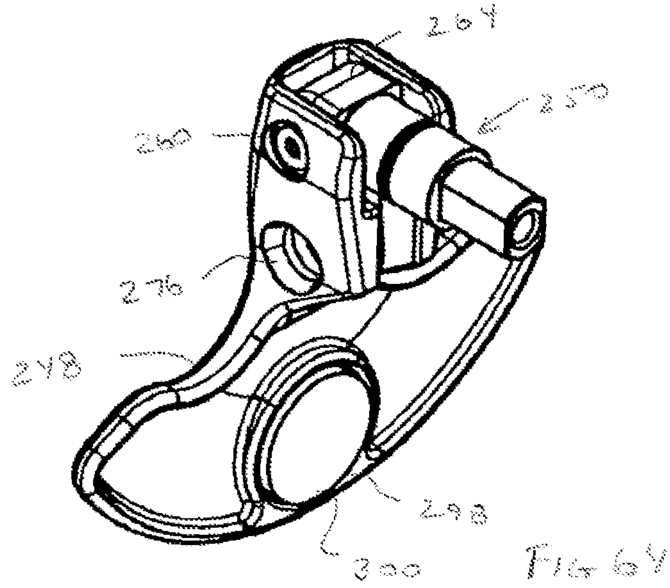
FIG. 64 is a rear top right perspective view of the handle and shank of the alternative latch.
Figure 65:
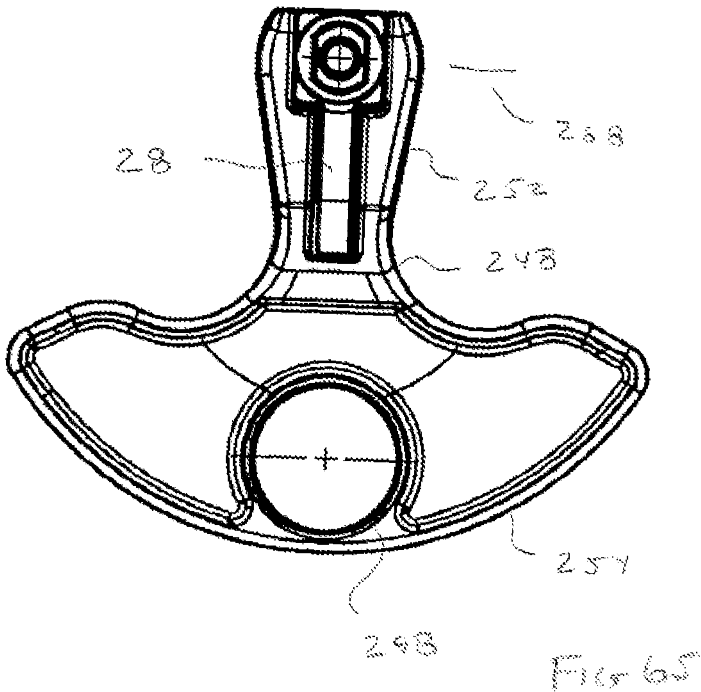
FIG. 65 is a rear view of the handle and shank of the alternative latch.
Figure 66:
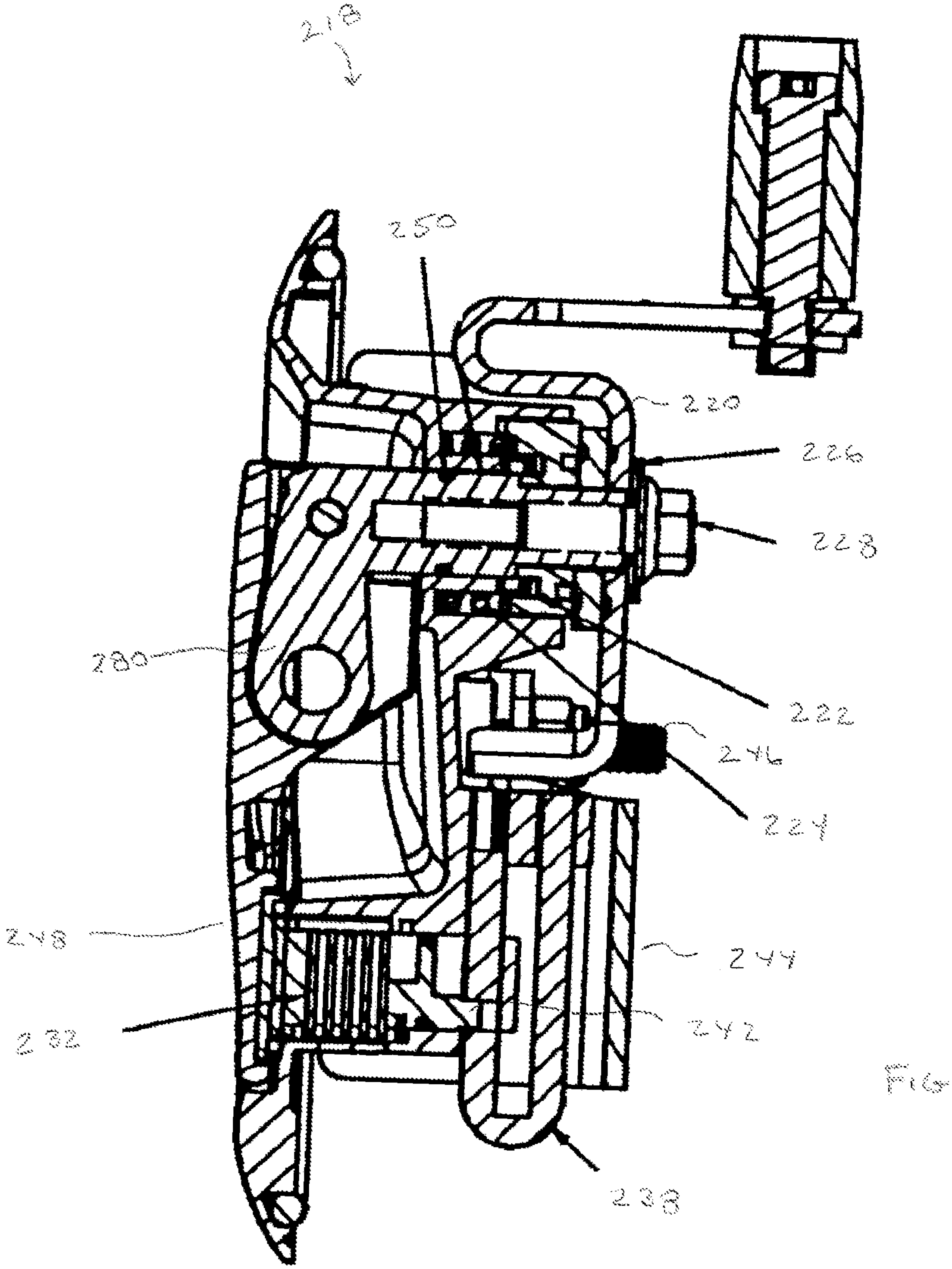
FIG. 66 is a cross-sectional view of the alternative latch.

The exemplary side walls 256 and 258 each include a respective handle cam surface 270 which operates in a manner similar to the handle cam surfaces 132 of latch 10. The side walls further each include generally flat land surfaces 272, 274 which perform functions during latch operation similar to land surfaces 134, 136 previously described. The cam surfaces and land surfaces cause axial movement of the shank 250 as the handle 248 is moved between the retracted position as shown in FIG. 63 and the extended position which is shown therein in phantom.

Side walls 256 and 258 each include a respective handle aperture 276. Each handle aperture extends through the respective side wall to a central stem opening 278. The head portion 264 of shank 250 includes a tongue 280. The tongue 280 extends radially outward relative to the pivot pin axis 268 and generally perpendicular to a shaft portion 282 of the shank 250. The tongue 280 includes a tongue aperture 284. The tongue aperture 284 has a diameter that is generally the same as the diameter of handle apertures 276. The shaft portion 282 of shank 250 is configured in a similar manner to the shaft portion of shank 30. The shaft portion includes a cylindrical portion 286 with a recess that is in engagement with a resilient annular member and a flattened portion 288, similar to cylindrical portion 44 and flattened portion 46 of shank 30. Shank 250 further includes an inward end 290 with a threaded opening 292 configured to releasably engage the bolt 228.

Figure 67:
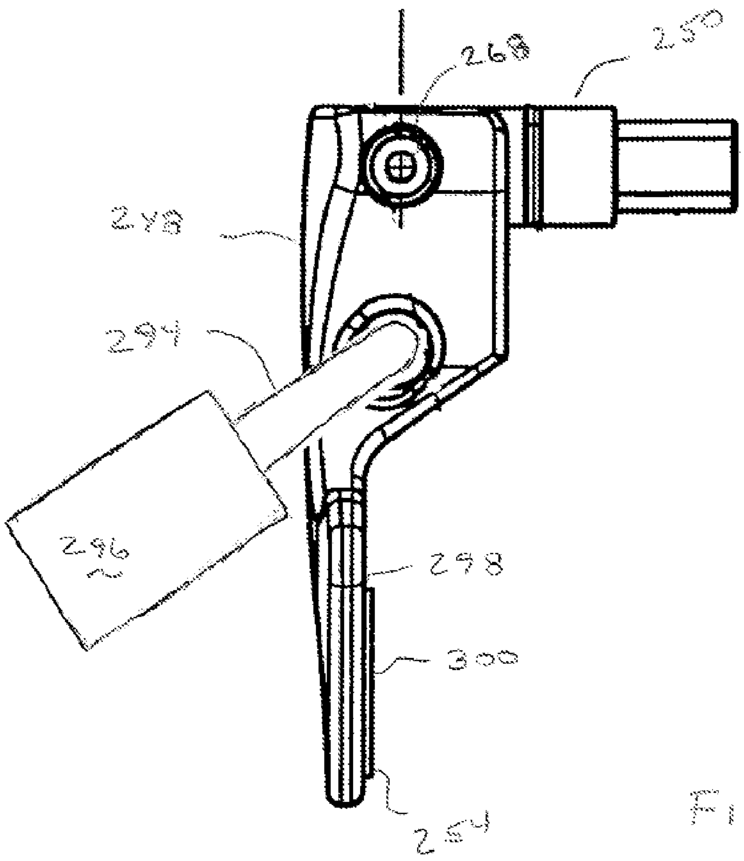
FIG. 67 is a side view of the handle and shank of the alternative latch shown in engagement with the loop of a padlock.
Figure 70:
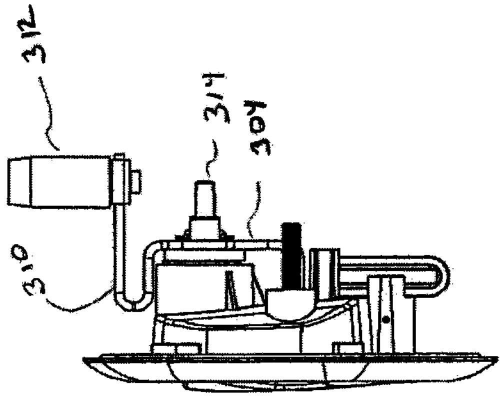
FIGS. 68, 69, 70 and 71 are front, left side, right side and top views respectively, of a further alternative latch with the handle in the retracted position.
Figure 68:
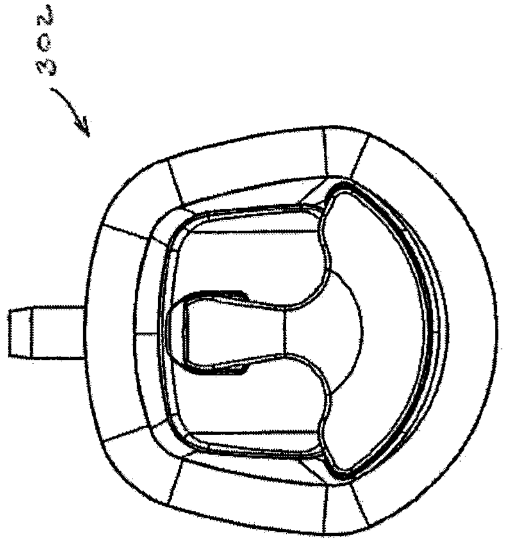
Figure 69:
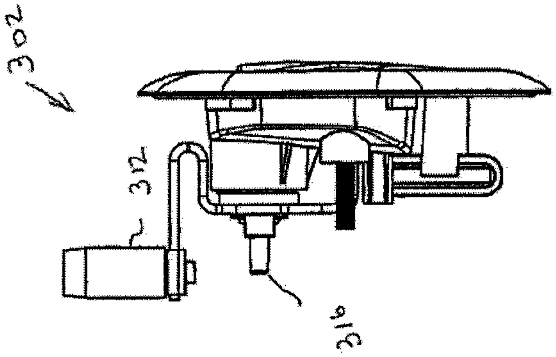
Figure 71:
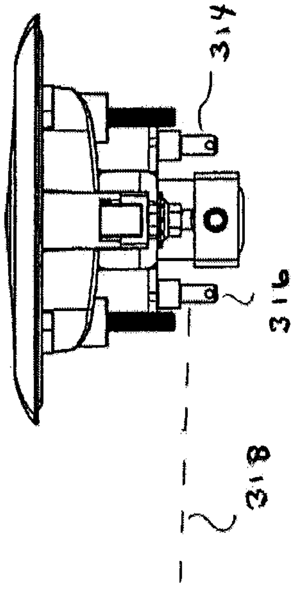
Figure 82:
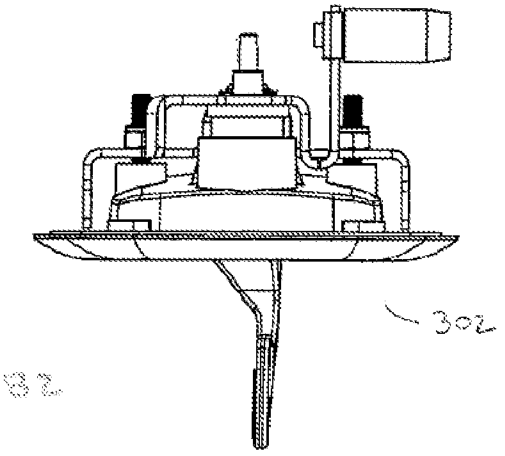
Figure 80:
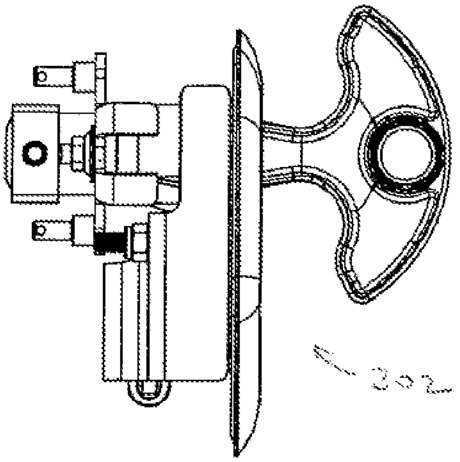
Figure 81:
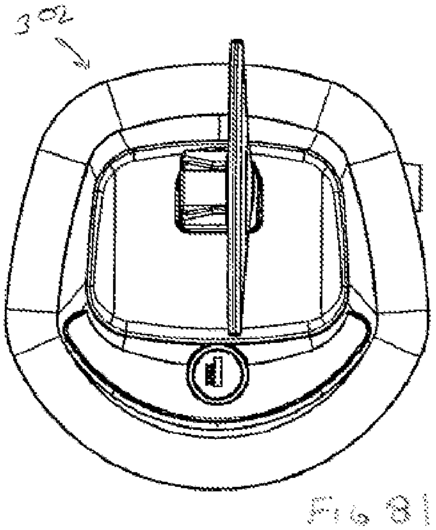
Figure 82:
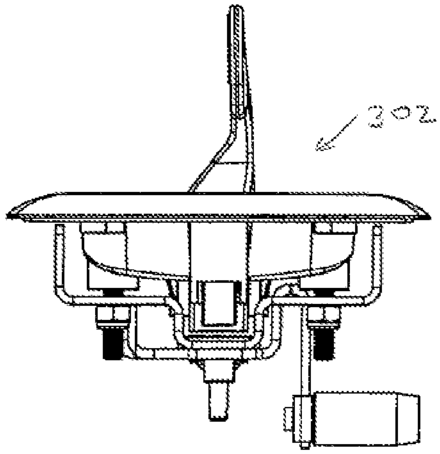
Figure 84:
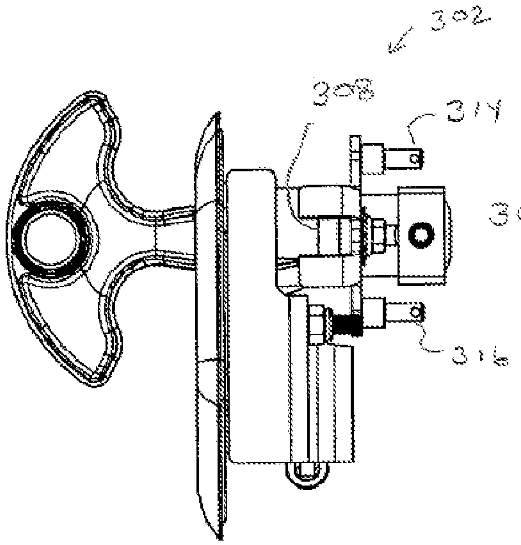
FIGS. 84 and 85 are right side and back views respectively of the further alternative latch with the handle in the extended position and rotated clockwise from the position shown in FIGS. 76 and 77.
Figure 85:
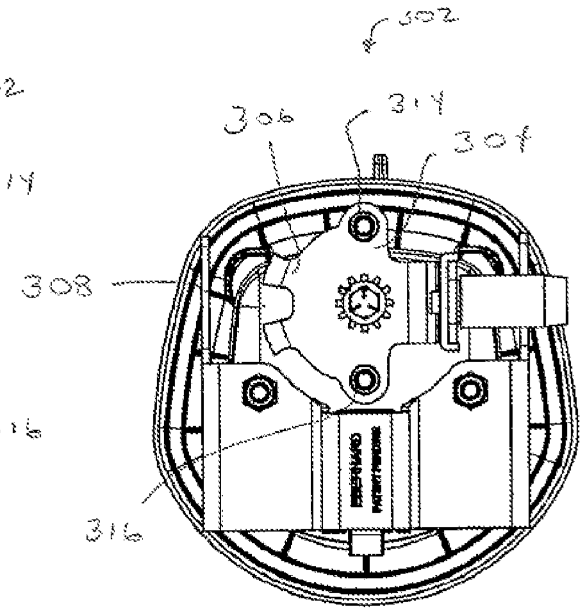
Figure 86:
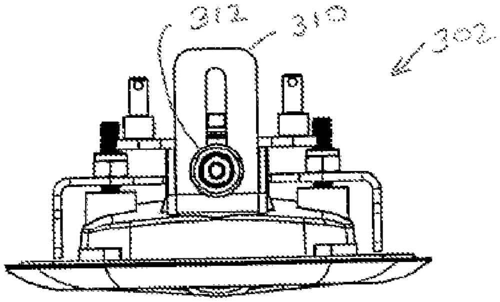
FIGS. 86 and 87 are top views of the respective further alternative latch with the handle shown in the retracted and extended positions respectively.
Figure 87:
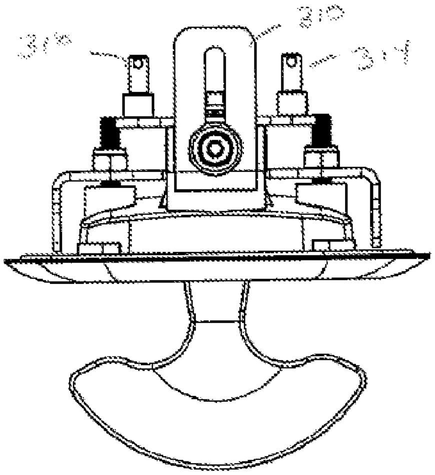
Figure 88:
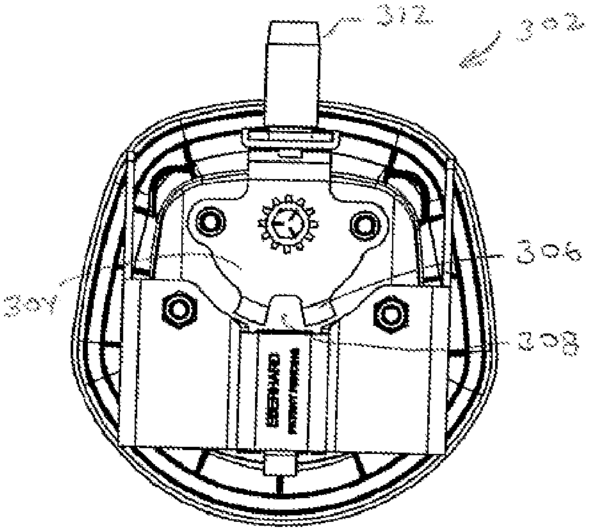
FIGS. 88 and 89 are back views of the further alternative latch with the cam bolt in the unlocked and the locked positions respectively.
Figure 89:
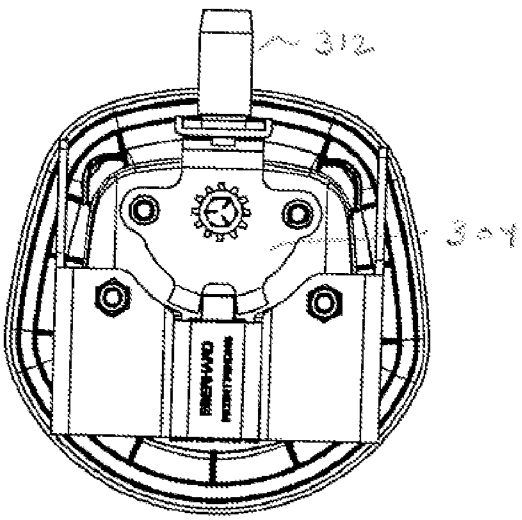
Figure 90:
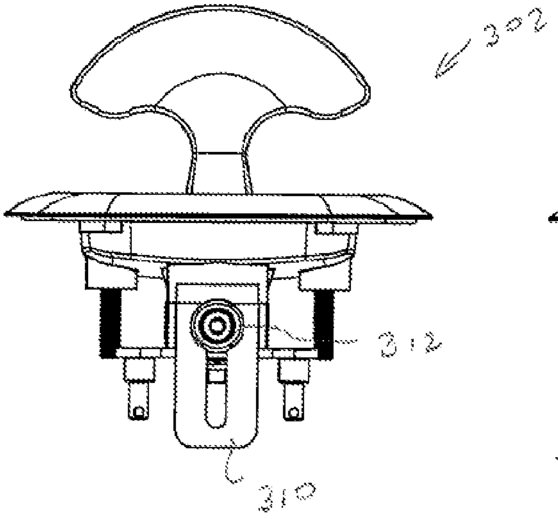
FIGS. 90 and 91 are top views of the further alternative latch with the movable door bolt shown in the extremes of its adjustment range.
Figure 91:
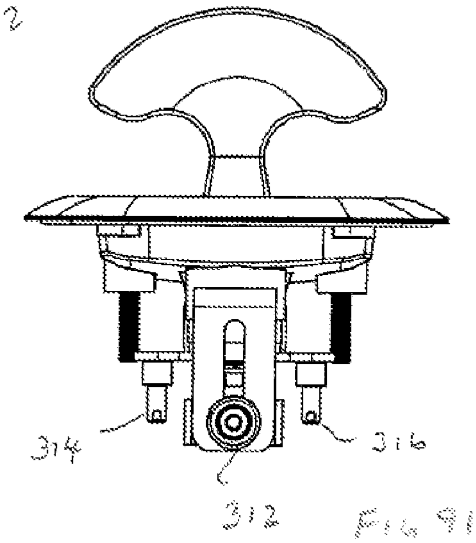
Figure 92:
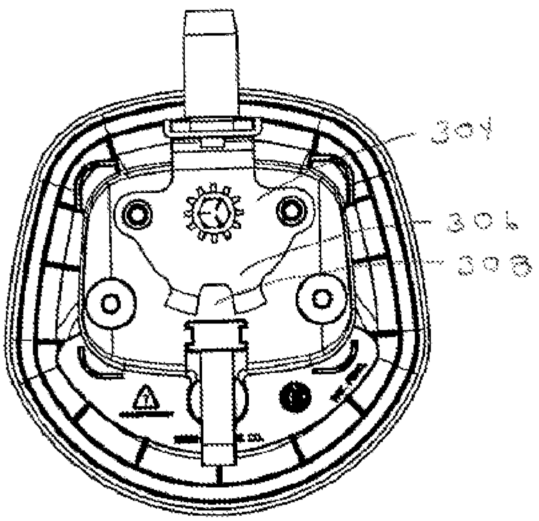
FIGS. 92 and 93 are back views of the further alternative latch corresponding to FIGS. 90 and 91 respectively, and with the cam bolt shown in the unlocked and locked cam bolt positions.
Figure 93:
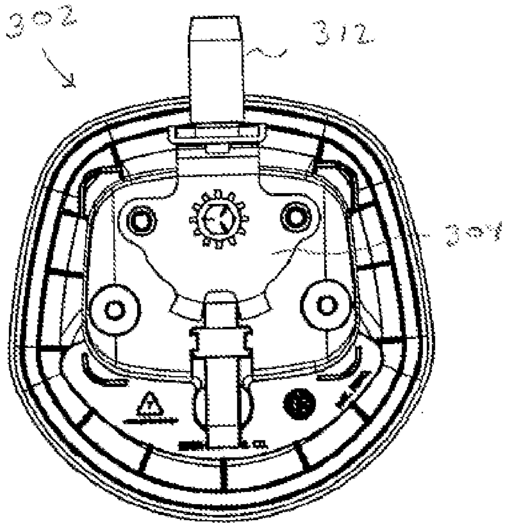
Figure 96:
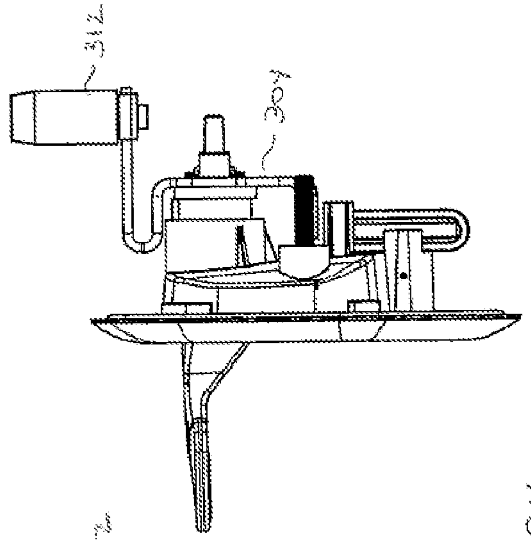
FIGS. 94, 95, 96 and 97 are front, left side, right side and bottom views respectively of the further alternative latch with the cam bolt in the locked position and the handle in the extended position.
Figure 94:
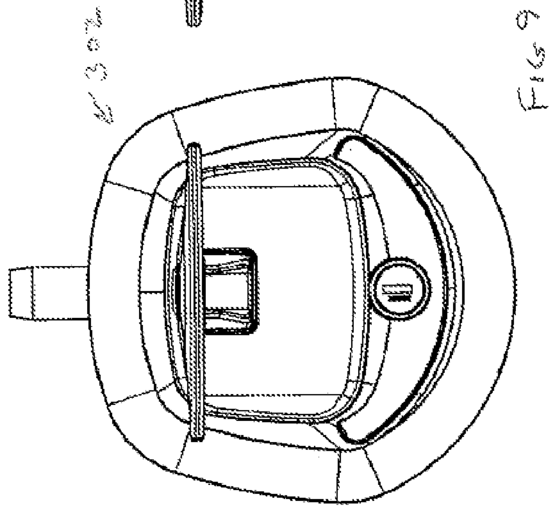
Figure 97:
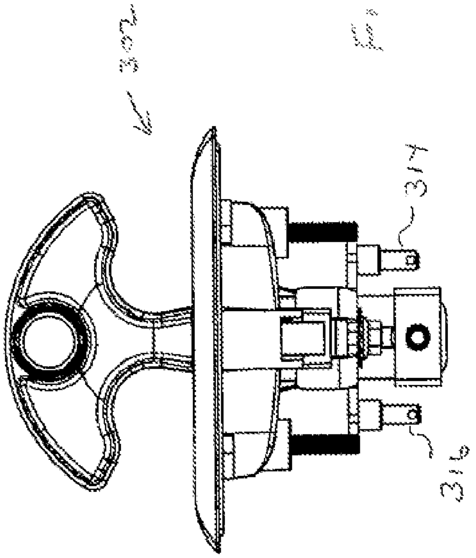
Figure 95:
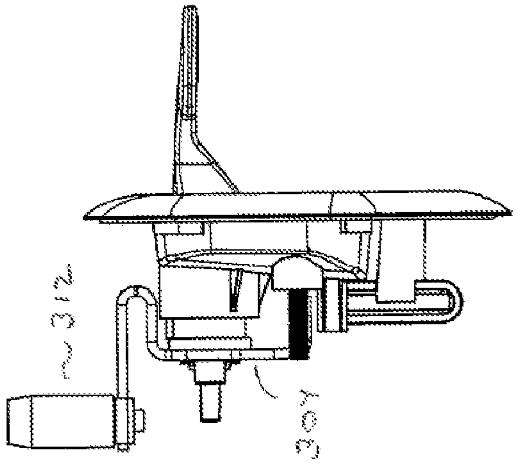

In the assembled condition of latch 218, the tongue 280 of shank 250 extends in the central stem opening 278. In the retracted position of the handle 248 shown in FIGS. 61 and 62, the tongue aperture 284 is in intermediate aligned relation with both of the handle apertures 276. In this retracted position of the handle 248, the aligned handle apertures and tongue aperture are configured to accept therein a loop 294 of a lock such as a padlock 296 as represented in FIG. 67. The engagement of the padlock with the handle 248 is operative to hold the handle in the retracted position. As in the exemplary latch arrangement the handle 248 in the retracted position is prevented from rotationally moving by the indexing cam 222, and the fin portion 254 of the handle overlies and prevents access to the lock cylinder 232, the padlock may be used to additionally secure the latch in a locked condition.

In the exemplary arrangement the fin portion 254 of the handle 248 further includes a recess 298. A resilient pad 300 is positioned in the recess. The resilient pad is operative to outwardly overlie the lock cylinder in the retracted position of the handle so as to reduce the risk of infiltration of moisture and dirt into the lock cylinder. Of course it should be understood that this approach is exemplary and in other arrangements other configurations may be used.

The exemplary latch 218 without the use of a padlock, may be operated in a manner similar to that described in connection with latch 10. Further some users of the latch 218 may choose not to utilize the lock cylinder 232 for purposes of securing the latch and may choose to leave the cam bolt in the unlatched position at all times during operation. Such a user may choose to utilize only a padlock for purposes of securing the latch in the latched condition. Some users may find this convenient as they do not need to carry two keys or other items which may be utilized for purposes of unlatching the latch.

In still other exemplary arrangements a latch may include the features associated with securing the latch using only a padlock such as shank 250 and handle 248 in combination with the structures associated with the IC bore and striker. Such an alternative latch arrangement may not include a lock cylinder, a cam bolt and bolt guide structures. Such a latch configuration may provide for securing the latch only through an external lock such as the padlock 296. As can be appreciated the capabilities of the exemplary latch configuration of preventing rotational movement of the shank and striker when the handle is in the retracted position may be utilized in such alternative arrangements to provide a suitable latching mechanism through the use of an external padlock without the need for a separate lock cylinder or other locking mechanism. Of course it should be understood that this alternative latch configuration is merely exemplary, and numerous other latching arrangements using the features described herein may be produced.

FIGS. 69-97 show a further alternative arrangement of a latch 302. Latch 302 of an exemplary arrangement is the same as latch 10 except that the striker thereof provides for up to three points of engagement between the mechanism associated with the latch and the door or other closure member to which the latch 302 is operatively connected. In the exemplary arrangement of latch 302 the components thereof have the same configuration is the components of latch 10 except that the striker 102 of latch 10 is replaced by a striker 304. Striker 304 is similar to striker 102 in that it includes a striker projection 306 and bolt engagement aperture 308. The striker 304 further includes a bolt adjustment support arm 310 which is similar to arm 116 and which supports changing the location positionable door bolt 312.

Striker 304 further includes a pair of member engaging shafts 314, 316. Each of the shafts is releasably connectable with the respective latching member such as member 318 which is shown in phantom in FIG. 71. In operation of the exemplary latch 302 when the striker is rotatable, each of the shafts 314, 316 is rotationally movable in coordinated relation with the striker. Respective latching members which are in engagement with the respective shafts may be moved responsive to the striker so as to selectively engage and disengage latch points that are operatively connected to the latching members. Such latch points may include for example, distal ends of latching members that are extendable into apertures in latch plates or similar structures to hold the door with which the latch is in operative connection in a closed position. Alternatively or in addition, latching members may be in connection with bolts or a movable bolt work which is operative to selectively engage and disengage with latch plates or other mating structures to selectively hold such structures in engaged relation. As can be appreciated, the additional shafts 314 and 316 provide the capability to provide at least two additional points of engagement in addition to the door bolt 312 for holding the door in the closed position when the latch is latched.

Figure 99:
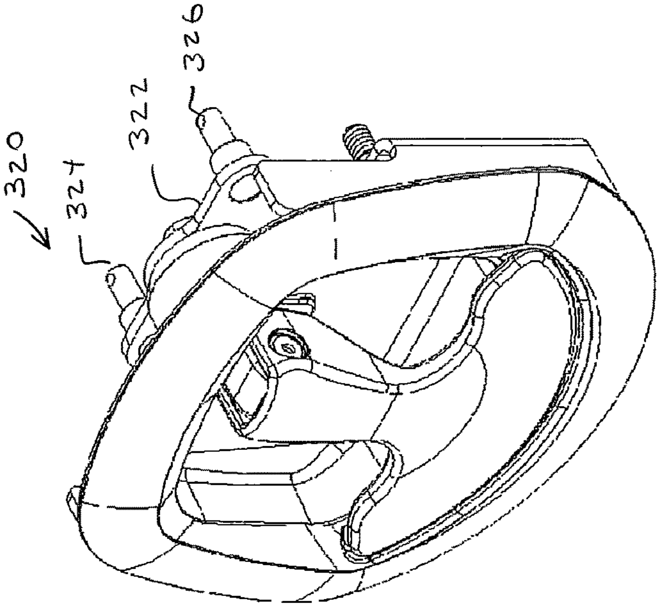
FIG. 99 is a front top right perspective view of a further alternative latch that includes a striker that includes a pair of latching shafts without a bolt adjustment support arm or door bolt.
Figure 98:
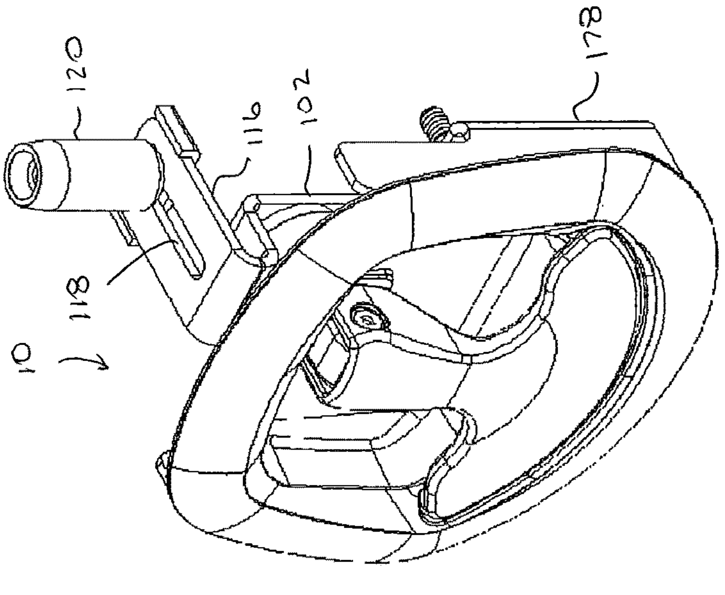
FIG. 98 is a front top right perspective view of a latch including a first door bolt arrangement.

Further exemplary arrangements such as latch 320 shown in FIG. 99 may include yet a further alternative striker 322 which has a configuration that includes only one or more latching shafts 324, 326 which may be similar to shafts 314, 316. However, striker 322 does not have a bolt adjustment support arm or door bolt like the latch 10 shown in adjacent FIG. 98. Such a latch 320 with the alternative striker 322 may be used in connection with a remote point latching configuration in which latching members in connection with the shafts extend to latch points disposed away from the latch. As can be appreciated the alternative latch 320 with the striker that includes a single latching shaft that is connected to an activating member may provide for a single remote latch point that is disposed away from the latch. Similarly latch 320 with two latching shafts that connect to respective alternative members may provide two remote latch points, and so on. As can be appreciated numerous different latching arrangements may be provided using the principles and approaches described herein.

Figure 100:
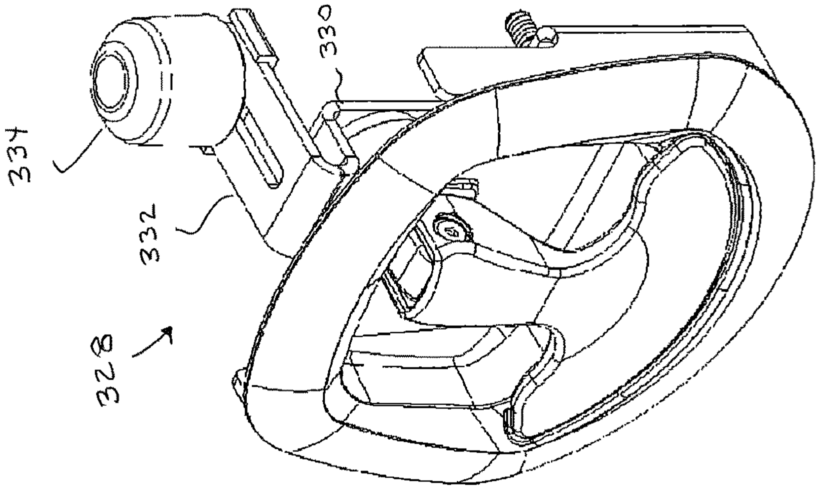
FIG. 100 is a front top right perspective view of a further alternative latch that includes an alternative door bolt arrangement.

FIG. 100 shows a further alternative latch 328. Latch 328 includes a striker 330 which includes a bolt adjustment support arm 332. Support arm 332 may be similar to support arm 116 of the latch 10. The support arm 332 is configured to have a door bolt 334 operatively connected thereto. In this exemplary arrangement door bolt 334 has a larger diameter and a shorter axial length compared to door bolt 120 of latch 10. Door bolt 334 may be used for example, in situations where a wall thickness or other engaging structure which the door bolt engages in the latched position, has a smaller transverse thickness than a corresponding structure with which latch 10 and door bolt 120 is used. Further the exemplary door bolt 334 may be utilized in situations where the available clearance for the door bolt in the latched position is less than is needed when door bolt 120 is used. Thus it should be appreciated that numerous different striker and door bolt configurations may be utilized to achieve different latching arrangements.

FIGS. 101 through 116 show a further alternative latch 336. Latch 336 is similar to latch 10 and latch 218 previously described, except that latch 336 includes an arrangement that biases the handle of the latch toward the latched position.

Figure 112:
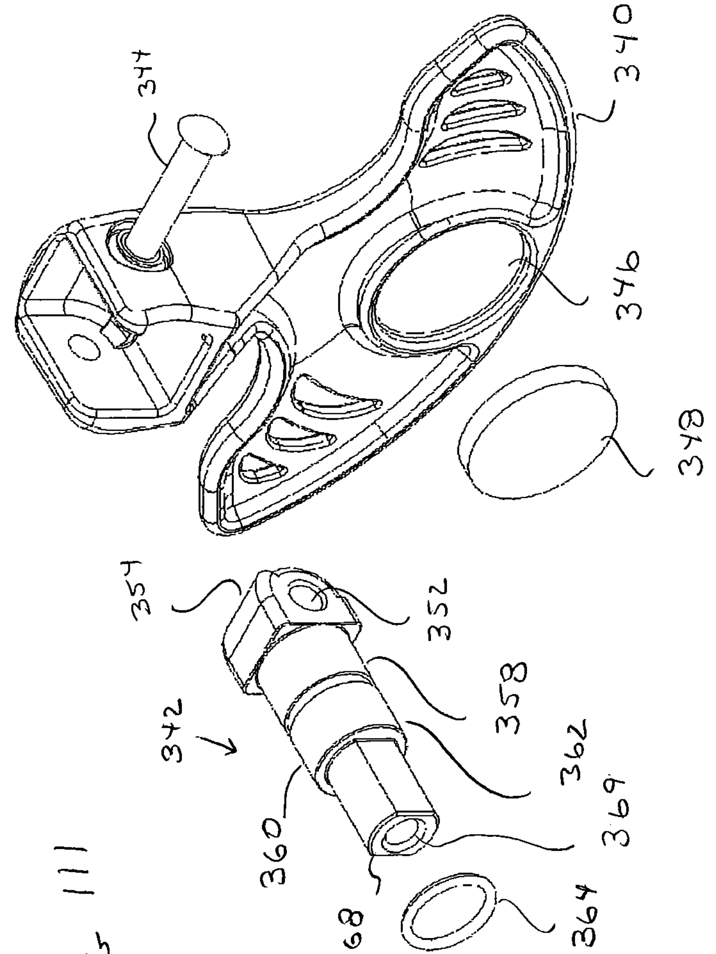
FIG. 112 is a back top left exploded perspective view of the handle and shank assembly shown in FIG. 111.
Figure 111:
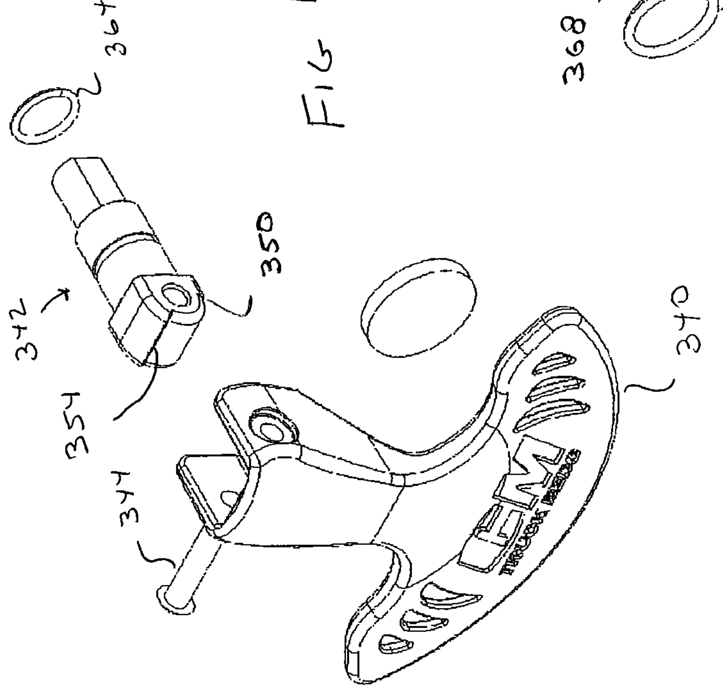
FIG. 111 is a front top right exploded perspective view of the exemplary handle and shank assembly of the latch shown in FIG. 101.
Figure 113:
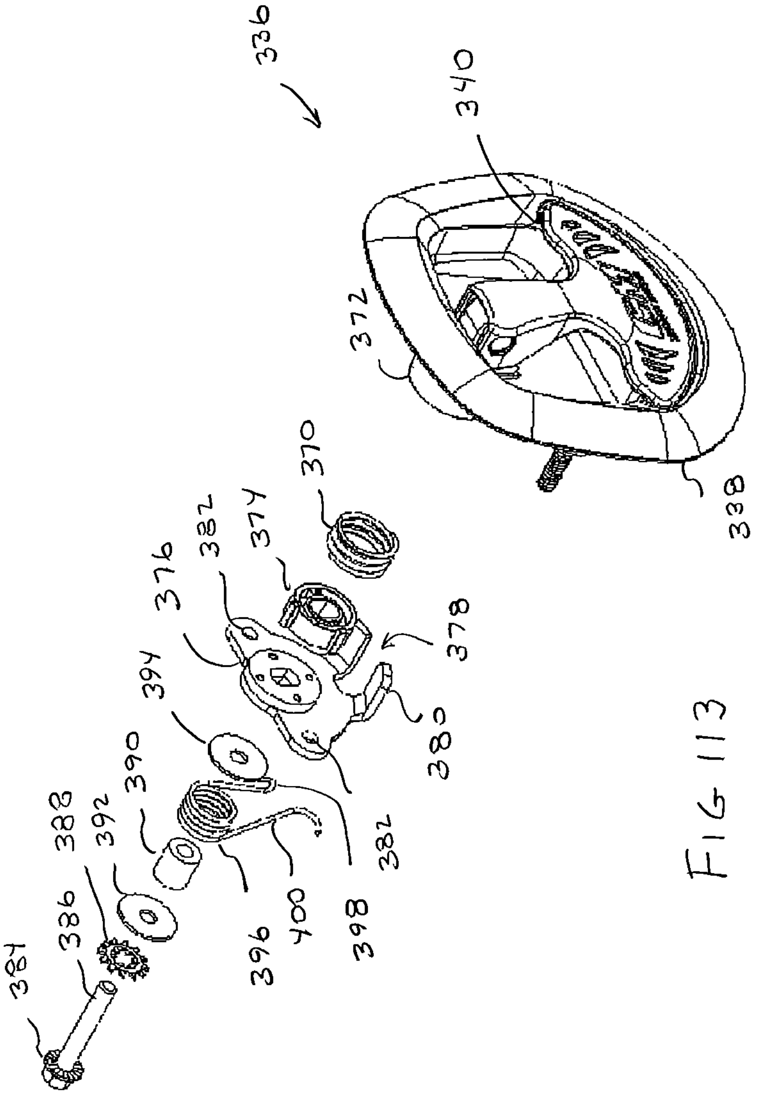
FIG. 113 is a top front right exploded view of the latch shown in FIG. 101.
Figure 114:
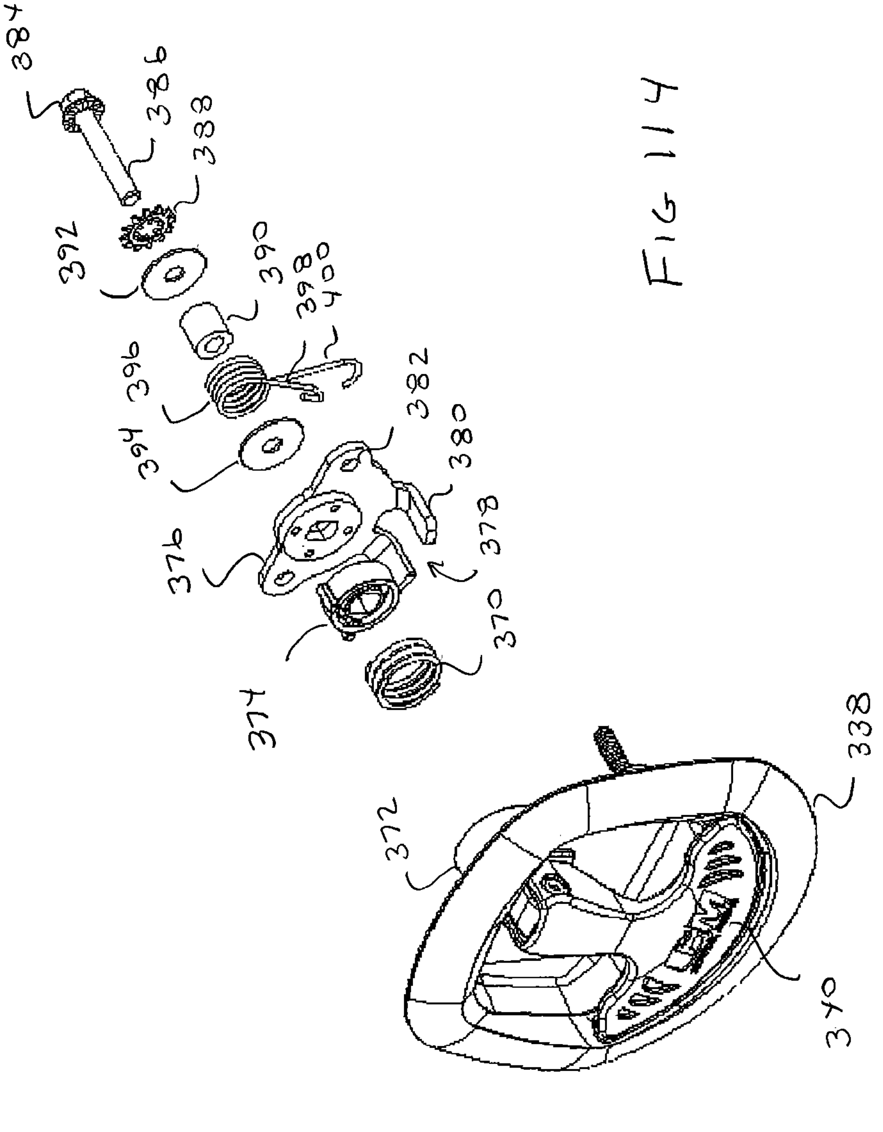
FIG. 114 is a top front left exploded view of the latch shown in FIG. 101.
Figure 115:
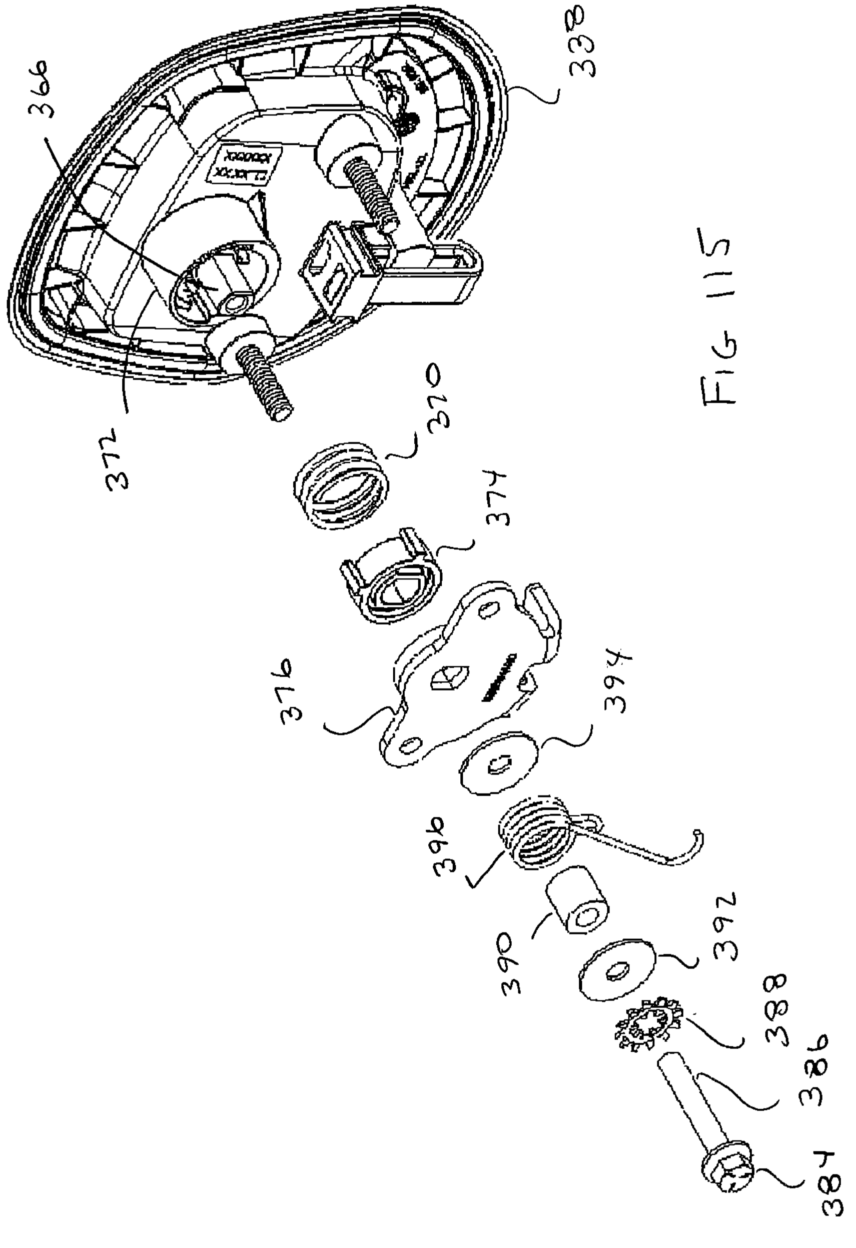
FIG. 115 is a back top left exploded view of the latch shown in FIG. 101.
Figure 116:
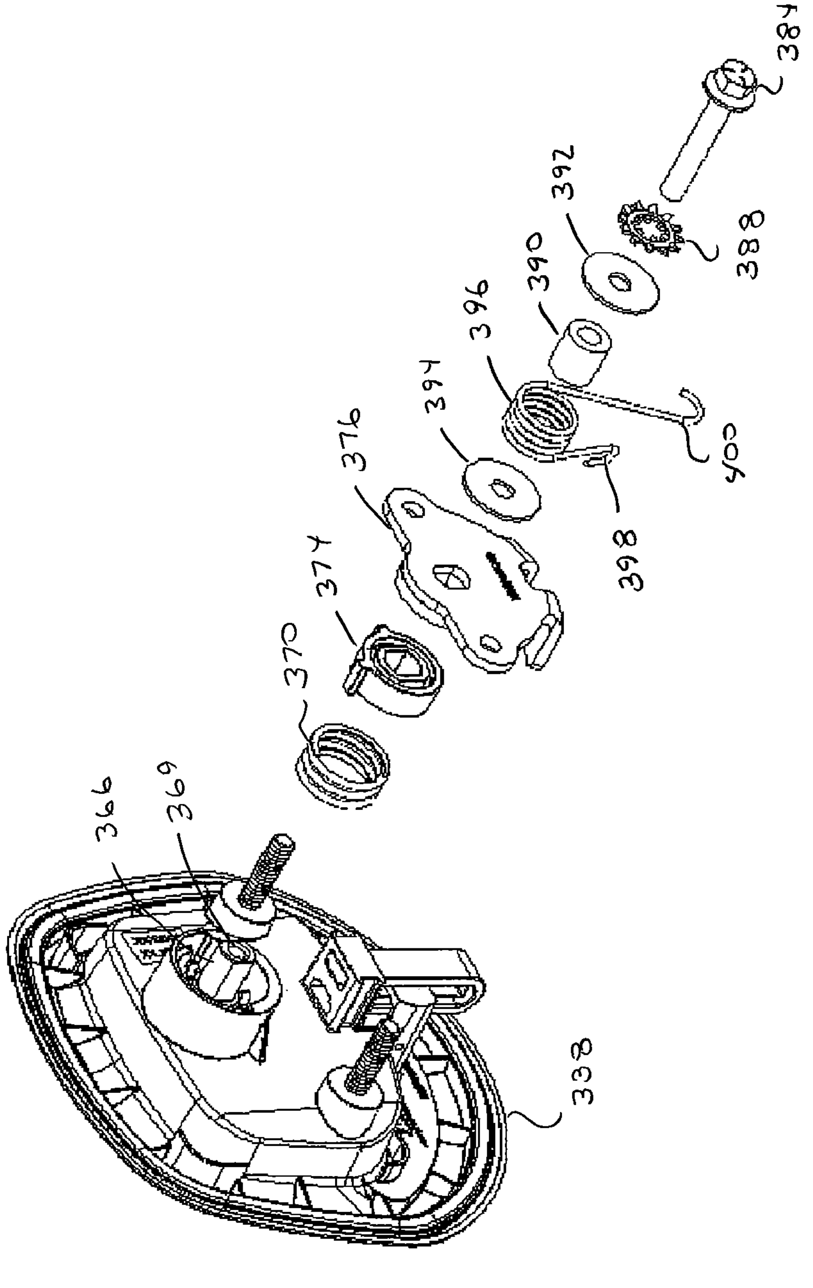
FIG. 116 is a back top right exploded view of the latch shown in FIG. 101.

Latch 336 includes a body 338. Body 338 may be similar to body 10 previously described. Latch 336 further includes a handle 340. Handle 340 may be similar to handle 18 and handle 248 of the prior arrangements. The exemplary handle 340 differs from the previously described handles by including stylized indicia on the fin portion thereof but may be functionally the same. As shown in FIGS. 111 and 112 the exemplary handle 340 is in operative rotatable connection with a rotatable shank 342 via a pin 344. The inner side of the handle 340 further includes a recess 346 which has a resilient pad 348 positioned therein. The resilient pad 348 is positioned in overlying relation of the key cylinder when the handle is in the retracted position.

Figure 107:
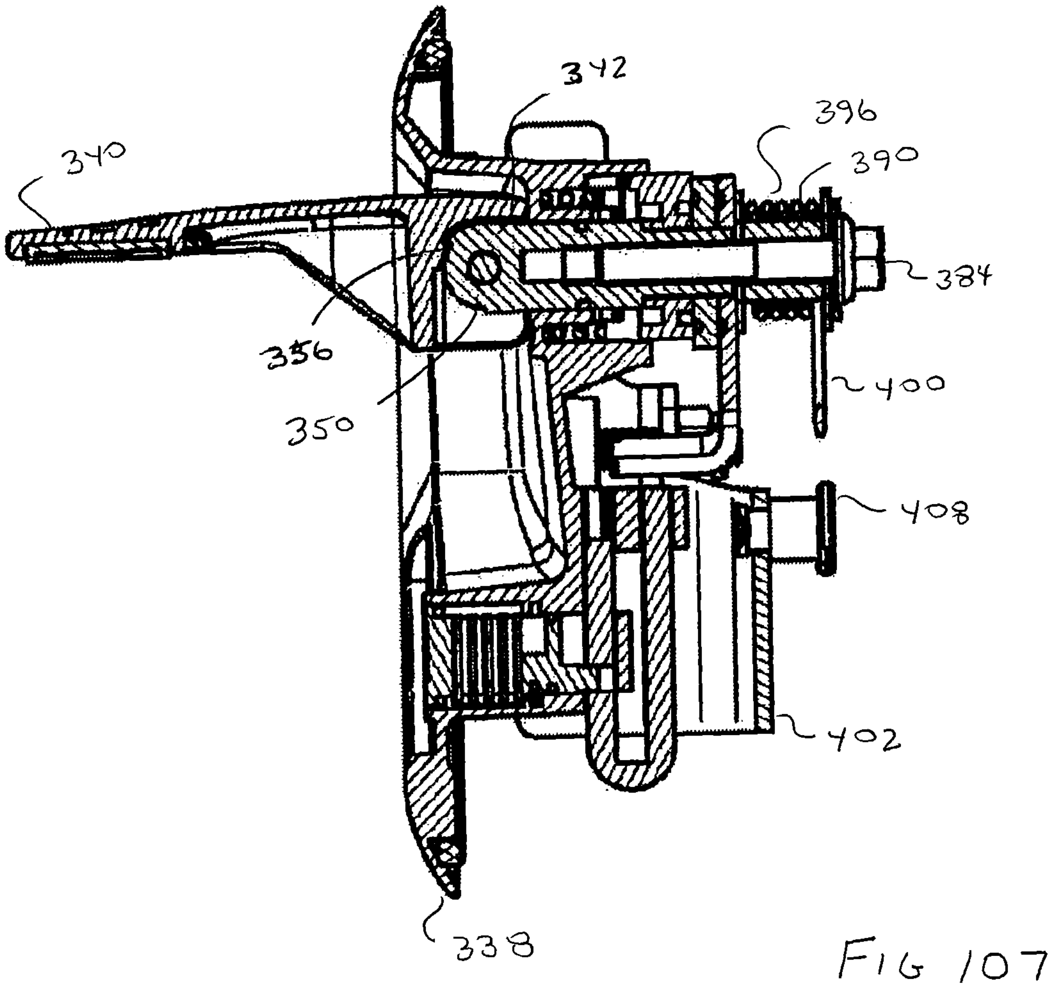
FIG. 107 is a cross-sectional view similar to FIG. 106 but with the handle in an extended position.
Figure 109:
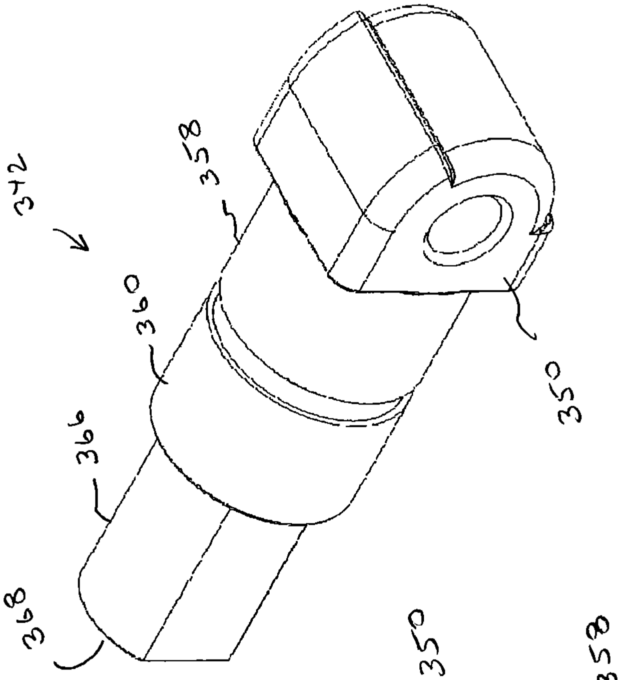
FIG. 109 is a front top left perspective view of the shank shown in FIG. 108.
Figure 110:
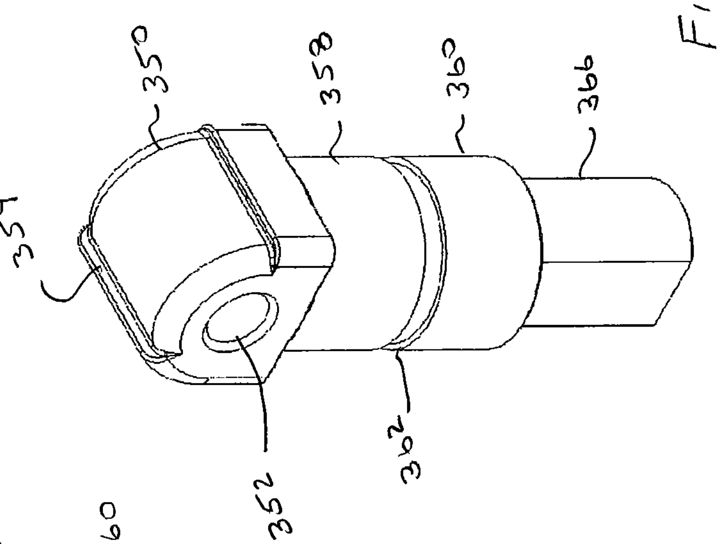
FIG. 110 is a top right perspective view of the shank is shown in FIG. 108.
Figure 108:
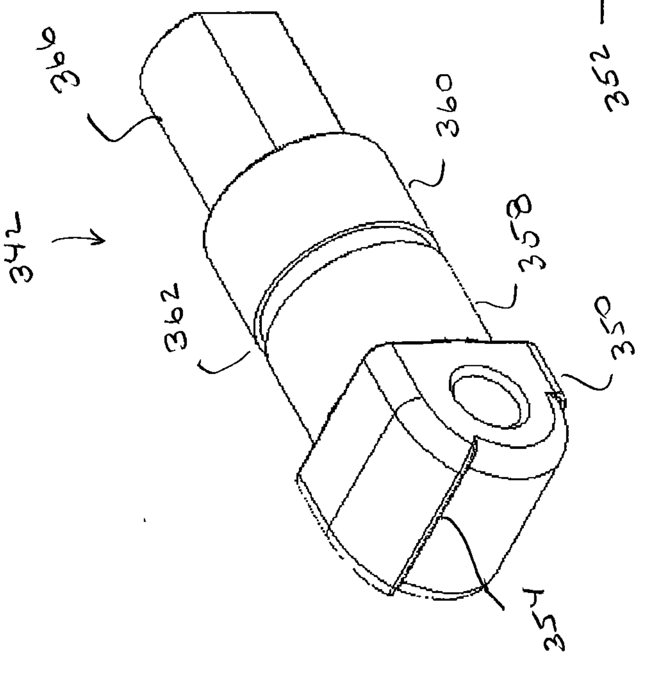
FIG. 108 is a front top right perspective view of the exemplary shank of the latch shown in FIG. 101.

Similar to the previously described arrangements the exemplary shank 342 includes a head portion 350. The head portion 350 includes an aperture 352 through which the pin 344 extends. The exemplary head further includes an outward extending projection 354 which is configured to engage a projection 356 that extends between sidewalls of the head portion of the handle 340 when the handle is moved into the extended position as shown in FIG. 107.

Similar to the previously described arrangements the exemplary shank 342 includes a shaft portion 358 that extends in a shank opening in the body 338. A cylindrical portion 360 is positioned axially inward from a annular recess 362. The annular recess is configured to receive a resilient ring 364 therein. The resilient ring 364 is configured to extend radially between the shank and the annular wall bounding the shank opening through the body to prevent moisture and other contaminants from passing from the front side to the back side of the latch. The exemplary shank 342 further includes further axially disposed away from the head 350, a flattened portion 366. The flattened portion 366 may be similar in cross-sectional configuration to flattened portion 40 previously described. The flattened portion 366 terminates axially inwardly at an inward end 368 which includes an axially centered threaded opening 369. Of course it should be understood that this shank configuration is exemplary and in other arrangements other configurations may be used.

The exemplary latch 336 further includes at least one spring that is operative to cause the shank to be biased at least one of axially and rotationally. The exemplary at least one spring includes a compression spring 370. The compression spring 370 may be similar to compression springs 86 and 224 previously described and operates to cause the shank to be axially biased. The exemplary compression spring extends within an annular wall 372 that extends on the back side of the latch and which bounds an IC bore having a configuration similar to that described in connection with the prior arrangements. An indexing cam 374 is positioned axially rearward of the compression spring 370. The indexing cam is in operatively fixed rotational connection with the flattened portion 366 of the shank 342. The indexing cam 374 may have a configuration similar to that of indexing cams 88, 200 or 222 and may function in a similar manner. The configuration of the indexing cam that is utilized will depend on the nature of the rotation of the shank and handle that is to be permitted for the particular latch configuration.

A striker 376 is positioned axially inward of the indexing cam 374. The striker 376 may have a configuration similar to the strikers previously described. The striker is in fixed operative rotational connection with the flattened portion 366 of the shank. The striker 376 includes a bolt engagement aperture 378 that extends between a pair of striker projections 380. In exemplary arrangements the striker is configured to engage a cam bolt in the locked position in a manner like that previously described so that the shank and the handle cannot be moved away from the latched position. The exemplary striker 376 further includes a pair of engagement apertures 382. Each engagement aperture 382 is configured to receive therein a respective latching shaft or other latching member that is moved responsive to the rotational movement of the striker 376. Of course it should be understood that this arrangement is exemplary and in other arrangements other approaches may be used.

The exemplary latch 336 further includes a fastening bolt 384. The bolt includes a threaded forward end 386 which extends along the IC bore axis and is configured to releasably engage the threaded opening 369 of the shank 342. In the exemplary arrangement the forward end 386 of the bolt extends through an opening in a locking washer 388. The forward end of the bolt further extends through an opening in an annular sleeve 390. The bolt also extends through respective openings in each of a pair of spacers 392, 394 that are positioned on opposed axial sides of the annular sleeve 390.

The at least one spring of the exemplary latch includes a return spring 396 that extends in surrounding relation of the annular sleeve. The return spring is configured to cause the striker and the shank to be rotationally biased towards the latched rotational position. In the exemplary arrangement the return spring 396 comprises a torsion spring which is configured to provide a rotational biasing force when the shank is moved away from the first rotational shank position which corresponds to the latched position. In the exemplary arrangement the return spring 396 includes a first radially extending spring leg 398. In the exemplary arrangement the first radially extending spring leg includes a turned end portion that is engaged with the striker. In the exemplary arrangement shown in FIG. 104 the turned portion of the first spring leg 398 engages the striker 376 in a recess that is contiguous with the aperture that extends between the striker projections 380. Of course it should be understood that this configuration of the spring and its engagement with the striker is exemplary and in other arrangements other types of springs and engagement approaches may be used.

The exemplary return spring further includes a second radially extending spring leg 400. As shown for example in FIG. 104, the exemplary latch 336 includes a retainer 402. The retainer 402 is generally configured in a manner similar to the retainer 178 previously described. The exemplary retainer 402 includes a bridge portion 404 and a central hump 406. Extending rearwardly from the back of the hump 406 of the retainer 402 is a retainer post 408. In the exemplary arrangement the retainer post 408 comprises a rearward extending projection that terminates rearwardly in an enlarged head. In the exemplary arrangement the second spring leg 400 terminates in a curved portion that engages the retainer post 408. As a result in the exemplary arrangement the return spring 396 is configured to act so as to bias the shank and the striker toward the latched position with increasing biasing force as the handle is moved rotationally away from the latched position.

Figure 106:
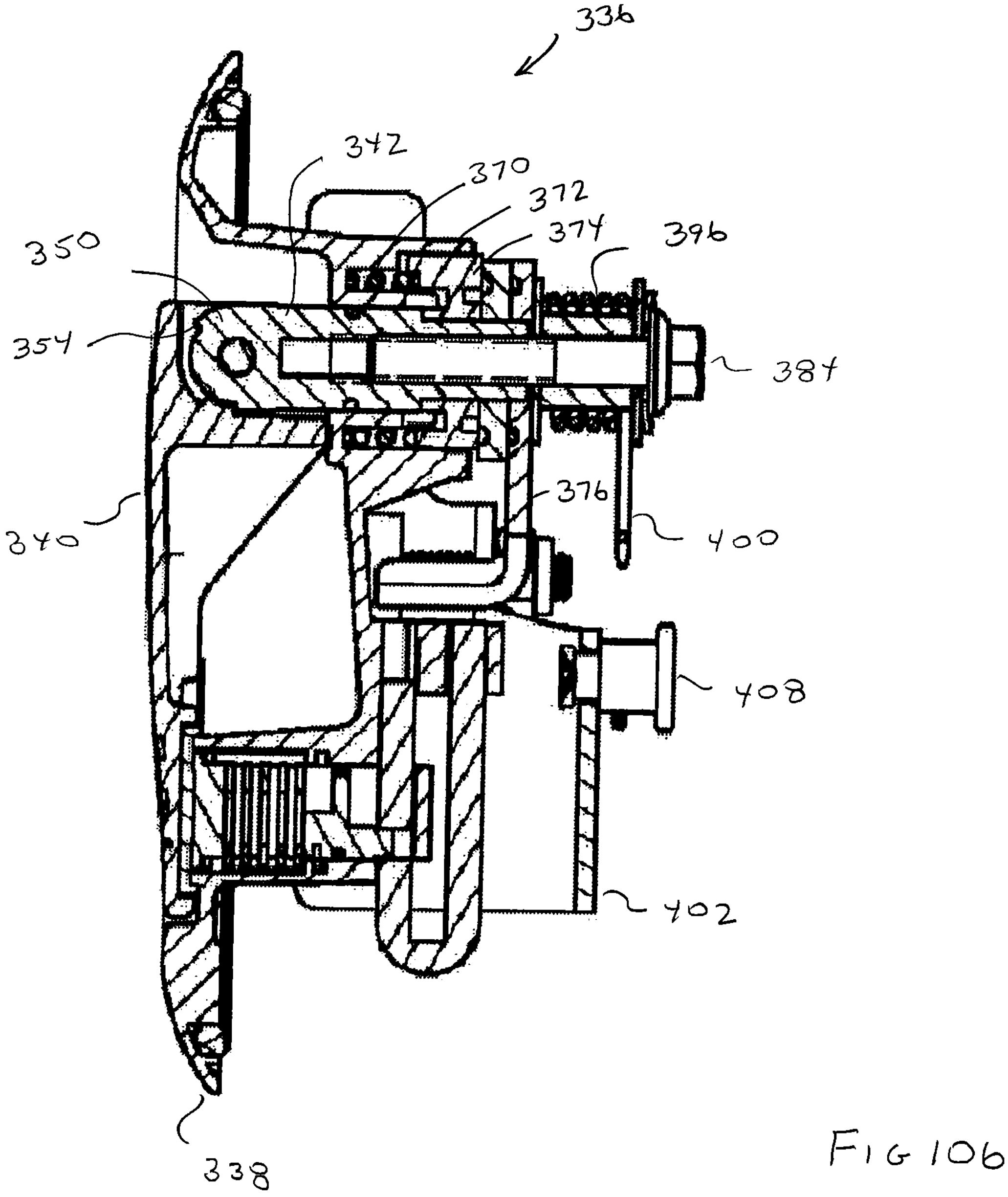
FIG. 106 is a cross-sectional view taken along line 106-106 in FIG. 105 and with the handle of the latch in a retracted position.

Further as can be appreciated in the exemplary arrangement the striker, the shank and the bolt are movable together in the axial direction as the handle moved between the retracted position as shown in FIG. 106 and the extended position as shown in FIG. 107. As the exemplary return spring extends in surrounding relation of the annular sleeve 390, the return spring is enabled to relatively move with respect to the shank so that the axial movement and rotational movement of the sleeve does not interfere with the return biasing force that is applied by the return spring.

Figure 102:
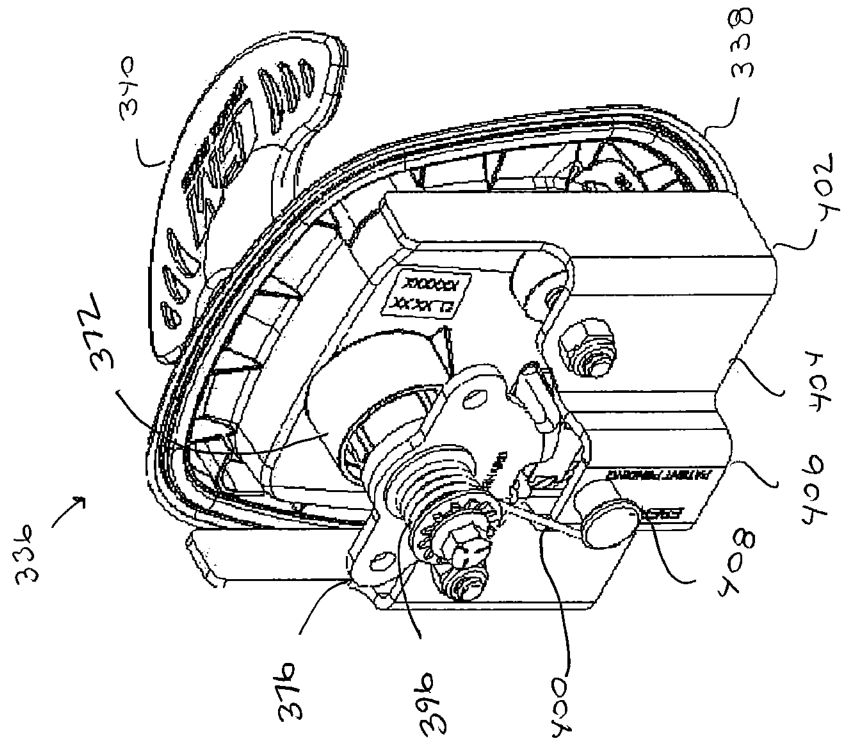
FIG. 102 is a top back left perspective view of the alternative latch shown in FIG. 101.
Figure 101:
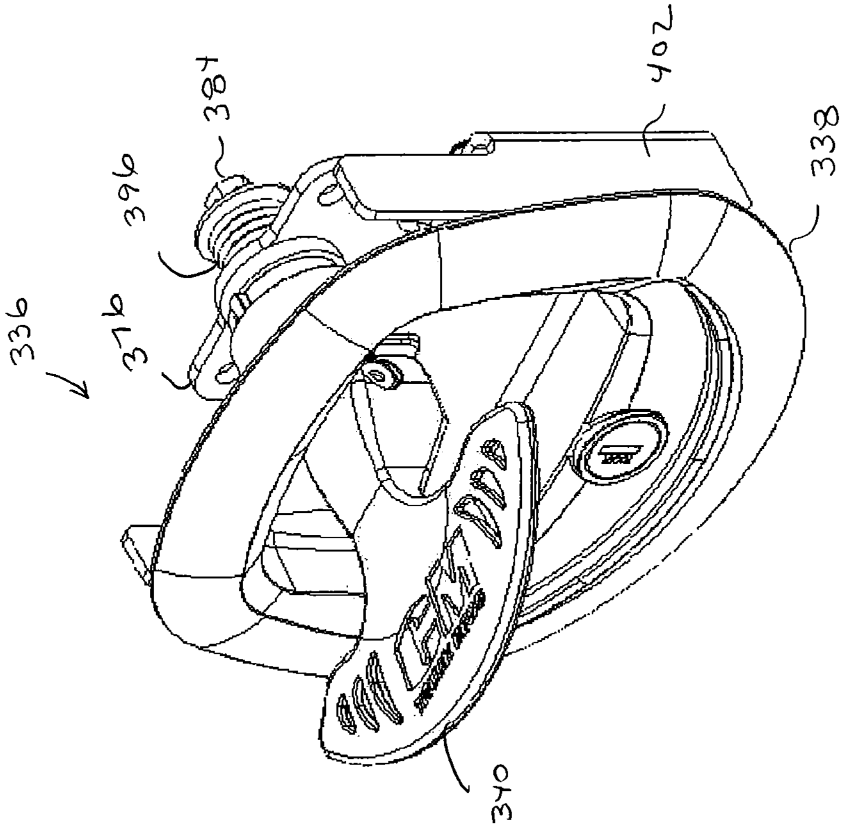
FIG. 101 is a top front right perspective view of a further alternative latch that includes a return spring that is operative to bias the latch handle toward the latched rotational position.
Figure 104:
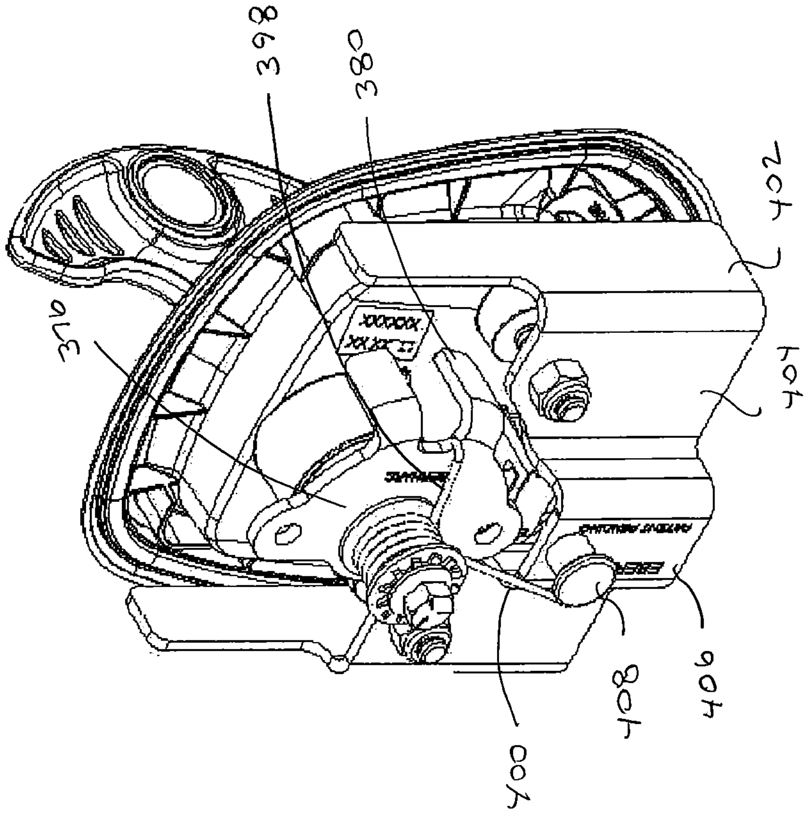
FIG. 104 is a top back left perspective view of the latch as shown in FIG. 103.
Figure 103:
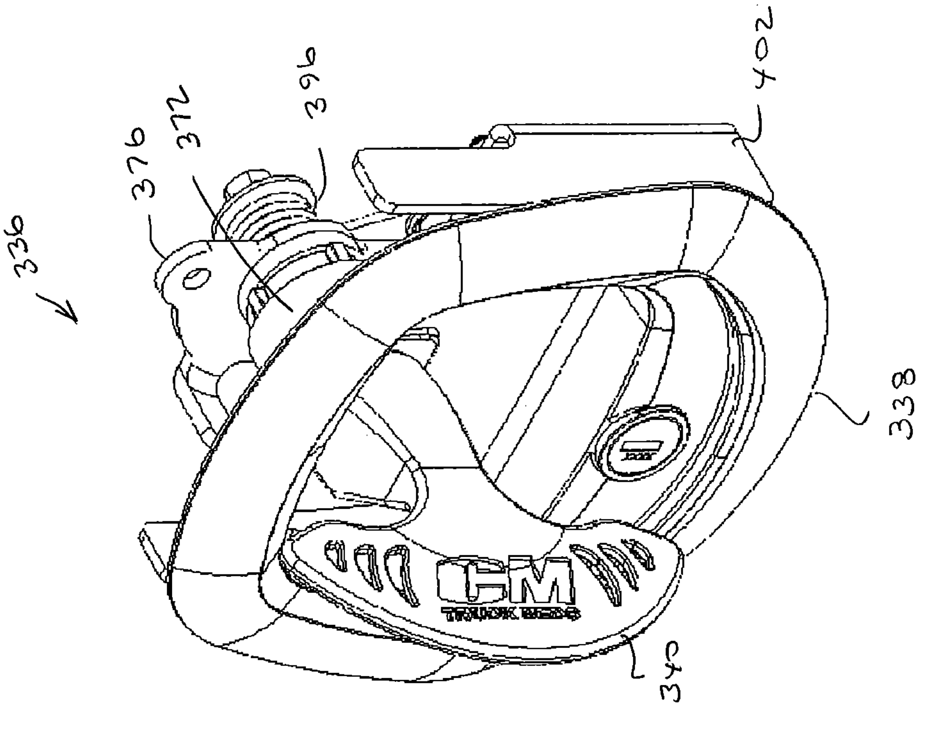
FIG. 103 is a top front right perspective view of the latch shown in FIG. 101 with the latch handle rotated away from the latched position.
Figure 105:
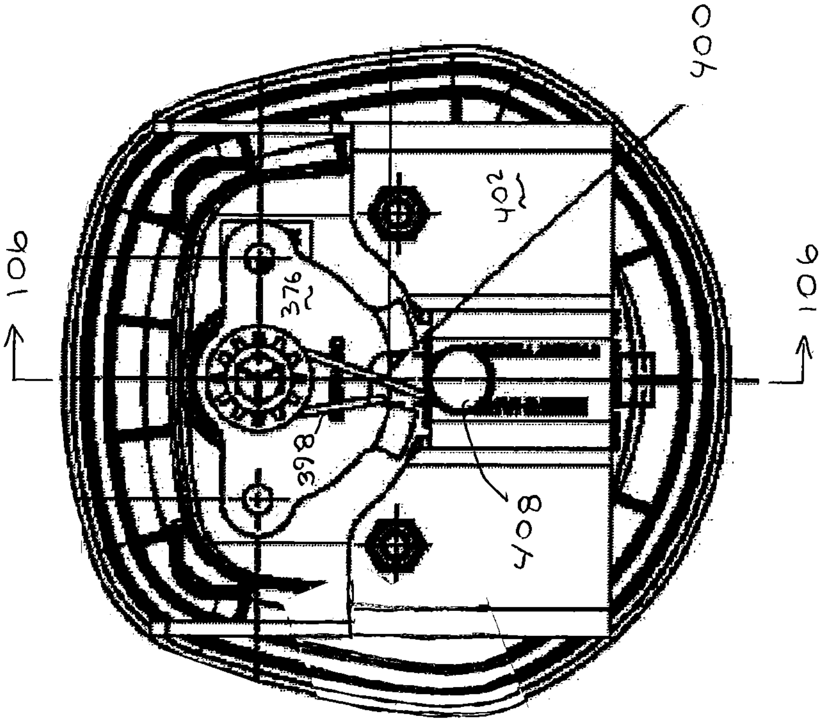
FIG. 105 is a back view of the latch shown in FIG. 101.

It should be appreciated that in the exemplary arrangement of latch 336, the indexing cam 374 enables rotational movement of the handle only about 90° from the latched position of the handle as shown in FIGS. 101 and 102, to the unlatched position that is shown in FIGS. 103 and 104. As a result the exemplary the torsion spring needs only to provide a return biasing force that acts in a counterclockwise direction on the handle when viewed from the front of the latch. However it should be understood that in other exemplary arrangements different biasing springs or other members and configurations may be utilized to provide the return biasing function for the handle. For example in arrangements where the latch is configured so that the handle moves counterclockwise between the latched position and the unlatched position, the return spring may be configured to provide a biasing force that acts in the opposite rotational direction of the return spring 396. Further in other exemplary arrangements like those previously discussed where the handle may move from the latched position in each rotational direction, a centering return spring may be provided. In some arrangements this may include a torsion spring arrangement. However in other exemplary arrangements a tension spring, compression spring, leaf spring or other biasing approach may be utilized.

It should be appreciated that in other exemplary arrangements the functions of the compression spring 370 and the return spring 396 may be performed by a single biasing spring or other arrangement. For example in some arrangements a torsion, tension or other spring may function to bias the shank rearwardly while also biasing the shank and other components operatively attached thereto to the latched position. Further in alternative arrangements a spring arrangement may be utilized that biases the shank away from the latched position. This may be used for arrangements where it is desired that the latch remain in the unlatched condition until it is deliberately secured in the latched condition. Numerous different arrangements may be provided to achieve the capabilities that have been described herein.

Thus the exemplary arrangements achieve improved operation, eliminate difficulties encountered in the use of prior devices and systems, and attain the useful results described herein.

In the foregoing description certain terms have been used for brevity, clarity and understanding. However no unnecessary limitations are to be implied therefrom because such terms are used for descriptive purposes and are intended to be broadly construed. Moreover the descriptions and illustrations herein are by way of examples and the new and useful concepts are not limited to the exact features shown and described.

It should be understood that features and/or relationships associated with one arrangement can be combined with features and/or relationships of another arrangement. That is, various features and/or relationships from various arrangements can be combined in further arrangements. The inventive scope of the disclosure is not limited to only the exact arrangements shown or described herein.

Having described the features, discoveries and principles of the exemplary arrangements, the manner in which they are constructed and operated, and the advantages and useful results attained, the new and useful features, devices, elements, arrangements, parts, combinations, systems, equipment, operations, methods, processes and relationships are set forth in the appended claims.

We claim:

1. Apparatus comprising:
- a latch including
  - a body, wherein the body includes
    - a front side,
    - a back side,
    - a shank opening,
      - wherein the shank opening extends through the body between the front side and the back side,
  - an indexing cam (IC) bore, wherein the IC bore
    - extends in fixed operative connection with the body on the back side in centered relation about an IC bore axis, wherein the IC bore axis is aligned with the shank opening,
    - includes an annular inner IC bore wall, wherein the inner IC bore wall includes at least one radially outward extending, axially elongated IC bore slot,
  - a lock cylinder (LC) bore, wherein the LC bore extends in fixed operative connection with the body about an LC bore axis and includes an LC bore opening on the front side of the body, a lock cylinder, wherein the lock cylinder includes a key opening, wherein the key opening is configured to accept a correct key in engagement therein, wherein the lock cylinder extends in the LC bore, wherein with the lock cylinder in engagement with the correct key, the lock cylinder is enabled to be rotatably movable in the LC bore, and with the lock cylinder not in engagement with the correct key, the lock cylinder is enabled to be held in a fixed locked rotational position in the LC bore, at least one rotatable eccentric projection or recess, wherein the at least one eccentric projection or recess is in operative connection with the lock cylinder and is rotatably movable relative to the body, extends parallel to and is transversely disposed from the LC bore axis, a bolt guide, wherein the bolt guide is in fixed operative connection with the body, extends on the back side of the body, and includes at least one bolt guide opening, a shank, wherein the shank includes a head portion, wherein the head portion extends on the front side, wherein the shank extends in the shank opening and in the IC bore along the IC bore axis, wherein the shank is movably mounted in operatively supported connection with the body such that the shank is movable both rotationally about and axially along the IC bore axis, an indexing cam, wherein the indexing cam is in operatively fixed connection with the shank, is both axially movable along and rotationally movable about the IC bore axis within the IC bore, includes at least one radially outward extending IC projection, wherein in a first rotational shank position and a first axial shank position of the shank, a respective IC projection is engaged in the IC bore slot, whereby the shank is held in the first rotational shank position, wherein in the first rotational shank position and in a second axial shank position axially disposed from the first axial shank position of the shank, the respective IC projection is not engaged in the respective IC bore slot, whereby the shank is not prevented by engagement of the IC projection and the IC bore slot from being rotationally movable away from the first shank rotational position, at least one spring, wherein the at least one spring is operative to cause the shank to be biased, a manually engageable handle, wherein the handle is positioned on the front side of the body, is in rotatably movable operative connection with the head of the shank, is movable with the shank when the shank is in the first rotational shank position between a retracted position, wherein in the retracted position the handle outwardly overlies the key opening, and an extended position, wherein in the extended position the handle is disposed away from the key opening, wherein movement of the handle between the retracted position and the extended position is operative to enable the shank in the first rotational shank position to move between the first axial shank position and the second axial shank position, a cam bolt, wherein the cam bolt is movable in operative supported connection with the body on the back side, is constrained to move along a direction in guided relation with the at least one bolt guide opening, includes a distal portion, wherein the distal portion extends outside the at least one bolt guide opening, wherein the cam bolt is in operative connection with the at least one eccentric projection or recess, wherein rotation of the lock cylinder in the LC bore is operative to move the cam bolt between a locked cam bolt position, and an unlocked cam bolt position, a striker, wherein the striker extends on the back side, is in fixed operative connection with the shank, is movable rotationally about and axially movable along the IC bore axis with movement of the shank, includes a striker projection that extends radially outward from the IC bore axis, wherein the striker projection includes a bolt engagement aperture, wherein the bolt engagement aperture is sized to receive the distal portion of the cam bolt therein, wherein in the locked cam bolt position of the cam bolt and in a latched rotational position of the striker, the distal portion of the cam bolt extends in the bolt engagement aperture and prevents the striker from rotationally moving away from the latched rotational position, while the striker is axially movable in connection with the shank between the first axial shank position and the second axial shank position, wherein in the unlocked cam bolt position of the cam bolt and in the latched rotational position of the striker, the distal portion is disposed away from the bolt engagement aperture, the striker is rotationally movable away from the latched rotational position responsive to rotational movement of the handle, wherein the striker is configured to be operatively connected to a movable door bolt, wherein the door bolt is operatively configured to hold a movable door in a closed position when the striker is in the latched rotational position, and is operable to enable the door to be moved from the closed position to an open position when the striker is rotationally disposed away from the latched rotational position.

2. The apparatus according to claim 1 wherein the cam bolt is U-shaped and includes a pair of disposed legs, wherein the bolt guide includes a pair of separate bolt guide openings, wherein each leg movably extends in a respective one of the bolt guide openings.

3. The apparatus according to claim 1 wherein the cam bolt is U-shaped and includes a pair of disposed legs, wherein the bolt guide includes a pair of separate bolt guide openings, wherein each leg movably extends in a respective one of the bolt guide openings, wherein a first leg of the cam bolt includes the distal portion, wherein the eccentric projection or recess comprises an eccentric projection, wherein a second leg of the cam bolt includes a cam bolt recess, wherein the eccentric projection is operative to move the cam bolt between the cam bolt unlocked position and the cam bolt locked position through engagement of the eccentric projection in the cam bolt recess.

4. The apparatus according to claim 1 wherein the cam bolt is U-shaped and includes a pair of disposed legs, wherein the bolt guide includes a pair of separate bolt guide openings, wherein each leg movably extends in a respective one of the bolt guide openings, wherein a first leg of the cam bolt includes the distal portion, wherein the eccentric projection or recess comprises an eccentric projection, wherein a second leg of the cam bolt includes a cam bolt recess, wherein the eccentric projection is operative to move the cam bolt between the cam bolt unlocked position and the cam bolt locked position through engagement of the eccentric projection in the cam bolt recess, wherein the second leg of the cam bolt including the cam bolt recess, extends in the LC bore, wherein the eccentric projection is in engagement with the cam bolt recess in the LC bore.

5. The apparatus according to claim 1 wherein the cam bolt is U-shaped and includes a pair of disposed legs, wherein the bolt guide includes a pair of separate bolt guide openings, wherein each leg movably extends in a respective one of the bolt guide openings, wherein a first leg of the cam bolt includes the distal portion, wherein the eccentric projection or recess comprises an eccentric projection, wherein a second leg of the cam bolt includes a cam bolt recess, wherein the eccentric projection is operative to move the cam bolt between the unlocked cam bolt position and the locked cam bolt position through engagement of the eccentric projection in the cam bolt recess, wherein the second leg of the cam bolt including the cam bolt recess, extends in the LC bore, wherein the eccentric projection is in engagement with the cam bolt recess in the LC bore, wherein the body includes a leg guide opening that extends through the LC bore, wherein the second leg of the cam bolt extends through the leg guide opening, wherein the leg guide opening is aligned along the direction with the one of the bolt guide openings in the bolt guide in which the second leg of the cam bolt extends.

6. The apparatus according to claim 1 wherein the at least one spring comprises:

a compression spring, wherein the compression spring extends in concentric relation with the IC bore, wherein the compression spring is operative to bias the shank towards the second axial shank position.

7. The apparatus according to claim 1 wherein the IC bore further includes an inside bore annular wall, wherein the inside bore annular wall is concentric with and radially spaced inwardly from the annular inner IC bore wall, wherein the at least one spring comprises a compression spring that is operative to bias the shank toward the second axial shank position and that extends radially intermediate of the inside bore annular wall and the annular inner IC bore wall.

8. The apparatus according to claim 1 wherein the at least one radially outward extending, axially elongated IC bore slot in the annular inner IC bore wall includes an IC bore slot, and a further IC bore slot, wherein the further IC bore slot is disposed from the IC bore slot in a first rotational direction and at a first angle about the IC bore axis, wherein a respective one of the at least one radially outward extending IC projection is engageable with the further IC bore slot when the shank is in a second rotational shank position, wherein movement of the handle when the shank is in the second rotational shank position, from the extended handle position to a further retracted position in which the handle extends generally perpendicular to the shank, is operative to cause the shank to move from the second axial shank position to the first axial shank position, wherein the respective one radially outward extending IC projection is engaged in the further IC bore slot such that the shank is held in the second rotational shank position.

9. The apparatus according to claim 1 and further comprising:

a stop, wherein the stop is in operative connection with the IC bore, wherein the stop is operative to engage the at least one radially outward extending IC projection and prevent the shank in the second axial shank position from rotation in a first rotational direction away from the first rotational shank position beyond a second rotational shank position.

10. The apparatus according to claim 1 wherein the IC bore includes an arcuate recess, wherein the arcuate recess extends parallel to the IC bore axis, wherein the arcuate recess is angularly bounded by a stop, wherein with the shank in the second axial shank position, the at least one radially outward extending IC projection is moved in a first rotational direction within the arcuate recess as the shank is moved between the first rotational shank position and a second rotational shank position in which one of the at least one IC projection is in engagement with the stop, wherein such engagement prevents further rotation of the shank in the first rotational direction.

11. The apparatus according to claim 1 wherein the at least one radially outward extending, axially elongated IC bore slot in the annular inner IC bore wall includes an IC bore slot, a further IC bore slot, and an additional IC bore slot, wherein the further IC bore slot is disposed from the IC bore slot in a first rotational direction and at a first angle about the IC bore axis, wherein a respective one of the at least one radially outward extending IC projection is engageable with the further IC bore slot when the shank is in a second rotational shank position, wherein movement of the handle when the shank is in the second rotational shank position, from the extended handle position to a further retracted position in which the handle extends generally perpendicular to the shank, is operative to cause the shank to move from the second axial shank position to the first axial shank position, wherein the respective one radially outward extending IC projection is engaged in the further IC bore slot such that the shank is held in the second rotational shank position, wherein the additional IC bore slot is disposed from the IC bore slot at a second angle about the IC bore axis and in a second rotational direction opposed of the first rotational direction, wherein a further respective one of the at least one radially outward extending IC projection is engageable with the additional IC bore slot when the shank is in a third rotational shank position, wherein movement of the handle when the shank is in the third rotational shank position, from the extended handle position to an additional retracted position in which the handle extends generally perpendicular to the shank, is operative to cause the shank to move from the second axial shank position to the first axial shank position, wherein the further respective one of the at least one radially outward extending IC projection is engaged in the additional IC bore slot such that the shank is held in the third rotational shank position.

12. The apparatus according to claim 1 wherein the at least one radially outward extending, axially elongated IC bore slot in the annular inner IC bore wall includes an IC bore slot, a further IC bore slot, and an additional IC bore slot, wherein the further IC bore slot is disposed from the IC bore slot in a first rotational direction and at a first angle about the IC bore axis, wherein a respective one of the at least one radially outward extending IC projection is engageable with the further IC bore slot when the shank is in a second rotational shank position, wherein movement of the handle when the shank is in the second rotational shank position, from the extended handle position to a further retracted position in which the handle extends generally perpendicular to the shank, is operative to cause the shank to move from the second axial shank position to the first axial shank position, wherein the respective one radially outward extending IC projection is engaged in the further IC bore slot such that the shank is held in the second rotational shank position, wherein the additional IC bore slot is disposed from the IC bore slot at a second angle about the IC bore axis and in a second rotational direction opposed of the first rotational direction, wherein a further respective one of the at least one radially outward extending IC projection is engageable with the additional IC bore slot when the shank is in a third rotational shank position, wherein movement of the handle when the shank is in the third rotational shank position, from the extended handle position to an additional retracted position in which the handle extends generally perpendicular to the shank, is operative to cause the shank to move from the second axial shank position to the first axial shank position, wherein the further respective one of the at least one radially outward extending IC projection is engaged in the additional IC bore slot such that the shank is held in the third rotational shank position, and further comprising:

a stop, wherein the stop is in operative connection with the IC bore, wherein the stop is operative to engage the at least one radially outward extending IC projection and prevent the shank in the second axial shank position from being rotated in the first rotational direction beyond the second rotational shank position, a further stop, wherein the further stop is in operative connection with the IC bore, wherein the further stop is operative to engage the at least one radially outward extending IC projection and prevent the shank in the second axial shank position from being rotated in the second rotational direction beyond the third rotational shank position, wherein the IC bore includes an arcuate recess, wherein the arcuate recess extends parallel to the IC bore axis, wherein the arcuate recess is angularly bounded by the stop and the further stop, wherein with the shank in the second axial shank position, the at least one radially outward extending IC projection moves in the arcuate recess as the shank is moved between the first and third shank rotational positions.

13. The apparatus according to claim 12 wherein each of the second rotational shank position and the third rotational shank position are each disposed at generally about 90° from the first rotational shank position.

14. The apparatus according to claim 1 and further comprising:

a tongue, wherein the tongue extends on the front side of the body and is in fixed operative connection with the head portion of the shank, wherein the tongue includes a tongue aperture, wherein the handle includes at least one handle aperture, wherein in the first rotational shank position and the first axial shank position of the shank, and with the handle in the retracted position, the tongue aperture and the at least one handle aperture are aligned, whereby a loop of a lock is releasably extendable through the aligned tongue aperture and at least one handle aperture, such that the handle is not movable from the retracted position.

15. The apparatus according to claim 1 and further comprising:

a tongue, wherein the tongue extends on the front side of the body and is in fixed operative connection with the head portion of the shank, wherein the tongue includes a tongue aperture, wherein the handle includes a pair of transversely disposed side walls, wherein each side wall includes a respective handle aperture, wherein the head portion of the shank is positioned intermediate of the side walls, wherein in the first rotational shank position and the first axial position of the shank, and with the handle in the retracted position, the tongue extends intermediate of the sidewalls and the tongue aperture and both handle apertures are aligned, whereby a loop of a lock is extendable through the aligned tongue aperture and the pair of aligned handle apertures such that the handle is not movable from the retracted position.

16. The apparatus according to claim 1 wherein the handle includes a pair of transversely disposed side walls, wherein the head portion of the shank extends between the side walls, and further comprising:

a pivot pin, wherein the pivot pin includes a pin axis, extends between the head portion of the shank and the side walls of the handle, wherein the handle is rotatably movable between the extended and retracted positions about the pin axis, wherein the handle includes at least one handle cam surface, wherein the front side of the body includes at least one handle cam follower surface, wherein the at least one handle cam surface is engageable with the at least one handle cam follower surface, wherein relative movement of the at least one handle cam surface and the at least one handle cam follower surface is operative to cause the shank to move between the first axial shank position and the second axial shank position as the handle is moved between the extended position and the retracted position.

17. The apparatus according to claim 1 wherein the handle includes a pair of transversely disposed side walls, wherein the head portion of the shank extends between the side walls, and further comprising:

a pivot pin, wherein the pivot pin includes a pin axis, extends between the head portion of the shank and the side walls of the handle, wherein the handle is rotatably movable between the extended and retracted positions about the pin axis, wherein each respective side wall of the handle includes a respective handle cam surface, wherein the front side of the body includes at least one handle cam follower surface, wherein the each handle cam surface is engageable with a respective handle cam follower surface, wherein relative movement of the handle cam surfaces and the handle cam follower surfaces is operative to cause the shank to move between the first axial shank position and the second axial shank position as the handle is moved between the extended position and the retracted position.

18. The apparatus according to claim 1 and further comprising:

a retainer, wherein the retainer extends on the back side of the body and is configured to have the door in intermediate sandwiched relation of the backside of the body and the retainer, wherein the retainer includes a bridge portion and a pair of disposed side panel portions, wherein the side panel portions extend toward the body from the bridge portion, wherein each side panel portion terminates adjacent the body in a respective elongated linear front face, wherein the front face of each of the side panel portions is coplanar, wherein the bridge portion includes a hump, wherein the hump is configured to rearwardly overlie the bolt guide, a pair of disposed threaded members in operative engagement with the body, wherein a respective threaded member is engageable with the body on each opposed side of the bolt guide, a pair of fastener openings through the bridge portion, wherein each fastener opening is in alignment with a respective threaded member, wherein the retainer is operative to hold the latch in releasable fixed engagement with the door.

19. The apparatus according to claim 1 wherein the lock cylinder includes an at least partially circumferential outwardly biased lock cylinder spring, wherein the LC bore includes an annular LC bore slot, wherein the outwardly biased lock cylinder spring is engaged in the annular LC bore slot, a release aperture, wherein the release aperture extends from outside the LC bore to the annular LC bore slot, wherein the release aperture is configured to receive a release pin therein, whereby the release pin in the release aperture is operative to enable compression of the outwardly biased lock cylinder spring, whereby the spring is enabled to disengage from the annular LC bore slot to enable removal of the lock cylinder from the LC bore.

20. The apparatus according to claim 1 wherein the at least one spring comprises a return spring, wherein the return spring is configured to cause the striker to be biased towards the latched rotational position.

21. The apparatus according to claim 1 wherein the at least one spring comprises a torsion return spring, wherein the torsion return spring extends coaxially with the IC bore axis, and is configured to cause the striker to be biased toward the latched rotational position.

22. The apparatus according to claim 1 wherein the at least one spring comprises a torsion return spring, wherein the torsion return spring includes a first radially extending spring leg and a second radially extending spring leg, wherein the first radially extending spring leg is operatively engaged with the striker and is operative to cause the striker to be biased toward the latched rotational position.

23. The apparatus according to claim 1 wherein the at least one spring comprises a return spring, wherein the return spring is configured to cause the striker to be biased toward the latched rotational position, and a compression spring, wherein the compression spring is operative to cause the shank to be biased toward the second axial shank position.

24. Apparatus comprising:
a latch including
a body, wherein the body includes
a front side,
a back side,
a shank opening, wherein the shank opening extends through the body between the front side and the back side,
an indexing cam (IC) bore, wherein the IC bore
extends in fixed operative connection with the body on the back side in centered relation about an IC bore axis, wherein the IC bore axis is aligned with the shank opening,
includes an annular inner IC bore wall, wherein the inner IC bore wall includes at least one radially outward extending, axially elongated IC bore slot,
a shank, wherein the shank
includes a head portion,
wherein the head portion extends on the front side,
wherein the shank extends through the shank opening and in the IC bore along the IC bore axis,
wherein the shank is movably mounted in operative supported connection with the body such that the shank is movable both rotationally about and axially along the IC bore axis,
at least one spring,
wherein the at least one spring is operative to cause the shank to be biased to move at least one of axially and rotationally,
an indexing cam, wherein the indexing cam
is in operative fixed connection with the shank,
is axially movable along and rotationally movable about the IC bore axis within the IC bore,
includes at least one radially outward extending IC projection,
wherein in a first rotational shank position and a first axial shank position of the shank, a respective IC projection is engaged in a respective IC bore slot, wherein the shank is held in the first rotational shank position,
wherein in the first rotational shank position and a second axial shank position axially disposed from the first axial shank position of the shank, the respective IC projection is not engaged in the respective IC bore slot, wherein the shank is rotationally movable away from the first shank rotational position,
a manually engageable handle, wherein the handle
is positioned on the front side of the body,
is in rotatably movable operative connection with the head portion of the shank,
wherein the handle is movable with the shank while the shank is in the first rotational shank position, between
a retracted position, wherein in the retracted position the handle extends generally perpendicular to the IC bore axis, and
an extended position, wherein in the extended position the handle is generally aligned along the IC bore axis,
wherein movement of the handle between the retracted position and the extended position is operative to cause the shank while the shank remains rotationally stationary in the first rotational position, to move between the first axial shank position and the second axial shank position,
a striker, wherein the striker
extends on the back side of the body and is in fixed operative connection with the shank,
is movable rotationally about and axially movable along the IC bore axis in coordinated relation with movement of the shank,
wherein the striker is movable between
a holding position, wherein in the holding position the shank is in the first rotational shank position and is in the first axial shank position, whereby the shank is held in the first rotational position by engagement of the respective IC projection in the respective IC bore slot,
a releasing position, wherein when the shank is in the second axial shank position, the shank is rotationally movable by movement of the handle away from the first rotational shank position to the releasing position,
wherein the striker is configured to be operatively connected with a movable door bolt, wherein the door bolt
is operatively configured to hold a movable door in a closed position when the striker is in the holding position, and
enables the door to be moved from the closed position to an open position when the striker is in the releasing position and the shank is rotationally disposed away from the first rotational shank position.

25. The apparatus according to claim 24
and further comprising:
a tongue,
wherein the tongue extends on the front side of the body and is in fixed operative connection with the head portion of the shank,
wherein the tongue includes a tongue aperture,
wherein the handle includes at least one handle aperture,
wherein in the first rotational shank position and the first axial shank position of the shank, and with the handle in the retracted position, the tongue aperture and the at least one handle aperture are aligned,
whereby a loop of a lock is releasably extendable through the aligned tongue aperture and the at least one handle aperture such that the handle is not movable from the retracted position and whereby the striker is not movable from the holding position.

26. The apparatus according to claim 24
and further comprising:
a lock cylinder (LC) bore,
wherein the LC bore extends in fixed operative connection with the body about an LC bore axis and includes an LC bore opening on the front side of the body,
a lock cylinder,
wherein the lock cylinder includes a key opening, wherein the key opening is configured to accept a correct key in engagement therein,
wherein the lock cylinder extends in the LC bore,
wherein with the lock cylinder in engagement with the correct key, the lock cylinder is enabled to be rotatably movable in the LC bore, and with the lock cylinder not in engagement with the correct key, the lock cylinder is enabled to be held in a fixed locked rotational position in the LC bore, wherein in the retracted position of the handle, the handle outwardly overlies the key opening, and wherein in an extended position of the handle, the handle is disposed away from the key opening, at least one rotatable eccentric projection or recess, wherein the at least one eccentric projection or recess is in operative connection with the lock cylinder and is rotatably movable relative to the body, extends parallel to and is transversely disposed from the LC bore axis, a bolt guide, wherein the bolt guide is in fixed operative connection with the body, extends on the back side of the body, includes at least one bolt guide opening, a cam bolt, wherein the cam bolt is in movable operative supported connection with the body on the back side, is constrained to move in guided relation within the at least one bolt guide opening, includes a distal portion, wherein the distal portion extends outside the at least one bolt guide opening, wherein the cam bolt is in operative connection with the at least one eccentric projection or recess, wherein rotation of the lock cylinder in the LC bore is operative to move the cam bolt between a locked cam bolt position, and an unlocked cam bolt position, wherein the striker includes a striker projection that extends radially outward from the IC bore axis, wherein the striker projection includes a bolt engagement aperture, wherein the bolt engagement aperture is sized to receive the distal portion of the cam bolt therein, wherein in the locked cam bolt position of the cam bolt and in the first rotational shank position the distal portion of the cam bolt extends in the bolt engagement aperture and prevents the shank that is fixed operative connection with the striker from rotationally moving away from the first rotational shank position, wherein the striker is axially movable in connection with the shank between the first axial shank position and the second axial shank position while the distal portion remains in engagement with the bolt engagement aperture, wherein in the unlocked cam bolt position of the cam bolt, the distal portion is disposed away from the bolt engagement aperture, and the shank is rotationally movable away from the first rotational shank position and the striker is rotationally movable with the shank away from the holding position.

27. The apparatus according to claim 24 wherein the at least one spring comprises at least one of a compression spring, wherein the compression spring is operative to cause the shank to be axially biased toward the second axial shank position, and a torsion spring, wherein the torsion spring is operative to cause the shank to be rotationally biased toward the first rotational shank position.

28. Apparatus comprising:

a latch including a body, wherein the body includes a front side, a back side, a shank opening, wherein the shank opening extends through the body between the front side and the back side, an indexing cam (IC) bore, wherein the IC bore extends in fixed operative connection with the body in centered relation about an IC bore axis, wherein the IC bore axis is aligned with the shank opening, includes an annular inner IC bore wall, wherein the IC bore wall includes at least one of a radially extending interengageable projection or recess, a shank, wherein the shank includes a head portion, wherein the head portion extends on the front side, wherein the shank extends through the shank opening and in the IC bore along the IC bore axis, wherein the shank is movably mounted in operatively supported connection with the body such that the shank is movable both rotationally about and axially along the IC bore axis, at least one spring, wherein the at least one spring is operative to cause the shank to be at least one of axially and rotationally biased, an indexing cam portion, wherein the indexing cam portion is in operative fixed connection with the shank, is axially movable along and rotationally movable about the IC bore axis, includes at least one of the other of the radially extending interengageable projection or recess, wherein in a first rotational shank position and a first axial shank position of the shank, the at least one interengageable projection and recess are engaged, wherein the shank is held in the first rotational shank position due to such engagement, wherein in the first rotational shank position and a second axial shank position axially disposed from the first axial shank position of the shank, the at least one interengageable projection and recess are not engaged, wherein the shank is rotationally movable away from the first shank rotational position, a manually engageable handle, wherein the handle is positioned on the front side of the body, is in rotatably movable operative connection with the head portion of the shank, is movable with the shank while the shank is in the first rotational shank position between a retracted position, wherein in the retracted position the handle extends generally perpendicular to the IC bore axis, and an extended position, wherein in the extended position the handle is generally aligned along the IC bore axis, wherein movement of the handle between the retracted position and the extended position is operative to cause the shank, while the shank remains rotationally stationary in the first rotational shank position, to move between the first axial shank position and the second axial shank position, a striker, wherein the striker extends on the back side of the body and is in fixed operative connection with the shank, is movable rotationally about and axially movable along the IC bore axis in coordinated relation with movement of the shank, wherein the striker is movable between a holding position wherein the shank is in the first rotational shank position and is in the first axial shank position, whereby the shank is held in the first rotational position by engagement of the at least one interengageable projection and recess, a releasing position wherein the shank is in the second axial shank position, whereby the shank is rotationally movable by movement of the handle away from the first rotational shank position, wherein the striker is configured to be operatively connected with a movable bolt, wherein the bolt is operatively configured to hold a movable member in a first position when the striker is in the holding position, and enables the movable member to be moved from the first position to a second position when the striker is in the releasing position and the shank is rotationally disposed away from the first rotational shank position.

29. The apparatus according to claim 28 and further comprising:

a tongue, wherein the tongue extends on the front side of the body and is in fixed operative connection with the head portion of the shank, wherein the tongue includes a tongue aperture, wherein the handle includes at least one handle aperture, wherein in the first rotational shank position and the first axial shank position of the shank, and with the handle in the retracted position, the tongue aperture and the at least one handle aperture are aligned, whereby a loop of a lock is releasably extendable through the aligned tongue aperture and at least one handle aperture such that the handle is not movable from the retracted position and whereby the striker is not movable from the holding position.

30. The apparatus according to claim 28 and further comprising:

a lock cylinder (LC) bore, wherein the LC bore extends in fixed operative connection with the body about an LC bore axis and includes an LC bore opening on the front side of the body, a lock cylinder, wherein the lock cylinder includes a key opening, wherein the key opening is configured to accept a correct key in engagement therein, wherein the lock cylinder extends in the LC bore, wherein with the lock cylinder in engagement with the correct key, the lock cylinder is enabled to be rotatably movable in the LC bore, and with the lock cylinder not in engagement with the correct key, the lock cylinder is enabled to be held in a fixed locked rotational position in the LC bore, wherein in the retracted position of the handle, the handle outwardly overlies the key opening, and wherein in an extended position of the handle, the handle is disposed away from the key opening, at least one rotatable eccentric projection or recess, wherein the at least one eccentric projection or recess is in operative connection with the lock cylinder and is rotatably movable relative to the body, extends parallel to and is transversely disposed from the LC bore axis, a bolt guide, wherein the bolt guide is in fixed operative connection with the body, extends on the back side of the body, includes at least one bolt guide opening, a cam bolt, wherein the cam bolt is in movable operative supported connection with the body on the back side, is constrained to move in guided relation within the at least one bolt guide opening, includes a distal portion, wherein the distal portion extends outside the at least one bolt guide opening, wherein the cam bolt is in operative connection with the at least one eccentric projection or recess, wherein rotation of the lock cylinder in the LC bore is operative to move the cam bolt between a locked cam bolt position, and an unlocked cam bolt position, wherein the striker includes one of a strike projection or a strike recess that extends radially relative to the IC bore axis, wherein the one strike projection or strike recess is configured to operatively engage the distal portion of the cam bolt, wherein in the locked cam bolt position of the cam bolt and in the first rotational shank position the distal portion of the cam bolt is operatively engaged with the strike projection or strike recess and prevents the shank that is fixed operative connection with the striker from rotationally moving away from the first rotational shank position, wherein the striker is axially movable in connection with the shank between the first axial shank position and the second axial shank position while the distal portion remains operatively engaged with the bolt engagement aperture, wherein in the unlocked cam bolt position of the cam bolt, the distal portion is disposed away from the strike projection or strike recess, and the shank is rotationally movable away from the first rotational shank position and the striker is rotationally movable with the shank away from the holding position.

31. The apparatus according to claim 28 wherein the annular IC bore wall includes at least one radially outward extending IC bore slot, wherein the indexing cam portion includes at least one radially outward extending IC projection, wherein when the shank is in the first rotational shank position and the first axial shank position, a respective IC projection is engaged in a respective IC bore slot, whereby the shank is held in the first rotational shank position, and when the shank is in the first rotational shank position and the second axial shank position, the respective radially outward extending IC projection is not engaged with the respective IC bore slot, whereby the shrank is rotationally moveable away from the first shank rotational position.

32. The apparatus according to claim 28 wherein the IC bore wall is in operative fixed connection with at least one radially extending stop, wherein the at least one radially extending stop is operative prevent movement of the shank in a rotational direction, beyond the first rotational shank position.

33. The apparatus according to claim 28 wherein the at least one spring comprises:

a compression spring, wherein the compression spring extends in concentric relation with the IC bore, wherein the compression spring is operative to cause the shank to be biased toward the second axial shank position.

34. The apparatus according to claim 28 wherein the at least one spring comprises:

a return spring, wherein the return spring is operative to cause the shank to be biased toward the first rotational shank position.

* * * * *